US012783425B2

(12) United States Patent
Surti et al.

(10) Patent No.: US 12,783,425 B2
(45) Date of Patent: Nov. 3, 2026

(54) DISTRIBUTED COMPRESSION/DECOMPRESSION SYSTEM

(71) Applicant: Intel Corporation, Santa Clara, CA (US)

(72) Inventors: Prasoonkumar Surti, Folsom, CA (US); Vidhya Krishnan, Folsom, CA (US); Abhishek R. Appu, El Dorado Hills, CA (US); Karol A. Szerszen, Hillsboro, OR (US); Lakshminarayanan Striramassarma, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 379 days.

(21) Appl. No.: 17/561,652

(22) Filed: Dec. 23, 2021

(65) Prior Publication Data

US 2023/0205704 A1 Jun. 29, 2023

(51) Int. Cl.
*G06F 12/0897* (2016.01)

(52) U.S. Cl.
CPC .... *G06F 12/0897* (2013.01); *G06F 2212/401* (2013.01)

(58) Field of Classification Search
CPC .. G06F 12/0284; G06F 12/04; G06F 12/0811; G06F 12/084; G06F 12/0886; G06F 12/0897; G06F 2212/1016; G06F 2212/401; G06F 2212/455
See application file for complete search history.

(56) References Cited

U.S. PATENT DOCUMENTS

| | | | | |
|---|---|---|---|---|
| 6,263,413 | B1 | 7/2001 | Motomura et al. | |
| 7,190,284 | B1 * | 3/2007 | Dye | G06F 12/023 711/170 |
| 7,606,954 | B2 * | 10/2009 | Brink | G06F 3/0677 710/33 |
| 9,430,327 | B2 | 8/2016 | Yeh | |
| 10,203,901 | B2 | 2/2019 | Malyugin et al. | |
| 10,546,393 | B2 | 1/2020 | Ray et al. | |
| 10,719,447 | B2 | 7/2020 | Akenine-Moller et al. | |

(Continued)

FOREIGN PATENT DOCUMENTS

KR 20080047096 A 5/2008

OTHER PUBLICATIONS

International Search Report and Written Opinion for PCT Patent Application No. PCT/US22/48291, Mailed Feb. 28, 2023, 12 pages.

(Continued)

*Primary Examiner* — Aracelis Ruiz
(74) *Attorney, Agent, or Firm* — Compass IP Law PC

(57) ABSTRACT

A graphics processor includes multiple levels of memory units, including a memory device and a cache device located near a graphics component. The graphics processor includes distributed compression/decompression, including a module between the cache device and the memory device. The module can perform compression of write data when the write data is moved from the cache device to the memory device, and perform decompression of read data when the read data is moved from the memory device to the cache device. The graphics processor can include a second level of cache with another compression module between the first level of cache and the second level of cache.

18 Claims, 29 Drawing Sheets

(56) References Cited

U.S. PATENT DOCUMENTS

| | | | |
|---|---|---|---|
| 10,803,650 B2 | 10/2020 | Appu et al. | |
| 10,902,546 B2 | 1/2021 | Veernapu et al. | |
| 11,049,213 B2 | 6/2021 | Appu et al. | |
| 11,113,784 B2 | 9/2021 | Ray et al. | |
| 11,393,131 B2 | 7/2022 | Appu et al. | |
| 2006/0004968 A1* | 1/2006 | Vogt | G06F 12/0804 711/E12.04 |
| 2010/0274773 A1 | 10/2010 | Pawar et al. | |
| 2013/0262538 A1 | 10/2013 | Wegener | |
| 2015/0193353 A1 | 7/2015 | Habermann | |
| 2015/0262385 A1 | 9/2015 | Satoh et al. | |
| 2016/0300320 A1 | 10/2016 | Iourcha et al. | |
| 2016/0306559 A1* | 10/2016 | Arakawa | G06F 3/0605 |
| 2018/0089091 A1 | 3/2018 | Akenine-Moller et al. | |
| 2022/0051645 A1 | 2/2022 | Appu et al. | |

OTHER PUBLICATIONS

Extended European Search Report for Patent Application No. 22912217.1, Mailed Oct. 21, 2025, 9 pages.

* cited by examiner

DISTRIBUTED COMPRESSION/DECOMPRESSION SYSTEM

FIELD

Descriptions are generally related to graphics processing, and more particular descriptions are related to compression in a graphics subsystem.

BACKGROUND

In modern GPU (graphics processing unit) systems, there are numerous producer/consumer memory flows that can benefit from memory compression. Compression can reduce the memory footprint of data, increasing the amount of data that can be cached for use. Traditionally, GPU systems are single point compression/decompression systems having a compressor/decompressor pair either directly in the memory path, or between a large memory cache and the rest of the GPU. Single point systems limit the application of caching, seeing that all data goes through the compressor/decompressor pair.

BRIEF DESCRIPTION OF THE DRAWINGS

The following description includes discussion of figures having illustrations given by way of example of an implementation. The drawings should be understood by way of example, and not by way of limitation. As used herein, references to one or more examples are to be understood as describing a particular feature, structure, or characteristic included in at least one implementation of the invention. Phrases such as "in one example" or "in an alternative example" appearing herein provide examples of implementations of the invention, and do not necessarily all refer to the same implementation. However, they are also not necessarily mutually exclusive.

Descriptions of certain details and implementations follow, including non-limiting descriptions of the figures, which may depict some or all examples, and well as other potential implementations.

DETAILED DESCRIPTION

As described herein, a graphics processor includes multiple levels of memory units, including a memory device and a cache device located near a graphics component. The graphics processor includes distributed compression/decompression, including a module between the cache device and the memory device. The module can perform compression of write data when the write data is moved from the cache device to the memory device, and perform decompression of read data when the read data is moved from the memory device to the cache device. The graphics processor can include a second level of cache with another compression module between the first level of cache and the second level of cache.

Such a system offers greater flexibility in terms of how data gets cached as compared to traditional single point systems. The system can mix and match various data flows, allowing for data flows of compressed and uncompressed data to various producers and consumers. Distributed compression/decompression allows the system to reconfigure on the fly how data will be cached, allowing greater utilization of the various data flows in the GPU (graphics processing unit) system. In one example, the cache can store both compressed and uncompressed data, with various points of compression/decompression to enable flexible compressed data flows and uncompressed data flows. In one example, a cache can operate as a compression merge buffer for cases where a producer writes data in a sparse manner.

The flexibility of a system with distributed compression/decompression to selectively determine where data will be compressed and decompressed or uncompressed can improve the efficiency of the system over a single point architecture. The distributed architecture can enable data to be moved without having to go through unnecessary compression or decompression, depending on how the consumer will use the data. The system can choose where the data is compressed individually for each client. In one example, the common caches or caches shared by different clients can store both compressed and uncompressed data. Overall, the distributed architecture offers improved GPU performance and power efficiency for the same die area.

System Overview

Figure 1:
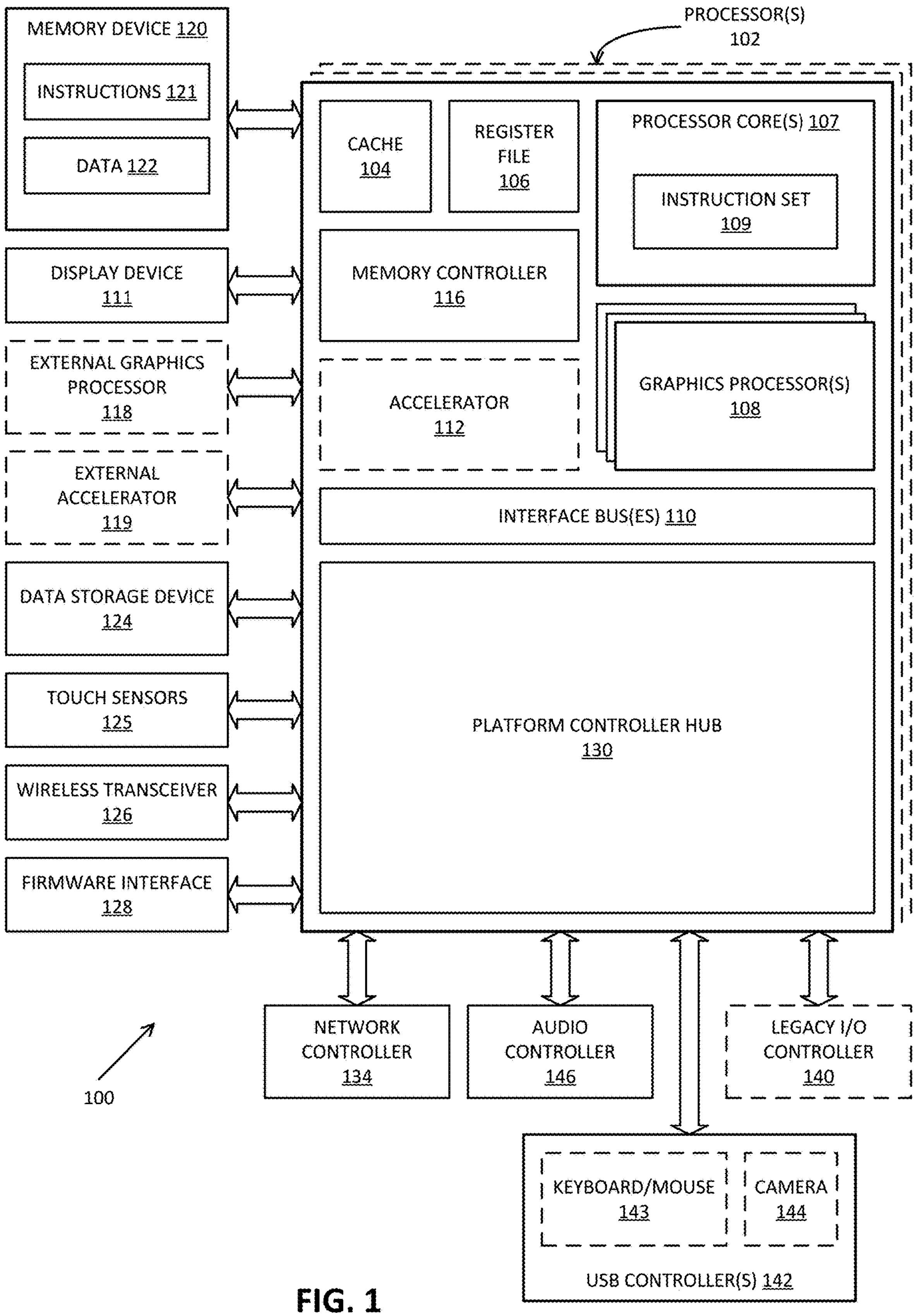
FIG. 1 is a block diagram of a processing system according to an example.

FIG. 1 is a block diagram of a processing system 100, according to an example. System 100 may be used in a single processor desktop system, a multiprocessor workstation system, or a server system having a large number of processors 102 or processor cores 107. In one example, the system 100 is a processing platform incorporated within a system-on-a-chip (SoC) integrated circuit for use in mobile, handheld, or embedded devices such as within Internet-of-things (IoT) devices with wired or wireless connectivity to a local or wide area network.

In one example, system 100 can include, couple with, or be integrated within: a server-based gaming platform; a game console, including a game and media console; a mobile gaming console, a handheld game console, or an online game console. In some examples the system 100 is part of a mobile phone, smart phone, tablet computing device or mobile Internet-connected device such as a laptop with low internal storage capacity. Processing system 100 can also include, couple with, or be integrated within: a wearable device, such as a smart watch wearable device; smart eyewear or clothing enhanced with augmented reality (AR) or virtual reality (VR) features to provide visual, audio or tactile outputs to supplement real world visual, audio or tactile experiences or otherwise provide text, audio, graphics, video, holographic images or video, or tactile feedback; other augmented reality (AR) device; or other virtual reality (VR) device. In some examples, the processing system 100 includes or is part of a television or set top box device. In one example, system 100 can include, couple with, or be integrated within a self-driving vehicle such as a bus, tractor trailer, car, motor or electric power cycle, plane or glider (or any combination thereof). The self-driving vehicle may use system 100 to process the environment sensed around the vehicle.

In some examples, the one or more processors 102 each include one or more processor cores 107 to process instructions which, when executed, perform operations for system or user software. In some examples, at least one of the one or more processor cores 107 is configured to process a specific instruction set 109. In some examples, instruction set 109 may facilitate Complex Instruction Set Computing (CISC), Reduced Instruction Set Computing (RISC), or computing via a Very Long Instruction Word (VLIW). One or more processor cores 107 may process a different instruction set 109, which may include instructions to facilitate the emulation of other instruction sets. Processor core 107 may also include other processing devices, such as a Digital Signal Processor (DSP).

In some examples, the processor 102 includes cache memory 104. Depending on the architecture, the processor 102 can have a single internal cache or multiple levels of internal cache. In some examples, the cache memory is shared among various components of the processor 102. In some examples, the processor 102 also uses an external cache (e.g., a Level-3 (L3) cache or Last Level Cache (LLC)) (not shown), which may be shared among processor cores 107 using known cache coherency techniques. A register file 106 can be additionally included in processor 102 and may include different types of registers for storing different types of data (e.g., integer registers, floating point registers, status registers, and an instruction pointer register). Some registers may be general-purpose registers, while other registers may be specific to the design of the processor 102.

In some examples, one or more processor(s) 102 are coupled with one or more interface bus(es) 110 to transmit communication signals such as address, data, or control signals between processor 102 and other components in the system 100. The interface bus 110, in one example, can be a processor bus, such as a version of the Direct Media Interface (DMI) bus. However, processor busses are not limited to the DMI bus, and may include one or more Peripheral Component Interconnect buses (e.g., PCI, PCI express), memory busses, or other types of interface busses. In one example the processor(s) 102 include an integrated memory controller 116 and a platform controller hub 130. The memory controller 116 facilitates communication between a memory device and other components of the system 100, while the platform controller hub (PCH) 130 provides connections to I/O devices via a local I/O bus.

The memory device 120 can be a dynamic random-access memory (DRAM) device, a static random-access memory (SRAM) device, flash memory device, phase-change memory device, or some other memory device having suitable performance to serve as process memory. In one example the memory device 120 can operate as system memory for the system 100, to store data 122 and instructions 121 for use when the one or more processors 102 executes an application or process. Memory controller 116 also couples with an optional external graphics processor 118, which may communicate with the one or more graphics processors 108 in processors 102 to perform graphics and media operations. In some examples, graphics, media, and or compute operations may be assisted by an accelerator 112 which is a coprocessor that can be configured to perform a specialized set of graphics, media, or compute operations. For example, in one example the accelerator 112 is a matrix multiplication accelerator used to optimize machine learning or compute operations. In one example the accelerator 112 is a ray-tracing accelerator that can be used to perform ray-tracing operations in concert with the graphics processor 108. In one example, an external accelerator 119 may be used in place of or in concert with the accelerator 112.

In some examples a display device 111 can connect to the processor(s) 102. The display device 111 can be one or more of an internal display device, as in a mobile electronic device or a laptop device or an external display device attached via a display interface (e.g., DisplayPort, embedded DisplayPort, MIPI, HDMI, etc.). In one example the display device 111 can be a head mounted display (HMD) such as a stereoscopic display device for use in virtual reality (VR) applications or augmented reality (AR) applications.

In some examples the platform controller hub 130 enables peripherals to connect to memory device 120 and processor 102 via a high-speed I/O bus. The I/O peripherals include, but are not limited to, an audio controller 146, a network controller 134, a firmware interface 128, a wireless transceiver 126, touch sensors 125, a data storage device 124 (e.g., non-volatile memory, volatile memory, hard disk drive, flash memory, NAND, 3D NAND, 3D XPoint, etc.). The data storage device 124 can connect via a storage interface (e.g., SATA (serial advanced technology attachment)) or via a peripheral bus, such as a Peripheral Component Interconnect bus (e.g., PCI, PCI express). The touch sensors 125 can include touch screen sensors, pressure sensors, or fingerprint sensors. The wireless transceiver 126 can be a Wi-Fi transceiver, a Bluetooth transceiver, or a mobile network transceiver such as a 3G, 4G, 5G, or Long-Term Evolution (LTE) transceiver. The firmware interface 128 enables communication with system firmware, and can be, for example, a unified extensible firmware interface (UEFI). The network controller 134 can enable a network connection to a wired network. In some examples, a high-performance network controller (not shown) couples with the interface bus 110. The audio controller 146, in one example, is a multi-channel high definition audio controller. In one example the system 100 includes an optional legacy I/O controller 140 for coupling legacy (e.g., Personal System 2 (PS/2)) devices to the system. The platform controller hub 130 can also connect to one or more Universal Serial Bus (USB) controllers 142 connect input devices, such as keyboard and mouse 143 combinations, a camera 144, or other USB input devices.

It will be appreciated that the system 100 shown is exemplary and not limiting, as other types of data processing systems that are differently configured may also be used. For example, an instance of the memory controller 116 and platform controller hub 130 may be integrated into a discreet external graphics processor, such as the external graphics processor 118. In one example the platform controller hub 130 and/or memory controller 116 may be external to the one or more processor(s) 102. For example, the system 100 can include an external memory controller 116 and platform controller hub 130, which may be configured as a memory controller hub and peripheral controller hub within a system chipset that is in communication with the processor(s) 102.

For example, circuit boards ("sleds") can be used on which components such as CPUs, memory, and other components are placed are designed for increased thermal performance. In some examples, processing components such as the processors are located on a top side of a sled while near memory, such as DIMMs (dual inline memory modules), are located on a bottom side of the sled. As a result of the enhanced airflow provided by this design, the components may operate at higher frequencies and power levels than in typical systems, thereby increasing performance. Furthermore, the sleds are configured to blindly mate with power and data communication cables in a rack, thereby enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative example, the components additionally include hardware attestation features to prove their authenticity.

A data center can utilize a single network architecture ("fabric") that supports multiple other network architectures including Ethernet and Omni-Path. The sleds can be coupled to switches via optical fibers, which provide higher bandwidth and lower latency than typical twisted pair cabling (e.g., Category 5, Category 5e, Category 6, etc.). Due to the high bandwidth, low latency interconnections and network architecture, the data center may, in use, pool resources, such as memory, accelerators (e.g., GPUs, graphics accelerators, FPGAs (field programmable gate arrays), ASICs, neural network and/or artificial intelligence accelerators, etc.), and data storage drives that are physically disaggregated, and provide them to compute resources (e.g., processors) on an as needed basis, enabling the compute resources to access the pooled resources as if they were local.

A power supply or source can provide voltage and/or current to system 100 or any component or system described herein. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

FIGS. 2A-2D illustrate computing systems and graphics processors provided by examples described herein. The elements of FIGS. 2A-2D having the same reference numbers (or names) as the elements of any other figure herein can operate or function in any manner similar to that described elsewhere herein, but are not limited to such.

Figure 2A:
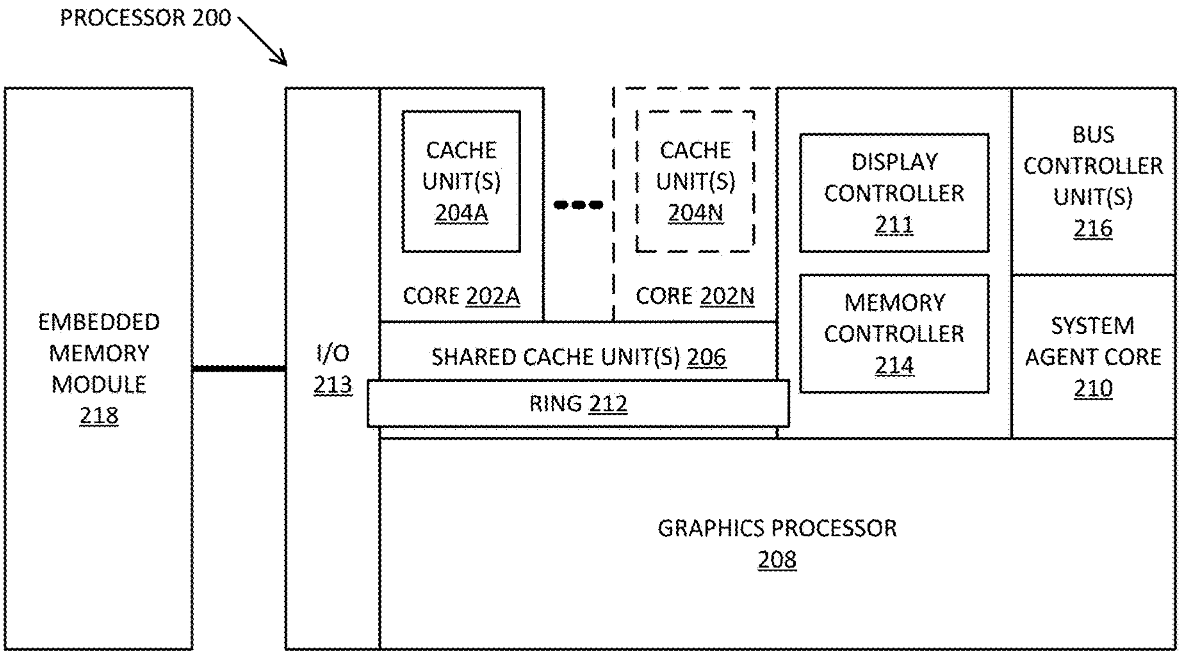
FIGS. 2A-2D illustrate computing systems and graphics processors provided by examples described herein.

FIG. 2A is a block diagram of an example of a processor 200 having one or more processor cores 202A-202N, an integrated memory controller 214, and an integrated graphics processor 208. Processor 200 can include additional cores up to and including additional core 202N represented by the dashed lined boxes. Each of processor cores 202A-202N includes one or more internal cache units 204A-204N. In some examples each processor core also has access to one or more shared cached units 206. The internal cache units 204A-204N and shared cache units 206 represent a cache memory hierarchy within the processor 200. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some examples, cache coherency logic maintains coherency between the various cache units 206 and 204A-204N.

In some examples, processor 200 may also include a set of one or more bus controller units 216 and a system agent core 210. The one or more bus controller units 216 manage a set of peripheral buses, such as one or more PCI or PCI express busses. System agent core 210 provides management functionality for the various processor components. In some examples, system agent core 210 includes one or more integrated memory controllers 214 to manage access to various external memory devices (not shown).

In some examples, one or more of the processor cores 202A-202N include support for simultaneous multi-threading. In such example, the system agent core 210 includes components for coordinating and operating cores 202A-202N during multi-threaded processing. System agent core 210 may additionally include a power control unit (PCU), which includes logic and components to regulate the power state of processor cores 202A-202N and graphics processor 208.

In some examples, processor 200 additionally includes graphics processor 208 to execute graphics processing operations. In some examples, the graphics processor 208 couples with the set of shared cache units 206, and the system agent core 210, including the one or more integrated memory controllers 214. In some examples, the system agent core 210 also includes a display controller 211 to drive graphics processor output to one or more coupled displays. In some examples, display controller 211 may also be a separate module coupled with the graphics processor via at least one interconnect, or may be integrated within the graphics processor 208.

In some examples, a ring-based interconnect unit 212 is used to couple the internal components of the processor 200. However, an alternative interconnect unit may be used, such as a point-to-point interconnect, a switched interconnect, or other techniques, including techniques well known in the art. In some examples, graphics processor 208 couples with the ring interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In some examples, each of the processor cores 202A-202N and graphics processor 208 can use embedded memory modules 218 as a shared Last Level Cache.

In some examples, processor cores 202A-202N are homogenous cores executing the same instruction set architecture. In another example, processor cores 202A-202N are heterogeneous in terms of instruction set architecture (ISA), where one or more of processor cores 202A-202N execute a first instruction set, while at least one of the other cores executes a subset of the first instruction set or a different instruction set. In one example, processor cores 202A-202N are heterogeneous in terms of microarchitecture, where one or more cores having a relatively higher power consumption couple with one or more power cores having a lower power consumption. In one example, processor cores 202A-202N are heterogeneous in terms of computational capability. Additionally, processor 200 can be implemented on one or more chips or as an SoC integrated circuit having the illustrated components, in addition to other components.

Figure 2B:
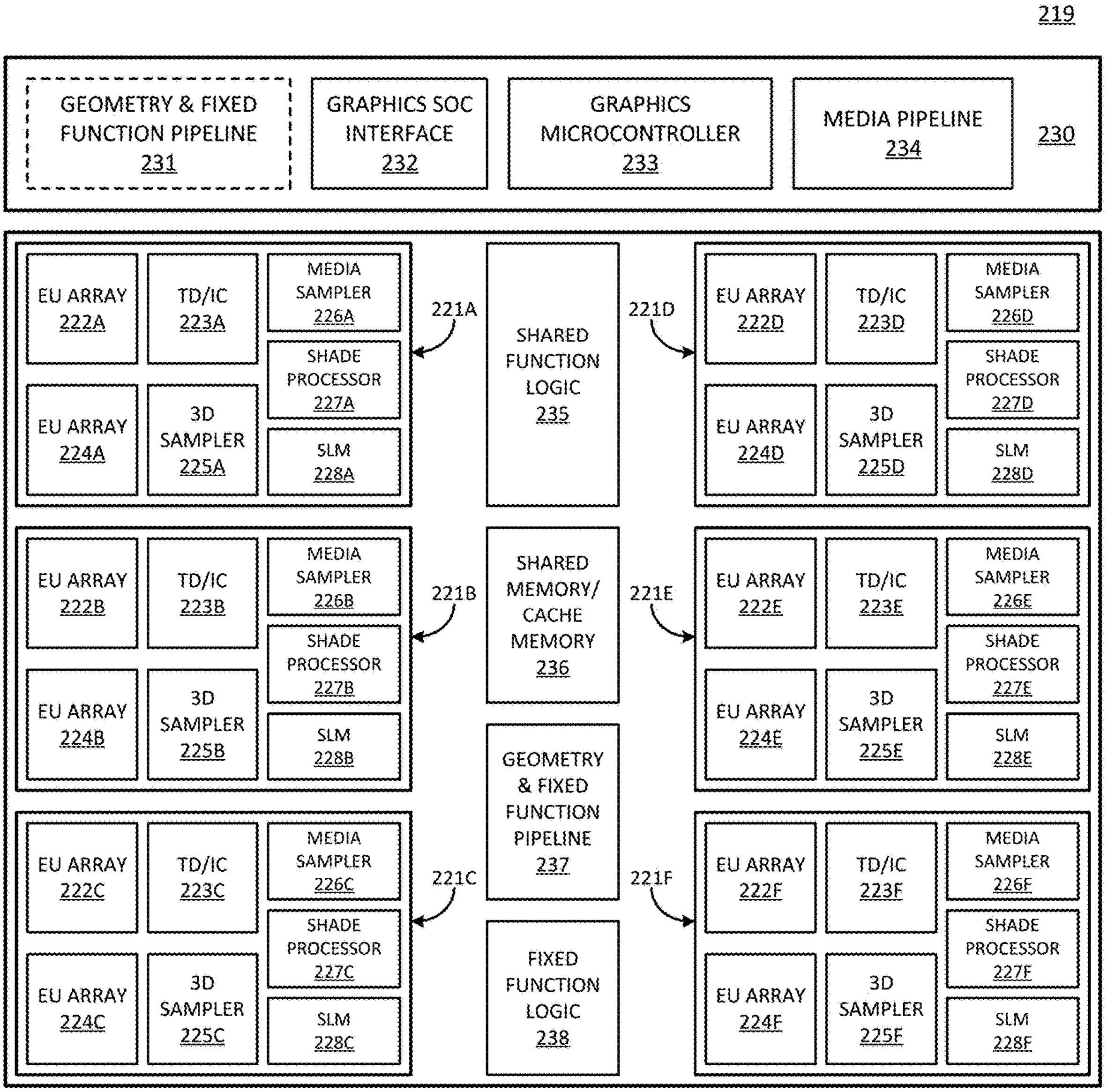

FIG. 2B is a block diagram of hardware logic of a graphics processor core 219, according to some examples described herein. Elements of FIG. 2B having the same reference numbers (or names) as the elements of any other figure herein can operate or function in any manner similar to that described elsewhere herein, but are not limited to such. The graphics processor core 219, sometimes referred to as a core slice, can be one or multiple graphics cores within a modular graphics processor. The graphics processor core 219 is exemplary of one graphics core slice, and a graphics processor as described herein may include multiple graphics core slices based on target power and performance envelopes. Each graphics processor core 219 can include a fixed function block 230 coupled with multiple sub-cores 221A-221F, also referred to as sub-slices, that include modular blocks of general-purpose and fixed function logic.

In some examples, the fixed function block 230 includes a geometry/fixed function pipeline 231 that can be shared by all sub-cores in the graphics processor core 219, for example, in lower performance and/or lower power graphics processor implementations. In various examples, the geometry/fixed function pipeline 231 includes a 3D fixed function pipeline (e.g., 3D pipeline 312 as in FIG. 3 and FIG. 4, described below) a video front-end unit, a thread spawner and thread dispatcher, and a unified return buffer manager, which manages unified return buffers (e.g., unified return buffer 418 in FIG. 4, as described below).

In one example the fixed function block 230 also includes a graphics SoC interface 232, a graphics microcontroller 233, and a media pipeline 234. The graphics SoC interface 232 provides an interface between the graphics processor core 219 and other processor cores within a system on a chip integrated circuit. The graphics microcontroller 233 is a programmable sub-processor that is configurable to manage various functions of the graphics processor core 219, including thread dispatch, scheduling, and pre-emption. The media pipeline 234 (e.g., media pipeline 316 of FIG. 3 and FIG. 4) includes logic to facilitate the decoding, encoding, pre-processing, and/or post-processing of multimedia data, including image and video data. The media pipeline 234 implement media operations via requests to compute or sampling logic within the sub-cores 221-221F.

In one example, the SoC interface 232 enables the graphics processor core 219 to communicate with general-purpose application processor cores (e.g., CPUs) and/or other components within an SoC, including memory hierarchy elements such as a shared last level cache memory, the system RAM, and/or embedded on-chip or on-package DRAM. The SoC interface 232 can also enable communication with fixed function devices within the SoC, such as camera imaging pipelines, and enables the use of and/or implements global memory atomics that may be shared between the graphics processor core 219 and CPUs within the SoC. The SoC interface 232 can also implement power management controls for the graphics processor core 219 and enable an interface between a clock domain of the graphic core 219 and other clock domains within the SoC. In one example the SoC interface 232 enables receipt of command buffers from a command streamer and global thread dispatcher that are configured to provide commands and instructions to each of one or more graphics cores within a graphics processor. The commands and instructions can be dispatched to the media pipeline 234, when media operations are to be performed, or a geometry and fixed function pipeline (e.g., geometry and fixed function pipeline 231, geometry and fixed function pipeline 237) when graphics processing operations are to be performed.

The graphics microcontroller 233 can be configured to perform various scheduling and management tasks for the graphics processor core 219. In one example the graphics microcontroller 233 can perform graphics and/or compute workload scheduling on the various graphics parallel engines within execution unit (EU) arrays 222A-222F, 224A-224F within the sub-cores 221A-221F. In this scheduling model, host software executing on a CPU core of an SoC including the graphics processor core 219 can submit workloads one of multiple graphic processor doorbells, which invokes a scheduling operation on the appropriate graphics engine. Scheduling operations include determining which workload to run next, submitting a workload to a command streamer, pre-empting existing workloads running on an engine, monitoring progress of a workload, and notifying host software when a workload is complete. In one example the graphics microcontroller 233 can also facilitate low-power or idle states for the graphics processor core 219, providing the graphics processor core 219 with the ability to save and restore registers within the graphics processor core 219 across low-power state transitions independently from the operating system and/or graphics driver software on the system.

The graphics processor core 219 may have greater than or fewer than the illustrated sub-cores 221A-221F, up to N modular sub-cores. For each set of N sub-cores, the graphics processor core 219 can also include shared function logic 235, shared and/or cache memory 236, a geometry/fixed function pipeline 237, as well as additional fixed function logic 238 to accelerate various graphics and compute processing operations. The shared function logic 235 can include logic units associated with the shared function logic 420 of FIG. 4 (e.g., sampler, math, and/or inter-thread communication logic) that can be shared by each N sub-cores within the graphics processor core 219. The shared and/or cache memory 236 can be a last-level cache for the set of N sub-cores 221A-221F within the graphics processor core 219, and can also serve as shared memory that is accessible by multiple sub-cores. The geometry/fixed function pipeline 237 can be included instead of the geometry/fixed function pipeline 231 within the fixed function block 230 and can include the same or similar logic units.

In one example the graphics processor core 219 includes additional fixed function logic 238 that can include various fixed function acceleration logic for use by the graphics processor core 219. In one example the additional fixed function logic 238 includes an additional geometry pipeline for use in position only shading. In position-only shading, two geometry pipelines exist, the full geometry pipeline within the geometry/fixed function pipeline 238, 231, and a cull pipeline, which is an additional geometry pipeline which may be included within the additional fixed function logic 238. In one example the cull pipeline is a trimmed down version of the full geometry pipeline. The full pipeline and the cull pipeline can execute different instances of the same application, each instance having a separate context. Position only shading can hide long cull runs of discarded triangles, enabling shading to be completed earlier in some instances. In one example, the cull pipeline logic within the additional fixed function logic 238 can execute position shaders in parallel with the main application and generally generates critical results faster than the full pipeline, as the cull pipeline fetches and shades only the position attribute of the vertices, without performing rasterization and rendering of the pixels to the frame buffer. The cull pipeline can use the generated critical results to compute visibility information for all the triangles without regard to whether those triangles are culled. The full pipeline (which in this instance may be referred to as a replay pipeline) can consume the visibility information to skip the culled triangles to shade only the visible triangles that are finally passed to the rasterization phase.

In one example the additional fixed function logic 238 can also include machine-learning acceleration logic, such as fixed function matrix multiplication logic, for implementations including optimizations for machine learning training or inferencing.

Within each graphics sub-core 221A-221F includes a set of execution resources that may be used to perform graphics, media, and compute operations in response to requests by graphics pipeline, media pipeline, or shader programs. The graphics sub-cores 221A-221F include multiple EU arrays 222A-222F, 224A-224F, thread dispatch and inter-thread communication (TD/IC) logic 223A-223F, a 3D (e.g., texture) sampler 225A-225F, a media sampler 226A-226F, a shader processor 227A-227F, and shared local memory (SLM) 228A-228F. The EU arrays 222A-222F, 224A-224F each include multiple execution units, which are general-purpose graphics processing units capable of performing floating-point and integer/fixed-point logic operations in service of a graphics, media, or compute operation, including graphics, media, or compute shader programs. The TD/IC logic 223A-223F performs local thread dispatch and thread control operations for the execution units within a sub-core and facilitate communication between threads executing on the execution units of the sub-core. The 3D sampler 225A-225F can read texture or other 3D graphics related data into memory. The 3D sampler can read texture data differently based on a configured sample state and the texture format associated with a given texture. The media sampler 226A-226F can perform similar read operations based on the type and format associated with media data. In one example, each graphics sub-core 221A-221F can alternately include a unified 3D and media sampler. Threads executing on the execution units within each of the sub-cores 221A-221F can make use of shared local memory 228A-228F within each sub-core, to enable threads executing within a thread group to execute using a common pool of on-chip memory.

Figure 2C:
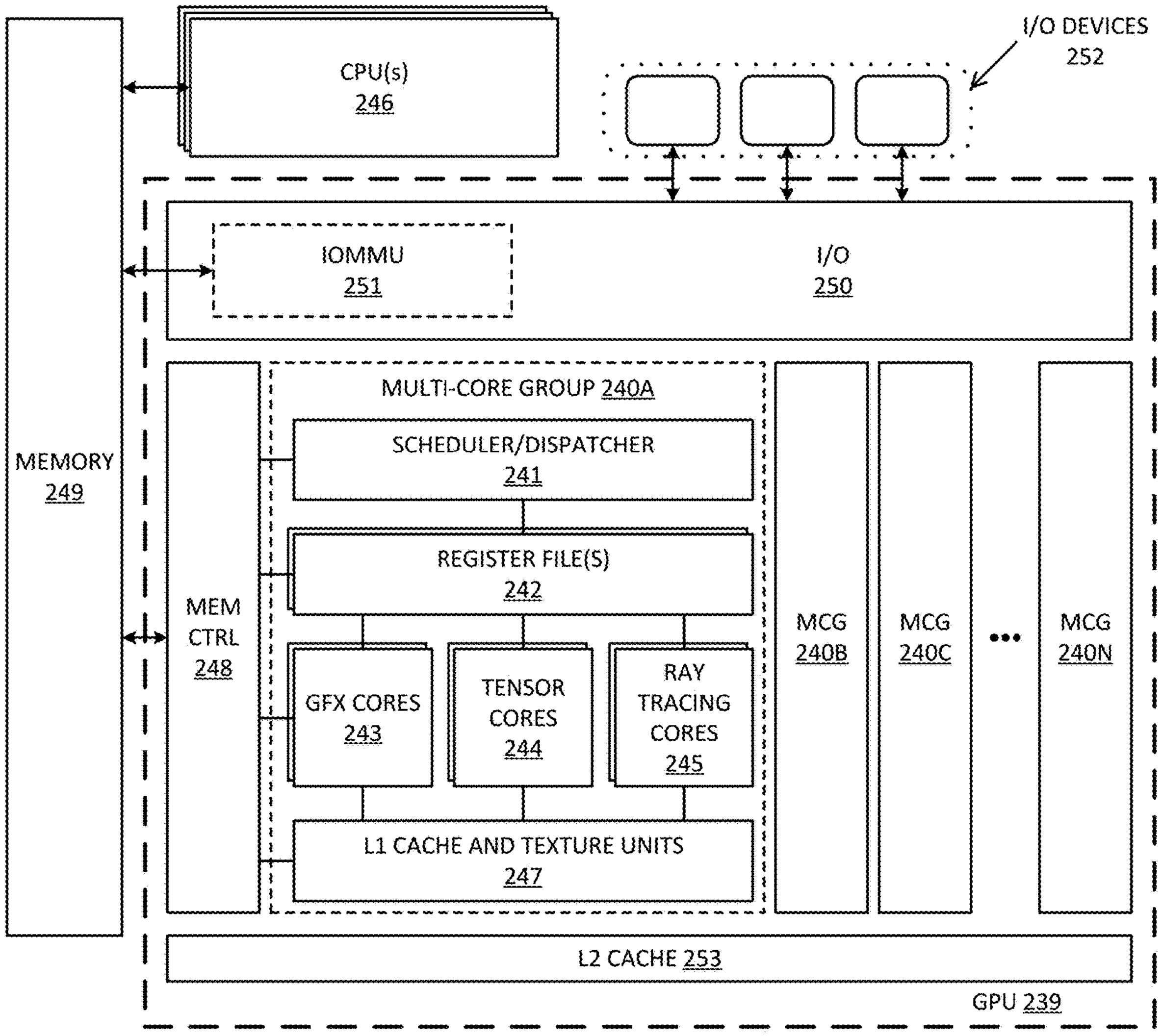

FIG. 2C illustrates a graphics processing unit (GPU) 239 that includes dedicated sets of graphics processing resources arranged into multi-core groups 240A-240N. While the details of only a single multi-core group 240A are provided, it will be appreciated that the other multi-core groups 240B-240N may be equipped with the same or similar sets of graphics processing resources.

As illustrated, a multi-core group 240A may include a set of graphics cores 243, a set of tensor cores 244, and a set of ray tracing cores 245. A scheduler/dispatcher 241 schedules and dispatches the graphics threads for execution on the various cores 243, 244, 245. A set of register files 242 store operand values used by the cores 243, 244, 245 when executing the graphics threads. These may include, for example, integer registers for storing integer values, floating point registers for storing floating point values, vector registers for storing packed data elements (integer and/or floating point data elements) and tile registers for storing tensor/matrix values. In one example, the tile registers are implemented as combined sets of vector registers.

One or more combined level 1 (L1) caches and shared memory units 247 store graphics data such as texture data, vertex data, pixel data, ray data, bounding volume data, etc., locally within each multi-core group 240A. One or more texture units 247 can also be used to perform texturing operations, such as texture mapping and sampling. A Level 2 (L2) cache 253 shared by all or a subset of the multi-core groups 240A-240N stores graphics data and/or instructions for multiple concurrent graphics threads. As illustrated, the L2 cache 253 may be shared across a plurality of multi-core groups 240A-240N. One or more memory controllers 248 couple the GPU 239 to a memory 249 which may be a system memory (e.g., DRAM) and/or a dedicated graphics memory (e.g., GDDR6 memory).

Input/output (I/O) circuitry 250 couples the GPU 239 to one or more I/O devices 252 such as digital signal processors (DSPs), network controllers, or user input devices. An on-chip interconnect may be used to couple the I/O devices 252 to the GPU 239 and memory 249. One or more I/O memory management units (IOMMUs) 251 of the I/O circuitry 250 couple the I/O devices 252 directly to the system memory 249. In one example, the IOMMU 251 manages multiple sets of page tables to map virtual addresses to physical addresses in system memory 249. In this example, the I/O devices 252, CPU(s) 246, and GPU(s) 239 may share the same virtual address space.

In one implementation, the IOMMU 251 supports virtualization. In this case, it may manage a first set of page tables to map guest/graphics virtual addresses to guest/graphics physical addresses and a second set of page tables to map the guest/graphics physical addresses to system/host physical addresses (e.g., within system memory 249). The base addresses of each of the first and second sets of page tables may be stored in control registers and swapped out on a context switch (e.g., so that the new context is provided with access to the relevant set of page tables). While not illustrated in FIG. 2C, each of the cores 243, 244, 245 and/or multi-core groups 240A-240N may include translation lookaside buffers (TLBs) to cache guest virtual to guest physical translations, guest physical to host physical translations, and guest virtual to host physical translations.

In one example, the CPUs 246, GPUs 239, and I/O devices 252 are integrated on a single semiconductor chip and/or chip package. The illustrated memory 249 may be integrated on the same chip or may be coupled to the memory controllers 248 via an off-chip interface. In one implementation, the memory 249 comprises GDDR6 memory which shares the same virtual address space as other physical system-level memories, although the underlying principles of the invention are not limited to this specific implementation.

In one example, the tensor cores 244 include a plurality of execution units specifically designed to perform matrix operations, which are the fundamental compute operation used to perform deep learning operations. For example, simultaneous matrix multiplication operations may be used for neural network training and inferencing. The tensor cores 244 may perform matrix processing using a variety of operand precisions including single precision floating-point (e.g., 32 bits), half-precision floating point (e.g., 16 bits), integer words (16 bits), bytes (8 bits), and half-bytes (4 bits). In one example, a neural network implementation extracts features of each rendered scene, potentially combining details from multiple frames, to construct a high-quality final image.

In deep learning implementations, parallel matrix multiplication work may be scheduled for execution on the tensor cores 244. The training of neural networks, in particular, requires a significant number of matrix dot product operations. In order to process an inner-product formulation of an N×N×N matrix multiply, the tensor cores 244 may include at least N dot-product processing elements. Before the matrix multiply begins, one entire matrix is loaded into tile registers and at least one column of a second matrix is loaded each cycle for N cycles. Each cycle, there are N dot products that are processed.

Matrix elements may be stored at different precisions depending on the particular implementation, including 16-bit words, 8-bit bytes (e.g., INT8) and 4-bit half-bytes (e.g., INT4). Different precision modes may be specified for the tensor cores 244 to ensure that the most efficient precision is used for different workloads (e.g., such as inferencing workloads which can tolerate quantization to bytes and half-bytes).

In one example, the ray tracing cores 245 accelerate ray tracing operations for both real-time ray tracing and non-real-time ray tracing implementations. In particular, the ray tracing cores 245 include ray traversal/intersection circuitry for performing ray traversal using bounding volume hierarchies (BVHs) and identifying intersections between rays and primitives enclosed within the BVH volumes. The ray tracing cores 245 may also include circuitry for performing depth testing and culling (e.g., using a Z buffer or similar arrangement). In one implementation, the ray tracing cores 245 perform traversal and intersection operations in concert with the image denoising techniques described herein, at least a portion of which may be executed on the tensor cores 244. For example, in one example, the tensor cores 244 implement a deep learning neural network to perform denoising of frames generated by the ray tracing cores 245. However, the CPU(s) 246, graphics cores 243, and/or ray tracing cores 245 may also implement all or a portion of the denoising and/or deep learning algorithms.

In addition, as described above, a distributed approach to denoising may be employed in which the GPU 239 is in a computing device coupled to other computing devices over a network or high speed interconnect. In this example, the interconnected computing devices share neural network learning/training data to improve the speed with which the overall system learns to perform denoising for different types of image frames and/or different graphics applications.

In one example, the ray tracing cores 245 process all BVH traversal and ray-primitive intersections, saving the graphics cores 243 from being overloaded with thousands of instructions per ray. In one example, each ray tracing core 245 includes a first set of specialized circuitries for performing bounding box tests (e.g., for traversal operations) and a second set of specialized circuitry for performing the ray-triangle intersection tests (e.g., intersecting rays which have been traversed). Thus, in one example, the multi-core group 240A can simply launch a ray probe, and the ray tracing cores 245 independently perform ray traversal and intersection and return hit data (e.g., a hit, no hit, multiple hits, etc.) to the thread context. The other cores 243, 244 are freed to perform other graphics or compute work while the ray tracing cores 245 perform the traversal and intersection operations.

In one example, each ray tracing core 245 includes a traversal unit to perform BVH testing operations and an intersection unit which performs ray-primitive intersection tests. The intersection unit generates a "hit", "no hit", or "multiple hit" response, which it provides to the appropriate thread. During the traversal and intersection operations, the execution resources of the other cores (e.g., graphics cores 243 and tensor cores 244) are freed to perform other forms of graphics work.

In one particular example described below, a hybrid rasterization/ray tracing approach is used in which work is distributed between the graphics cores 243 and ray tracing cores 245. In one example, the ray tracing cores 245 (and/or other cores 243, 244) include hardware support for a ray tracing instruction set such as Microsoft's DirectX Ray Tracing (DXR) which includes a DispatchRays command, as well as ray-generation, closest-hit, any-hit, and miss shaders, which enable the assignment of unique sets of shaders and textures for each object. Another ray tracing platform which may be supported by the ray tracing cores 245, graphics cores 243 and tensor cores 244 is Vulkan 1.1.85. Note, however, that the underlying principles of the invention are not limited to any particular ray tracing ISA.

In general, the various cores 245, 244, 243 may support a ray tracing instruction set that includes instructions/functions for ray generation, closest hit, any hit, ray-primitive intersection, per-primitive and hierarchical bounding box construction, miss, visit, and exceptions. More specifically, one example includes ray tracing instructions to perform the following functions:

Ray Generation—Ray generation instructions may be executed for each pixel, sample, or other user-defined work assignment.

Closest Hit—A closest hit instruction may be executed to locate the closest intersection point of a ray with primitives within a scene.

Any Hit—An any hit instruction identifies multiple intersections between a ray and primitives within a scene, potentially to identify a new closest intersection point.

Intersection—An intersection instruction performs a ray-primitive intersection test and outputs a result.

Per-primitive Bounding box Construction—This instruction builds a bounding box around a given primitive or group of primitives (e.g., when building a new BVH or other acceleration data structure).

Miss—Indicates that a ray misses all geometry within a scene, or specified region of a scene.

Visit—Indicates the children volumes a ray will traverse.

Exceptions—Includes various types of exception handlers (e.g., invoked for various error conditions).

Figure 2D:
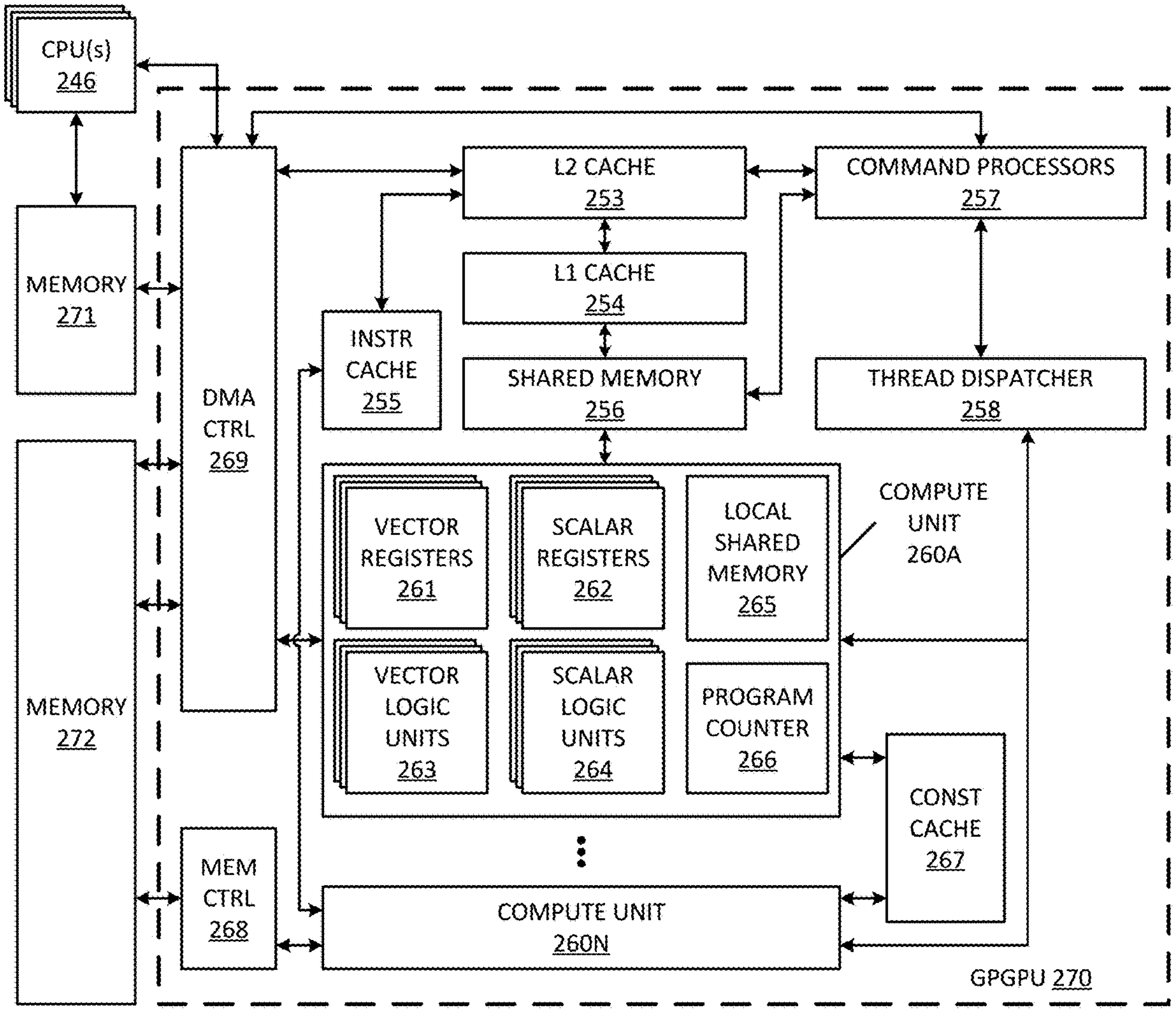

FIG. 2D is a block diagram of general purpose graphics processing unit (GPGPU) 270 that can be configured as a graphics processor and/or compute accelerator, according to examples described herein. The GPGPU 270 can interconnect with host processors (e.g., one or more CPU(s) 246) and memory 271, 272 via one or more system and/or memory busses. In one example the memory 271 is system memory that may be shared with the one or more CPU(s) 246, while memory 272 is device memory that is dedicated to the GPGPU 270. In one example, components within the GPGPU 270 and device memory 272 may be mapped into memory addresses that are accessible to the one or more CPU(s) 246. Access to memory 271 and 272 may be facilitated via a memory controller 268. In one example the memory controller 268 includes an internal direct memory access (DMA) controller 269 or can include logic to perform operations that would otherwise be performed by a DMA controller.

The GPGPU 270 includes multiple cache memories, including an L2 cache 253, L1 cache 254, an instruction cache 255, and shared memory 256, at least a portion of which may also be partitioned as a cache memory. The GPGPU 270 also includes multiple compute units 260A-260N. Each compute unit 260A-260N includes a set of vector registers 261, scalar registers 262, vector logic units 263, and scalar logic units 264. The compute units 260A-260N can also include local shared memory 265 and a program counter 266. The compute units 260A-260N can couple with a constant cache 267, which can be used to store constant data, which is data that will not change during the run of kernel or shader program that executes on the GPGPU 270. In one example the constant cache 267 is a scalar data cache and cached data can be fetched directly into the scalar registers 262.

During operation, the one or more CPU(s) 246 can write commands into registers or memory in the GPGPU 270 that has been mapped into an accessible address space. The command processors 257 can read the commands from registers or memory and determine how those commands will be processed within the GPGPU 270. A thread dispatcher 258 can then be used to dispatch threads to the compute units 260A-260N to perform those commands. Each compute unit 260A-260N can execute threads independently of the other compute units. Additionally, each compute unit 260A-260N can be independently configured for conditional computation and can conditionally output the results of computation to memory. The command processors 257 can interrupt the one or more CPU(s) 246 when the submitted commands are complete.

Figure 3A:
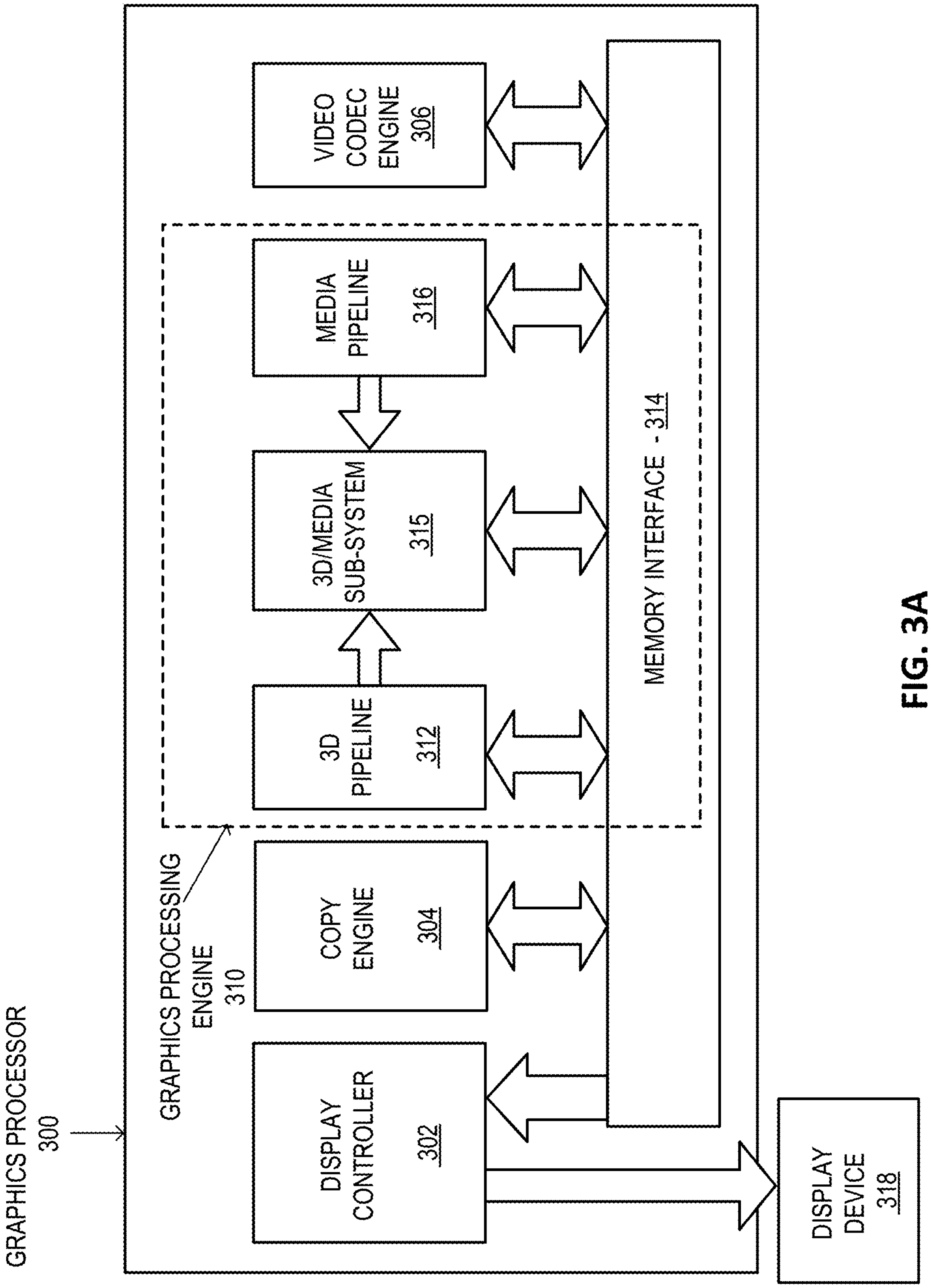
FIGS. 3A-3C illustrate block diagrams of additional graphics processor and compute accelerator architectures provided by examples described herein.
Figure 3B:
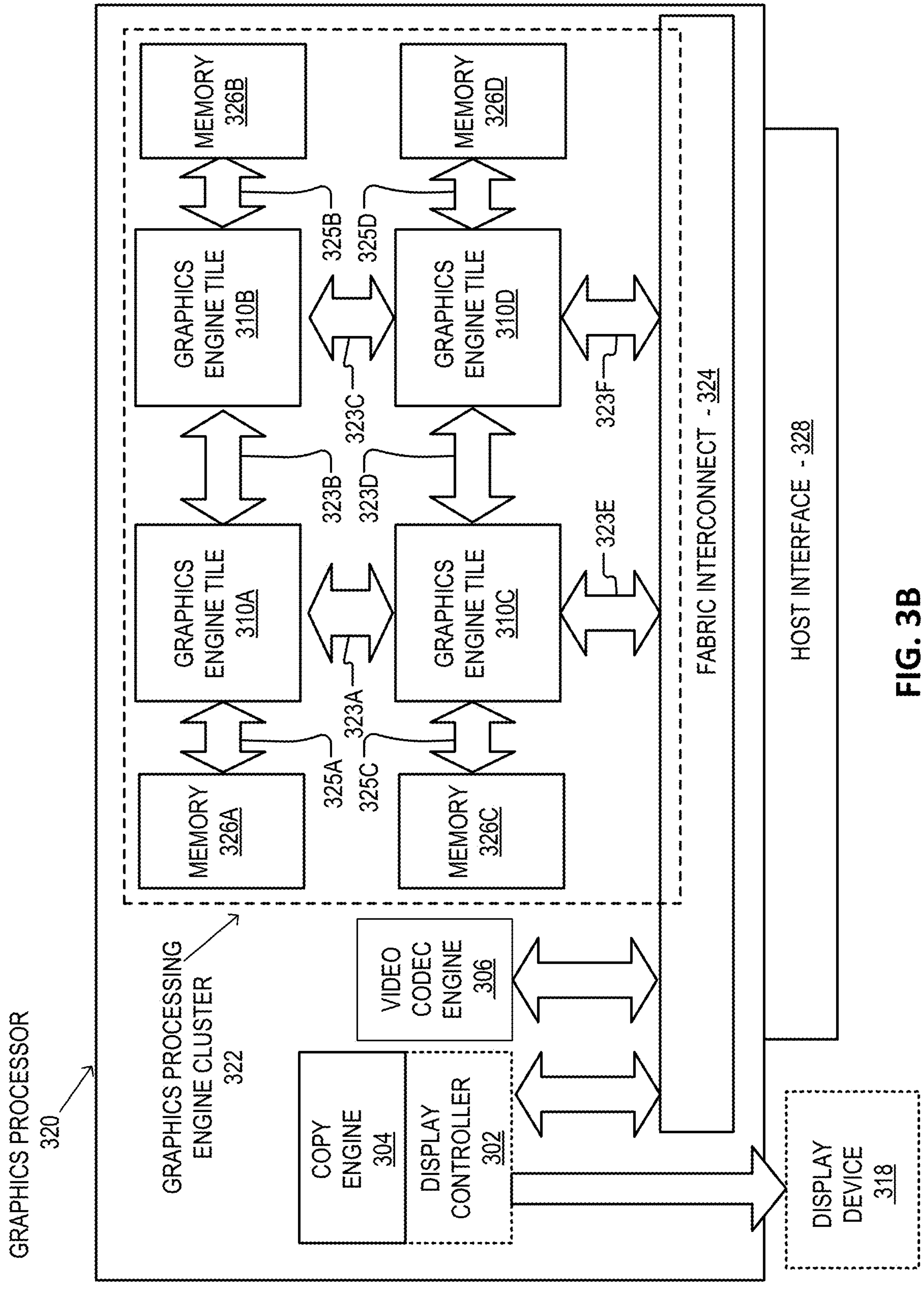
Figure 3C:
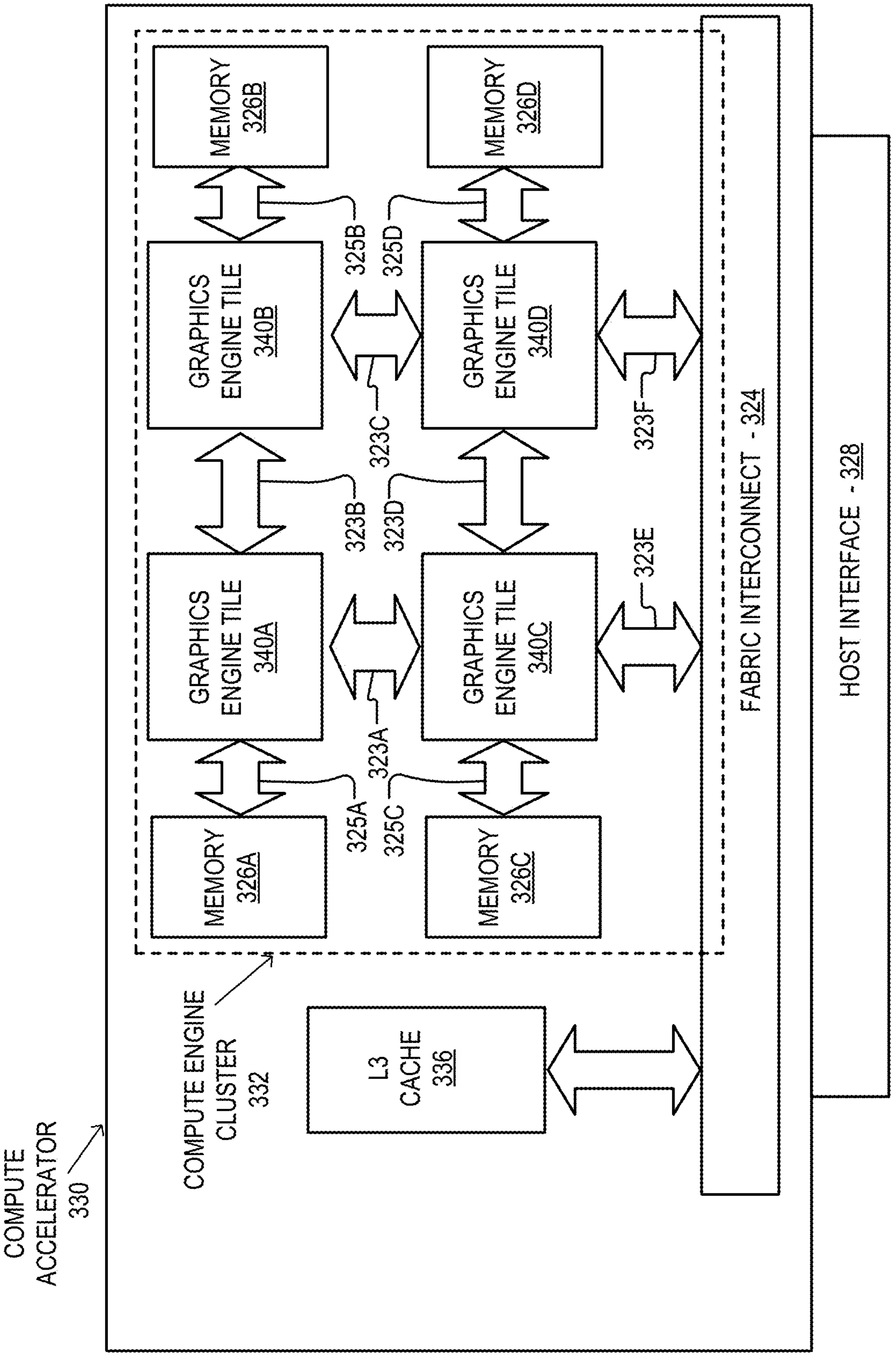

FIGS. 3A-3C illustrate block diagrams of additional graphics processor and compute accelerator architectures provided by examples described herein. The elements of FIGS. 3A-3C having the same reference numbers (or names) as the elements of any other figure herein can operate or function in any manner similar to that described elsewhere herein, but are not limited to such.

FIG. 3A is a block diagram of a graphics processor 300, which may be a discrete graphics processing unit, or may be a graphics processor integrated with a plurality of processing cores, or other semiconductor devices such as, but not limited to, memory devices or network interfaces. In some examples, the graphics processor communicates via a memory mapped I/O interface to registers on the graphics processor and with commands placed into the processor memory. In some examples, graphics processor 300 includes a memory interface 314 to access memory. Memory interface 314 can be an interface to local memory, one or more internal caches, one or more shared external caches, and/or to system memory.

In some examples, graphics processor 300 also includes a display controller 302 to drive display output data to a display device 318. Display controller 302 includes hardware for one or more overlay planes for the display and composition of multiple layers of video or user interface elements. The display device 318 can be an internal or external display device. In one example the display device 318 is a head mounted display device, such as a virtual reality (VR) display device or an augmented reality (AR) display device. In some examples, graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, H.265/HEVC, Alliance for Open Media (AOMedia) VP8, VP9, as well as the Society of Motion Picture & Television Engineers (SMPTE) 421M/VC-1, and Joint Photographic Experts Group (JPEG) formats such as JPEG, and Motion JPEG (MJPEG) formats.

In some examples, graphics processor 300 includes a block image transfer (BLIT) engine 304 to perform two-dimensional (2D) rasterizer operations including, for example, bit-boundary block transfers. However, in one example, 2D graphics operations are performed using one or more components of graphics processing engine (GPE) 310. In some examples, GPE 310 is a compute engine for performing graphics operations, including three-dimensional (3D) graphics operations and media operations.

In some examples, GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While 3D pipeline 312 can be used to perform media operations, an example of GPE 310 also includes a media pipeline 316 that is specifically used to perform media operations, such as video post-processing and image enhancement.

In some examples, media pipeline 316 includes fixed function or programmable logic units to perform one or more specialized media operations, such as video decode acceleration, video de-interlacing, and video encode acceleration in place of, or on behalf of video codec engine 306. In some examples, media pipeline 316 additionally includes a thread spawning unit to spawn threads for execution on 3D/Media sub-system 315. The spawned threads perform computations for the media operations on one or more graphics execution units included in 3D/Media sub-system 315.

In some examples, 3D/Media subsystem 315 includes logic for executing threads spawned by 3D pipeline 312 and media pipeline 316. In one example, the pipelines send thread execution requests to 3D/Media subsystem 315, which includes thread dispatch logic for arbitrating and dispatching the various requests to available thread execution resources. The execution resources include an array of graphics execution units to process the 3D and media threads. In some examples, 3D/Media subsystem 315 includes one or more internal caches for thread instructions and data. In some examples, the subsystem also includes shared memory, including registers and addressable memory, to share data between threads and to store output data.

FIG. 3B illustrates a graphics processor 320 having a tiled architecture, according to examples described herein. In one example the graphics processor 320 includes a graphics processing engine cluster 322 having multiple instances of the graphics processing engine 310 of FIG. 3A within a graphics engine tile 310A-310D. Each graphics engine tile 310A-310D can be interconnected via a set of tile interconnects 323A-323F. Each graphics engine tile 310A-310D can also be connected to a memory module or memory device 326A-326D via memory interconnects 325A-325D. The memory devices 326A-326D can use any graphics memory technology. For example, the memory devices 326A-326D may be graphics double data rate (GDDR) memory. The memory devices 326A-326D, in one example, are high-bandwidth memory (HBM) modules that can be on-die with their respective graphics engine tile 310A-310D. In one example the memory devices 326A-326D are stacked memory devices that can be stacked on top of their respective graphics engine tile 310A-310D. In one example, each graphics engine tile 310A-310D and associated memory 326A-326D reside on separate chiplets, which are bonded to a base die or base substrate, as described on further detail in FIGS. 11B-11D.

The graphics processing engine cluster 322 can connect with an on-chip or on-package fabric interconnect 324. The fabric interconnect 324 can enable communication between graphics engine tiles 310A-310D and components such as the video codec 306 and one or more copy engines 304. The copy engines 304 can be used to move data out of, into, and between the memory devices 326A-326D and memory that is external to the graphics processor 320 (e.g., system memory). The fabric interconnect 324 can also be used to interconnect the graphics engine tiles 310A-310D. The graphics processor 320 may optionally include a display controller 302 to enable a connection with an external display device 318. The graphics processor may also be configured as a graphics or compute accelerator. In the accelerator configuration, the display controller 302 and display device 318 may be omitted.

The graphics processor 320 can connect to a host system via a host interface 328. The host interface 328 can enable communication between the graphics processor 320, system memory, and/or other system components. The host interface 328 can be, for example a PCI express bus or another type of host system interface.

FIG. 3C illustrates a compute accelerator 330, according to examples described herein. The compute accelerator 330 can include architectural similarities with the graphics processor 320 of FIG. 3B and is optimized for compute acceleration. A compute engine cluster 332 can include a set of compute engine tiles 340A-340D that include execution logic that is optimized for parallel or vector-based general-purpose compute operations. In some examples, the compute engine tiles 340A-340D do not include fixed function graphics processing logic, although in one example one or more of the compute engine tiles 340A-340D can include logic to perform media acceleration. The compute engine tiles 340A-340D can connect to memory 326A-326D via memory interconnects 325A-325D. The memory 326A-326D and memory interconnects 325A-325D may be similar technology as in graphics processor 320, or can be different. The graphics compute engine tiles 340A-340D can also be interconnected via a set of tile interconnects 323A-323F and may be connected with and/or interconnected by a fabric interconnect 324. In one example the compute accelerator 330 includes a large L3 cache 336 that can be configured as a device-wide cache. The compute accelerator 330 can also connect to a host processor and memory via a host interface 328 in a similar manner as the graphics processor 320 of FIG. 3B.

Graphics Processing Engine

Figure 4:
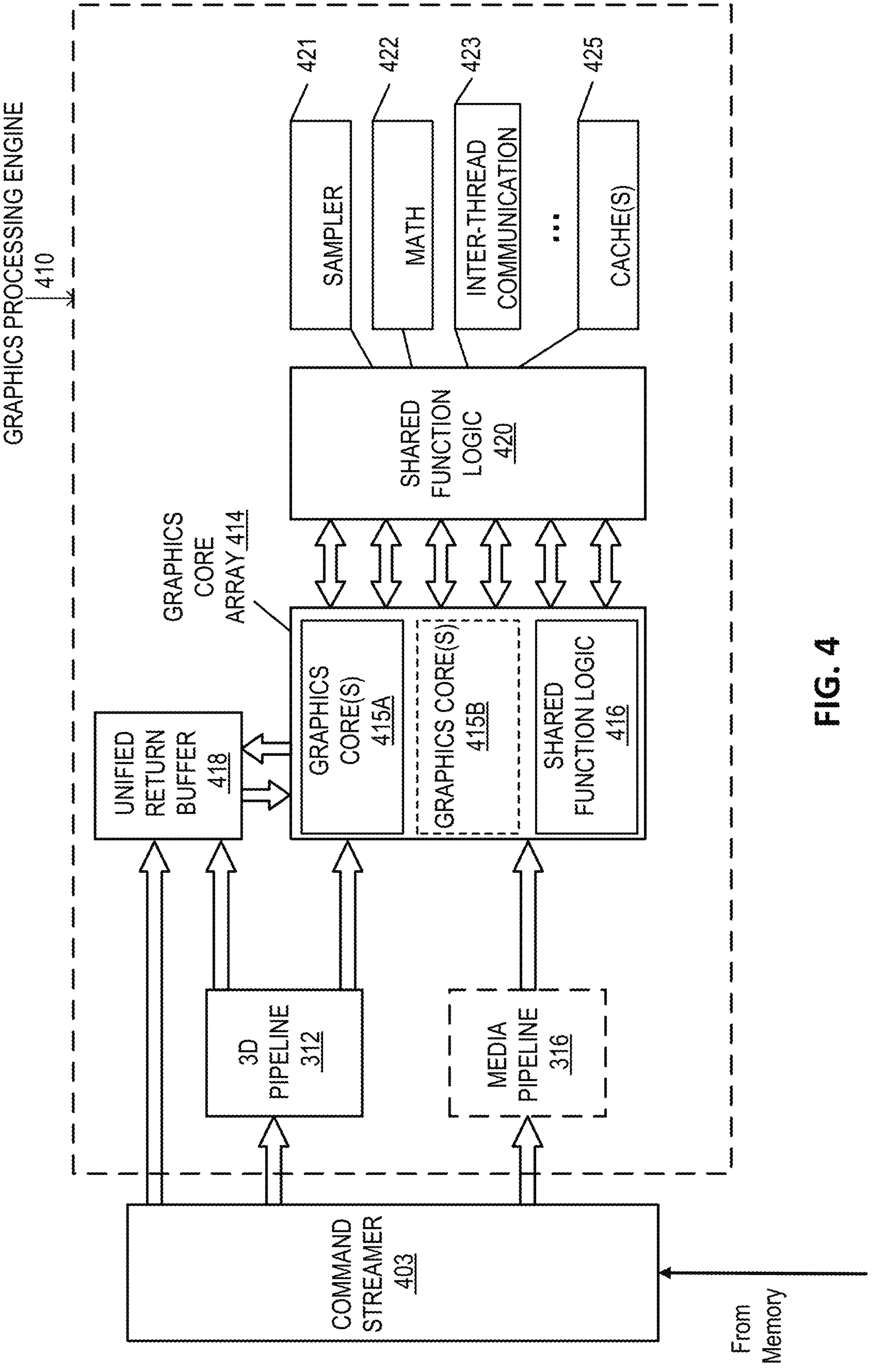
FIG. 4 is a block diagram of a graphics processing engine of a graphics processor in accordance with some examples.

FIG. 4 is a block diagram of a graphics processing engine 410 of a graphics processor in accordance with some examples. In one example, the graphics processing engine (GPE) 410 is a version of the GPE 310 shown in FIG. 3A, and may also represent a graphics engine tile 310A-310D of FIG. 3B. Elements of FIG. 4 having the same reference numbers (or names) as the elements of any other figure herein can operate or function in any manner similar to that described elsewhere herein, but are not limited to such. For example, the 3D pipeline 312 and media pipeline 316 of FIG. 3A are illustrated. The media pipeline 316 is optional in some examples of the GPE 410 and may not be explicitly included within the GPE 410. For example, and in at least one example, a separate media and/or image processor is coupled to the GPE 410.

In some examples, GPE 410 couples with or includes a command streamer 403, which provides a command stream to the 3D pipeline 312 and/or media pipelines 316. In some examples, command streamer 403 is coupled with memory, which can be system memory, or one or more of internal cache memory and shared cache memory. In some examples, command streamer 403 receives commands from the memory and sends the commands to 3D pipeline 312 and/or media pipeline 316. The commands are directives fetched from a ring buffer, which stores commands for the 3D pipeline 312 and media pipeline 316. In one example, the ring buffer can additionally include batch command buffers storing batches of multiple commands. The commands for the 3D pipeline 312 can also include references to data stored in memory, such as but not limited to vertex and geometry data for the 3D pipeline 312 and/or image data and memory objects for the media pipeline 316. The 3D pipeline 312 and media pipeline 316 process the commands and data by performing operations via logic within the respective pipelines or by dispatching one or more execution threads to a graphics core array 414. In one example the graphics core array 414 include one or more blocks of graphics cores (e.g., graphics core(s) 415A, graphics core(s) 415B), each block including one or more graphics cores. Each graphics core includes a set of graphics execution resources that includes general-purpose and graphics specific execution logic to perform graphics and compute operations, as well as fixed function texture processing and/or machine learning and artificial intelligence acceleration logic.

In various examples the 3D pipeline 312 can include fixed function and programmable logic to process one or more shader programs, such as vertex shaders, geometry shaders, pixel shaders, fragment shaders, compute shaders, or other shader programs, by processing the instructions and dispatching execution threads to the graphics core array 414. The graphics core array 414 provides a unified block of execution resources for use in processing these shader programs. Multi-purpose execution logic (e.g., execution units) within the graphics core(s) 415A-414B of the graphic core array 414 includes support for various 3D API shader languages and can execute multiple simultaneous execution threads associated with multiple shaders.

In some examples, the graphics core array 414 includes execution logic to perform media functions, such as video and/or image processing. In one example, the execution units include general-purpose logic that is programmable to perform parallel general-purpose computational operations, in addition to graphics processing operations. The general-purpose logic can perform processing operations in parallel or in conjunction with general-purpose logic within the processor core(s) 107 of FIG. 1 or core 202A-202N as in FIG. 2A.

Output data generated by threads executing on the graphics core array 414 can output data to memory in a unified return buffer (URB) 418. The URB 418 can store data for multiple threads. In some examples the URB 418 may be used to send data between different threads executing on the graphics core array 414. In some examples the URB 418 may additionally be used for synchronization between threads on the graphics core array and fixed function logic within the shared function logic 420.

In some examples, graphics core array 414 is scalable, such that the array includes a variable number of graphics cores, each having a variable number of execution units based on the target power and performance level of GPE 410. In one example the execution resources are dynamically scalable, such that execution resources may be enabled or disabled as needed.

The graphics core array 414 couples with shared function logic 420 that includes multiple resources that are shared between the graphics cores in the graphics core array. The shared functions within the shared function logic 420 are hardware logic units that provide specialized supplemental functionality to the graphics core array 414. In various examples, shared function logic 420 includes but is not limited to sampler 421, math 422, and inter-thread communication (ITC) 423 logic. Additionally, some examples implement one or more cache(s) 425 within the shared function logic 420.

A shared function is implemented at least in a case where the demand for a given specialized function is insufficient for inclusion within the graphics core array 414. Instead a single instantiation of that specialized function is implemented as a stand-alone entity in the shared function logic 420 and shared among the execution resources within the graphics core array 414. The precise set of functions that are shared between the graphics core array 414 and included within the graphics core array 414 varies across examples. In some examples, specific shared functions within the shared function logic 420 that are used extensively by the graphics core array 414 may be included within shared function logic 416 within the graphics core array 414. In various examples, the shared function logic 416 within the graphics core array 414 can include some or all logic within the shared function logic 420. In one example, all logic elements within the shared function logic 420 may be duplicated within the shared function logic 416 of the graphics core array 414. In one example the shared function logic 420 is excluded in favor of the shared function logic 416 within the graphics core array 414.

Execution Units

Figure 5A:
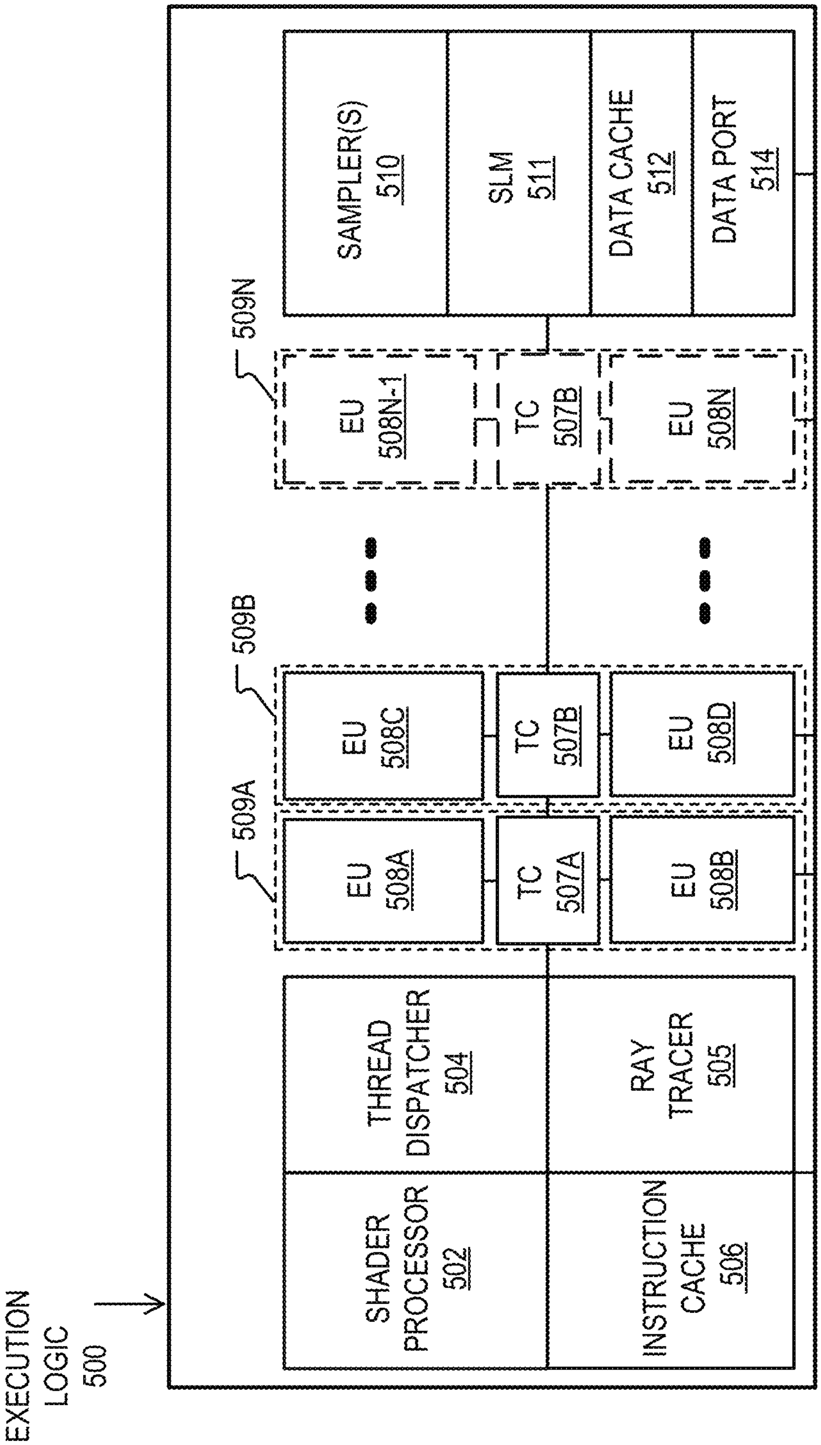
FIGS. 5A-5B illustrate thread execution logic including an array of processing elements employed in a graphics processor core according to examples described herein.
Figure 5B:
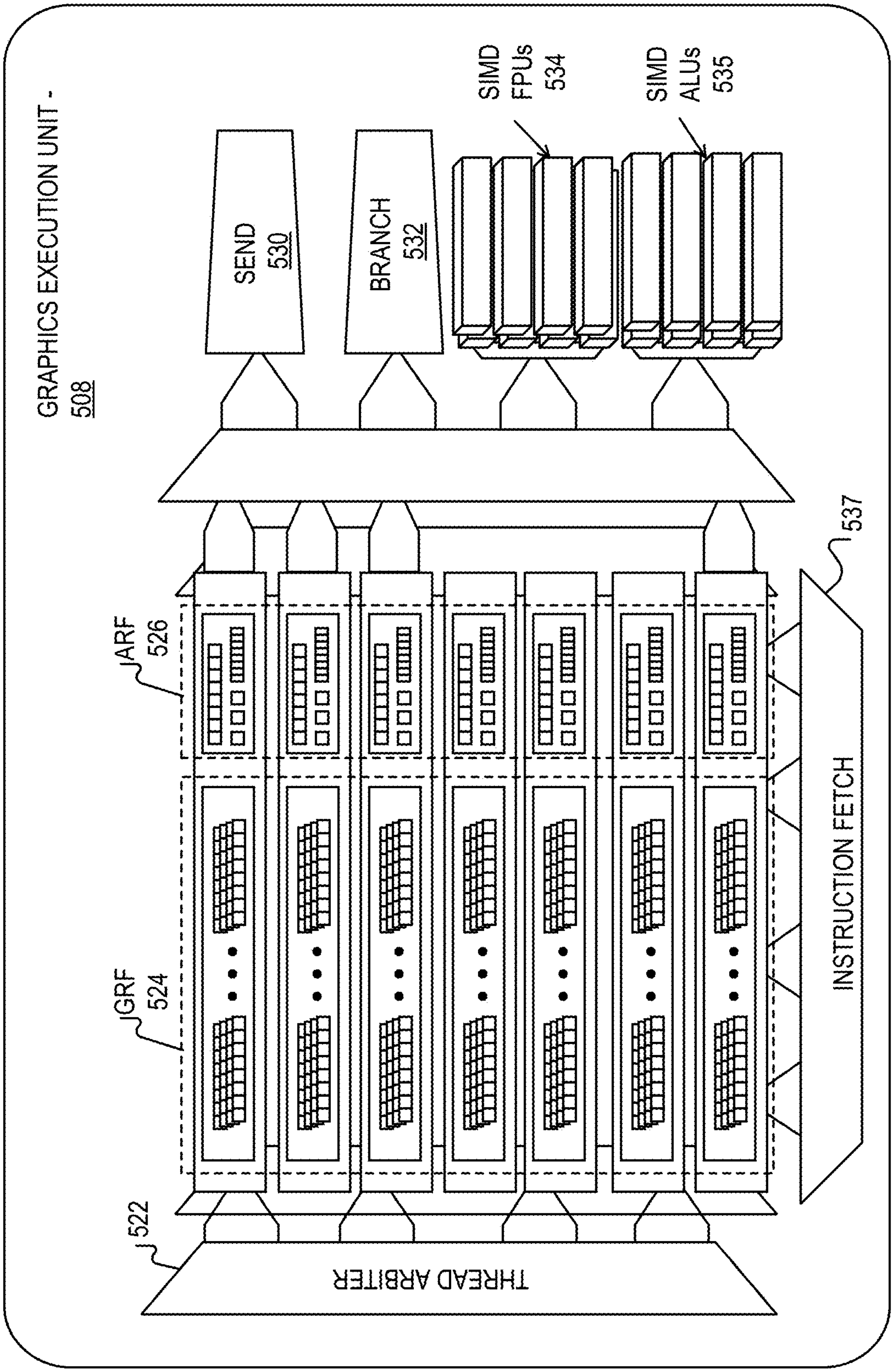

FIGS. 5A-5B illustrate thread execution logic 500 including an array of processing elements employed in a graphics processor core according to examples described herein. Elements of FIGS. 5A-5B having the same reference numbers (or names) as the elements of any other figure herein can operate or function in any manner similar to that described elsewhere herein, but are not limited to such. FIG. 5A-5B illustrates an overview of thread execution logic 500, which may be representative of hardware logic illustrated with each sub-core 221A-221F of FIG. 2B. FIG. 5A is representative of an execution unit within a general-purpose graphics processor, while FIG. 5B is representative of an execution unit that may be used within a compute accelerator.

As illustrated in FIG. 5A, in some examples thread execution logic 500 includes a shader processor 502, a thread dispatcher 504, instruction cache 506, a scalable execution unit array including a plurality of execution units 508A-508N, a sampler 510, shared local memory 511, a data cache 512, and a data port 514. In one example the scalable execution unit array can dynamically scale by enabling or disabling one or more execution units (e.g., any of execution units 508A, 508B, 508C, 508D, through 508N-1 and 508N) based on the computational requirements of a workload. In one example the included components are interconnected via an interconnect fabric that links to each of the components. In some examples, thread execution logic 500 includes one or more connections to memory, such as system memory or cache memory, through one or more of instruction cache 506, data port 514, sampler 510, and execution units 508A-508N. In some examples, each execution unit (e.g. 508A) is a stand-alone programmable general-purpose computational unit that is capable of executing multiple simultaneous hardware threads while processing multiple data elements in parallel for each thread. In various examples, the array of execution units 508A-508N is scalable to include any number individual execution units.

In some examples, the execution units 508A-508N are primarily used to execute shader programs. A shader processor 502 can process the various shader programs and dispatch execution threads associated with the shader programs via a thread dispatcher 504. In one example the thread dispatcher includes logic to arbitrate thread initiation requests from the graphics and media pipelines and instantiate the requested threads on one or more execution unit in the execution units 508A-508N. For example, a geometry pipeline can dispatch vertex, tessellation, or geometry shaders to the thread execution logic for processing. In some examples, thread dispatcher 504 can also process runtime thread spawning requests from the executing shader programs.

In some examples, the execution units 508A-508N support an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders). Each of the execution units 508A-508N is capable of multi-issue single instruction multiple data (SIMD) execution and multi-threaded operation enables an efficient execution environment in the face of higher latency memory accesses. Each hardware thread within each execution unit has a dedicated high-bandwidth register file and associated independent thread-state. Execution is multi-issue per clock to pipelines capable of integer, single and double precision floating point operations, SIMD branch capability, logical operations, transcendental operations, and other miscellaneous operations. While waiting for data from memory or one of the shared functions, dependency logic within the execution units 508A-508N causes a waiting thread to sleep until the requested data has been returned. While the waiting thread is sleeping, hardware resources may be devoted to processing other threads. For example, during a delay associated with a vertex shader operation, an execution unit can perform operations for a pixel shader, fragment shader, or another type of shader program, including a different vertex shader. Various examples can apply to use execution by use of Single Instruction Multiple Thread (SIMT) as an alternate to use of SIMD or in addition to use of SIMD. Reference to a SIMD core or operation can apply also to SIMT or apply to SIMD in combination with SIMT.

Each execution unit in execution units 508A-508N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some examples, execution units 508A-508N support integer and floating-point data types.

The execution unit instruction set includes SIMD instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 54-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

In one example one or more execution units can be combined into a fused execution unit 509A-509N having thread control logic (507A-507N) that is common to the fused EUs. Multiple EUs can be fused into an EU group. Each EU in the fused EU group can be configured to execute a separate SIMD hardware thread. The number of EUs in a fused EU group can vary according to examples. Additionally, various SIMD widths can be performed per-EU, including but not limited to SIMD8, SIMD16, and SIMD32. Each fused graphics execution unit 509A-509N includes at least two execution units. For example, fused execution unit 509A includes a first EU 508A, second EU 508B, and thread control logic 507A that is common to the first EU 508A and the second EU 508B. The thread control logic 507A controls threads executed on the fused graphics execution unit 509A, allowing each EU within the fused execution units 509A-509N to execute using a common instruction pointer register.

One or more internal instruction caches (e.g., 506) are included in the thread execution logic 500 to cache thread instructions for the execution units. In some examples, one or more data caches (e.g., 512) are included to cache thread data during thread execution. Threads executing on the execution logic 500 can also store explicitly managed data in the shared local memory 511. In some examples, a sampler 510 is included to provide texture sampling for 3D operations and media sampling for media operations. In some examples, sampler 510 includes specialized texture or media sampling functionality to process texture or media data during the sampling process before providing the sampled data to an execution unit.

During execution, the graphics and media pipelines send thread initiation requests to thread execution logic 500 via thread spawning and dispatch logic. Once a group of geometric objects has been processed and rasterized into pixel data, pixel processor logic (e.g., pixel shader logic, fragment shader logic, etc.) within the shader processor 502 is invoked to further compute output information and cause results to be written to output surfaces (e.g., color buffers, depth buffers, stencil buffers, etc.). In some examples, a pixel shader or fragment shader calculates the values of the various vertex attributes that are to be interpolated across the rasterized object. In some examples, pixel processor logic within the shader processor 502 then executes an application programming interface (API)-supplied pixel or fragment shader program. To execute the shader program, the shader processor 502 dispatches threads to an execution unit (e.g., 508A) via thread dispatcher 504. In some examples, shader processor 502 uses texture sampling logic in the sampler 510 to access texture data in texture maps stored in memory. Arithmetic operations on the texture data and the input geometry data compute pixel color data for each geometric fragment, or discards one or more pixels from further processing.

In some examples, the data port 514 provides a memory access mechanism for the thread execution logic 500 to output processed data to memory for further processing on a graphics processor output pipeline. In some examples, the data port 514 includes or couples to one or more cache memories (e.g., data cache 512) to cache data for memory access via the data port.

In one example, the execution logic 500 can also include a ray tracer 505 that can provide ray tracing acceleration functionality. The ray tracer 505 can support a ray tracing instruction set that includes instructions/functions for ray generation. The ray tracing instruction set can be similar to or different from the ray-tracing instruction set supported by the ray tracing cores 245 in FIG. 2C.

FIG. 5B illustrates exemplary internal details of an execution unit 508, according to examples. A graphics execution unit 508 can include an instruction fetch unit 537, a general register file array (GRF) 524, an architectural register file array (ARF) 526, a thread arbiter 522, a send unit 530, a branch unit 532, a set of SIMD floating point units (FPUs) 534, and in one example a set of dedicated integer SIMD ALUs 535. The GRF 524 and ARF 526 includes the set of general register files and architecture register files associated with each simultaneous hardware thread that may be active in the graphics execution unit 508. In one example, per thread architectural state is maintained in the ARF 526, while data used during thread execution is stored in the GRF 524. The execution state of each thread, including the instruction pointers for each thread, can be held in thread-specific registers in the ARF 526.

In one example the graphics execution unit 508 has an architecture that is a combination of Simultaneous Multi-Threading (SMT) and fine-grained Interleaved Multi-Threading (IMT). The architecture has a modular configuration that can be fine-tuned at design time based on a target number of simultaneous threads and number of registers per execution unit, where execution unit resources are divided across logic used to execute multiple simultaneous threads. The number of logical threads that may be executed by the graphics execution unit 508 is not limited to the number of hardware threads, and multiple logical threads can be assigned to each hardware thread.

In one example, the graphics execution unit 508 can co-issue multiple instructions, which may each be different instructions. The thread arbiter 522 of the graphics execution unit thread 508 can dispatch the instructions to one of the send unit 530, branch unit 532, or SIMD FPU(s) 534 for execution. Each execution thread can access 128 general-purpose registers within the GRF 524, where each register can store 32 bytes, accessible as a SIMD 8-element vector of 32-bit data elements. In one example, each execution unit thread has access to 4 Kbytes within the GRF 524, although examples are not so limited, and greater or fewer register resources may be provided in other examples. In one example the graphics execution unit 508 is partitioned into seven hardware threads that can independently perform computational operations, although the number of threads per execution unit can also vary according to examples. For example, in one example up to 16 hardware threads are supported. In an example in which seven threads may access 4 Kbytes, the GRF 524 can store a total of 28 Kbytes. Where 16 threads may access 4 Kbytes, the GRF 524 can store a total of 64 Kbytes. Flexible addressing modes can permit registers to be addressed together to build effectively wider registers or to represent strided rectangular block data structures.

In one example, memory operations, sampler operations, and other longer-latency system communications are dispatched via "send" instructions that are executed by the message passing send unit 530. In one example, branch instructions are dispatched to a dedicated branch unit 532 to facilitate SIMD divergence and eventual convergence.

In one example the graphics execution unit 508 includes one or more SIMD floating point units (FPU(s)) 534 to perform floating-point operations. In one example, the FPU (s) 534 also support integer computation. In one example the FPU(s) 534 can SIMD execute up to M number of 32-bit floating-point (or integer) operations, or SIMD execute up to 2M 16-bit integer or 16-bit floating-point operations. In one example, at least one of the FPU(s) provides extended math capability to support high-throughput transcendental math functions and double precision 54-bit floating-point. In some examples, a set of 8-bit integer SIMD ALUs 535 are also present, and may be specifically optimized to perform operations associated with machine learning computations.

In one example, arrays of multiple instances of the graphics execution unit 508 can be instantiated in a graphics sub-core grouping (e.g., a sub-slice). For scalability, product architects can choose the exact number of execution units per sub-core grouping. In one example the execution unit 508 can execute instructions across a plurality of execution channels. In a further example, each thread executed on the graphics execution unit 508 is executed on a different channel.

Figure 6:
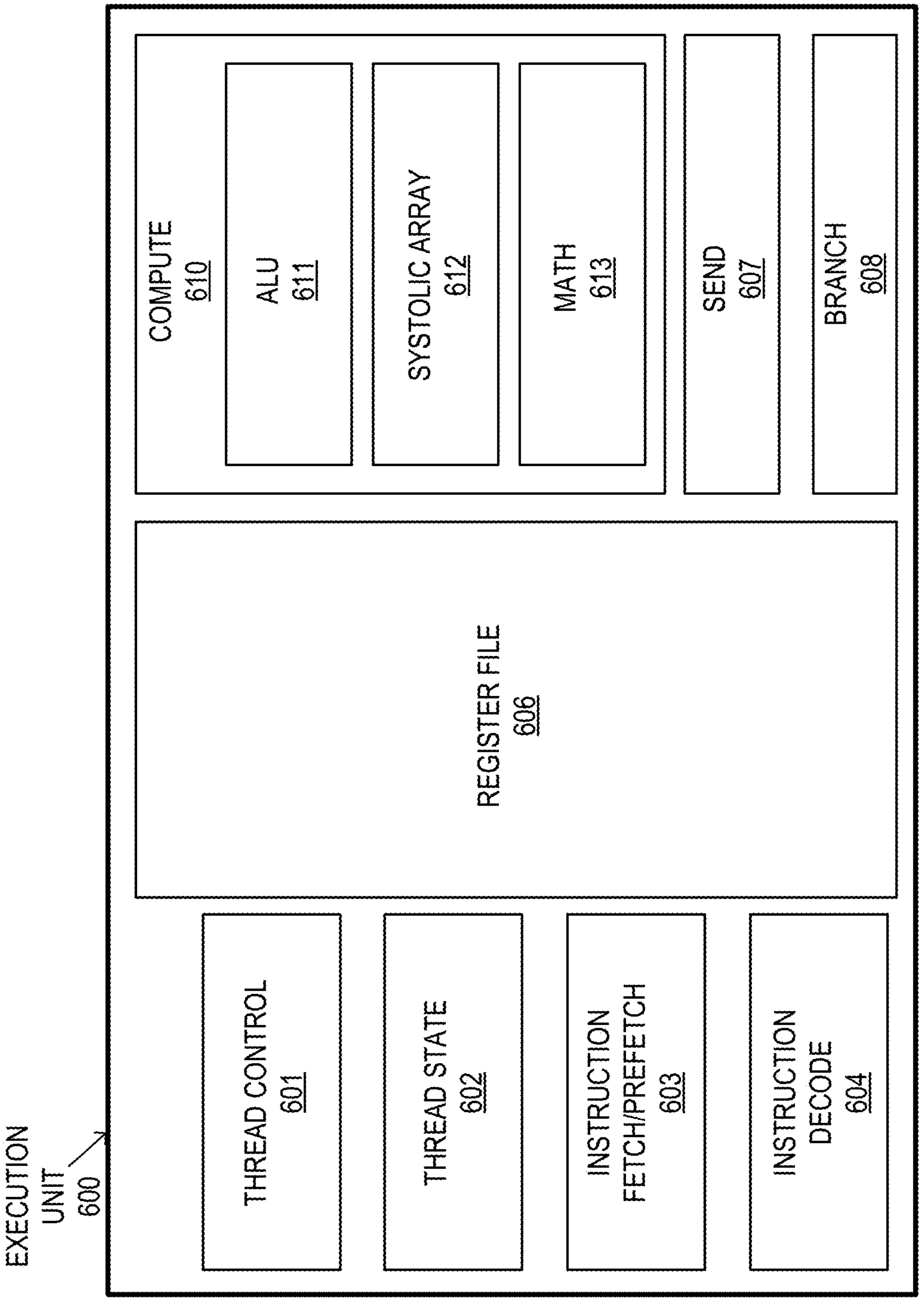
FIG. 6 illustrates an additional execution unit, according to an example.

FIG. 6 illustrates an additional execution unit 600, according to an example. The execution unit 600 may be a compute-optimized execution unit for use in, for example, a compute engine tile 340A-340D as in FIG. 3C, but is not limited as such. Variants of the execution unit 600 may also be used in a graphics engine tile 310A-310D as in FIG. 3B. In one example, the execution unit 600 includes a thread control unit 601, a thread state unit 602, an instruction fetch/prefetch unit 603, and an instruction decode unit 604. The execution unit 600 additionally includes a register file 606 that stores registers that can be assigned to hardware threads within the execution unit. The execution unit 600 additionally includes a send unit 607 and a branch unit 608. In one example, the send unit 607 and branch unit 608 can operate similarly as the send unit 530 and a branch unit 532 of the graphics execution unit 508 of FIG. 5B.

The execution unit 600 also includes a compute unit 610 that includes multiple different types of functional units. In one example the compute unit 610 includes an ALU unit 611 that includes an array of arithmetic logic units. The ALU unit 611 can be configured to perform 64-bit, 32-bit, and 16-bit integer and floating point operations. Integer and floating point operations may be performed simultaneously. The compute unit 610 can also include a systolic array 612, and a math unit 613. The systolic array 612 includes a W wide and D deep network of data processing units that can be used to perform vector or other data-parallel operations in a systolic manner. In one example the systolic array 612 can be configured to perform matrix operations, such as matrix dot product operations. In one example the systolic array 612 support 16-bit floating point operations, as well as 8-bit and 4-bit integer operations. In one example the systolic array 612 can be configured to accelerate machine learning operations. In such examples, the systolic array 612 can be configured with support for the bfloat 16-bit floating point format. In one example, a math unit 613 can be included to perform a specific subset of mathematical operations in an efficient and lower-power manner than then ALU unit 611. The math unit 613 can include a variant of math logic that may be found in shared function logic of a graphics processing engine provided by other examples (e.g., math logic 422 of the shared function logic 420 of FIG. 4). In one example the math unit 613 can be configured to perform 32-bit and 64-bit floating point operations.

The thread control unit 601 includes logic to control the execution of threads within the execution unit. The thread control unit 601 can include thread arbitration logic to start, stop, and preempt execution of threads within the execution unit 600. The thread state unit 602 can be used to store thread state for threads assigned to execute on the execution unit 600. Storing the thread state within the execution unit 600 enables the rapid pre-emption of threads when those threads become blocked or idle. The instruction fetch/prefetch unit 603 can fetch instructions from an instruction cache of higher level execution logic (e.g., instruction cache 506 as in FIG. 5A). The instruction fetch/prefetch unit 603 can also issue prefetch requests for instructions to be loaded into the instruction cache based on an analysis of currently executing threads. The instruction decode unit 604 can be used to decode instructions to be executed by the compute units. In one example, the instruction decode unit 604 can be used as a secondary decoder to decode complex instructions into constituent micro-operations.

The execution unit 600 additionally includes a register file 606 that can be used by hardware threads executing on the execution unit 600. Registers in the register file 606 can be divided across the logic used to execute multiple simultaneous threads within the compute unit 610 of the execution unit 600. The number of logical threads that may be executed by the graphics execution unit 600 is not limited to the number of hardware threads, and multiple logical threads can be assigned to each hardware thread. The size of the register file 606 can vary across examples based on the number of supported hardware threads. In one example, register renaming may be used to dynamically allocate registers to hardware threads.

Figure 7:
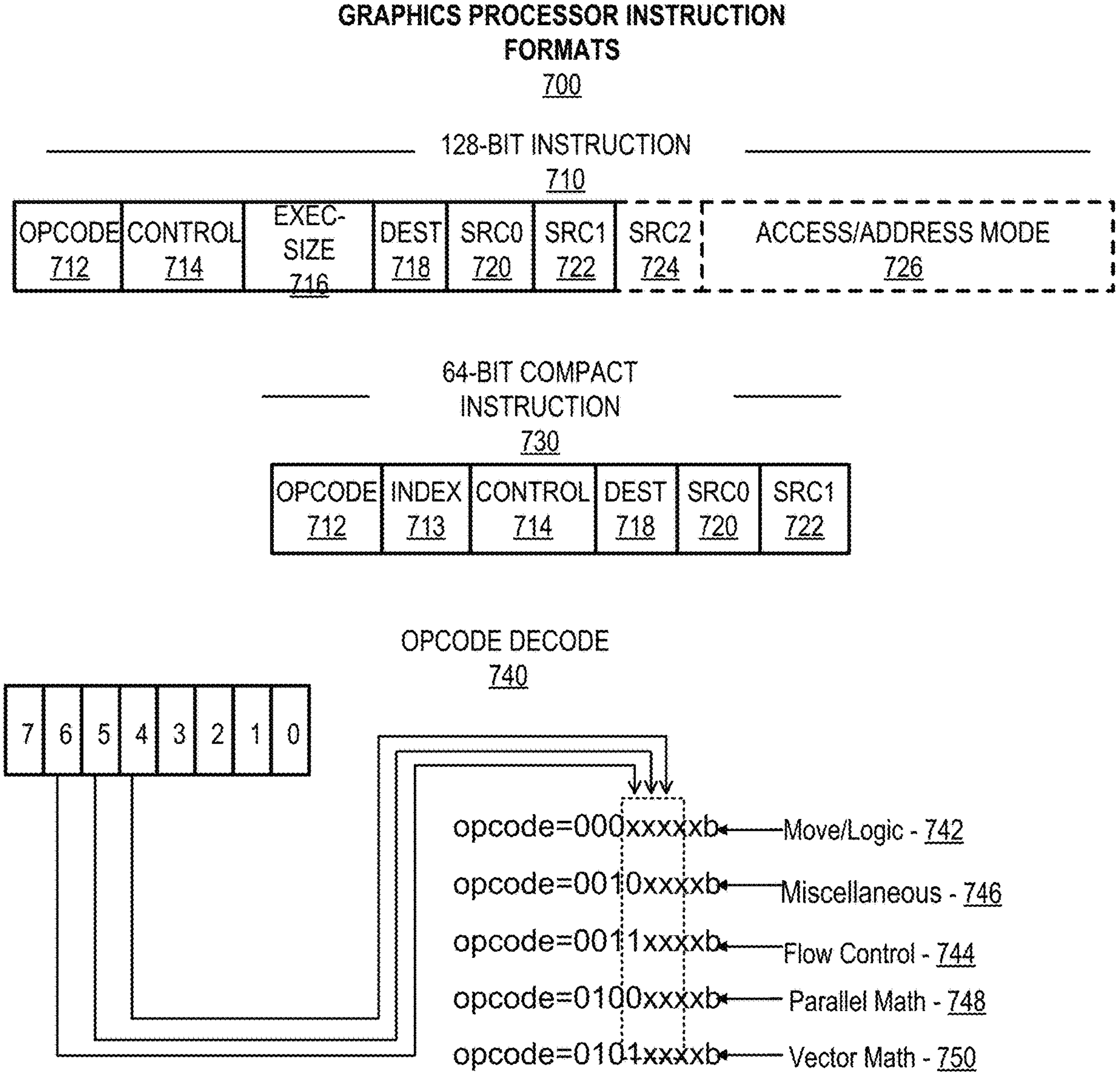
FIG. 7 is a block diagram illustrating graphics processor instruction formats according to some examples.

FIG. 7 is a block diagram illustrating a graphics processor instruction formats 700 according to some examples. In one or more example, the graphics processor execution units support an instruction set having instructions in multiple formats. The solid lined boxes illustrate the components that are generally included in an execution unit instruction, while the dashed lines include components that are optional or that are only included in a sub-set of the instructions. In some examples, instruction format 700 described and illustrated are macro-instructions, in that they are instructions supplied to the execution unit, as opposed to micro-operations resulting from instruction decode once the instruction is processed.

In some examples, the graphics processor execution units natively support instructions in a 128-bit instruction format 710. A 64-bit compacted instruction format 730 is available for some instructions based on the selected instruction, instruction options, and number of operands. The native 128-bit instruction format 710 provides access to all instruction options, while some options and operations are restricted in the 64-bit format 730. The native instructions available in the 64-bit format 730 vary by example. In some examples, the instruction is compacted in part using a set of index values in an index field 713. The execution unit hardware references a set of compaction tables based on the index values and uses the compaction table outputs to reconstruct a native instruction in the 128-bit instruction format 710. Other sizes and formats of instruction can be used.

For each format, instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some examples, instruction control field 714 enables control over certain execution options, such as channels selection (e.g., predication) and data channel order (e.g., swizzle). For instructions in the 128-bit instruction format 710 an exec-size field 716 limits the number of data channels that will be executed in parallel. In some examples, exec-size field 716 is not available for use in the 64-bit compact instruction format 730.

Some execution unit instructions have up to three operands including two source operands, src0 720, src1 722, and one destination 718. In some examples, the execution units support dual destination instructions, where one of the destinations is implied. Data manipulation instructions can have a third source operand (e.g., SRC2 724), where the instruction opcode 712 determines the number of source operands. An instruction's last source operand can be an immediate (e.g., hard-coded) value passed with the instruction.

In some examples, the 128-bit instruction format 710 includes an access/address mode field 726 specifying, for example, whether direct register addressing mode or indirect register addressing mode is used. When direct register addressing mode is used, the register address of one or more operands is directly provided by bits in the instruction.

In some examples, the 128-bit instruction format 710 includes an access/address mode field 726, which specifies an address mode and/or an access mode for the instruction. In one example the access mode is used to define a data access alignment for the instruction. Some examples support access modes including a 16-byte aligned access mode and a 1-byte aligned access mode, where the byte alignment of the access mode determines the access alignment of the instruction operands. For example, when in a first mode, the instruction may use byte-aligned addressing for source and destination operands and when in a second mode, the instruction may use 16-byte-aligned addressing for all source and destination operands.

In one example, the address mode portion of the access/address mode field 726 determines whether the instruction is to use direct or indirect addressing. When direct register addressing mode is used bits in the instruction directly provide the register address of one or more operands. When indirect register addressing mode is used, the register address of one or more operands may be computed based on an address register value and an address immediate field in the instruction.

In some examples instructions are grouped based on opcode 712 bit-fields to simplify Opcode decode 740. For an 8-bit opcode, bits 4, 5, and 6 allow the execution unit to determine the type of opcode. The precise opcode grouping shown is merely an example. In some examples, a move and logic opcode group 742 includes data movement and logic instructions (e.g., move (mov), compare (cmp)). In some examples, move and logic group 742 shares the five most significant bits (MSB), where move (mov) instructions are in the form of 0000xxxxb and logic instructions are in the form of 0001xxxxb. A flow control instruction group 744 (e.g., call, jump (jmp)) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, multiply (mul)) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands. The illustrated opcode decode 740, in one example, can be used to determine which portion of an execution unit will be used to execute a decoded instruction. For example, some instructions may be designated as systolic instructions that will be performed by a systolic array. Other instructions, such as ray-tracing instructions (not shown) can be routed to a ray-tracing core or ray-tracing logic within a slice or partition of execution logic.

Graphics Pipeline

Figure 8:
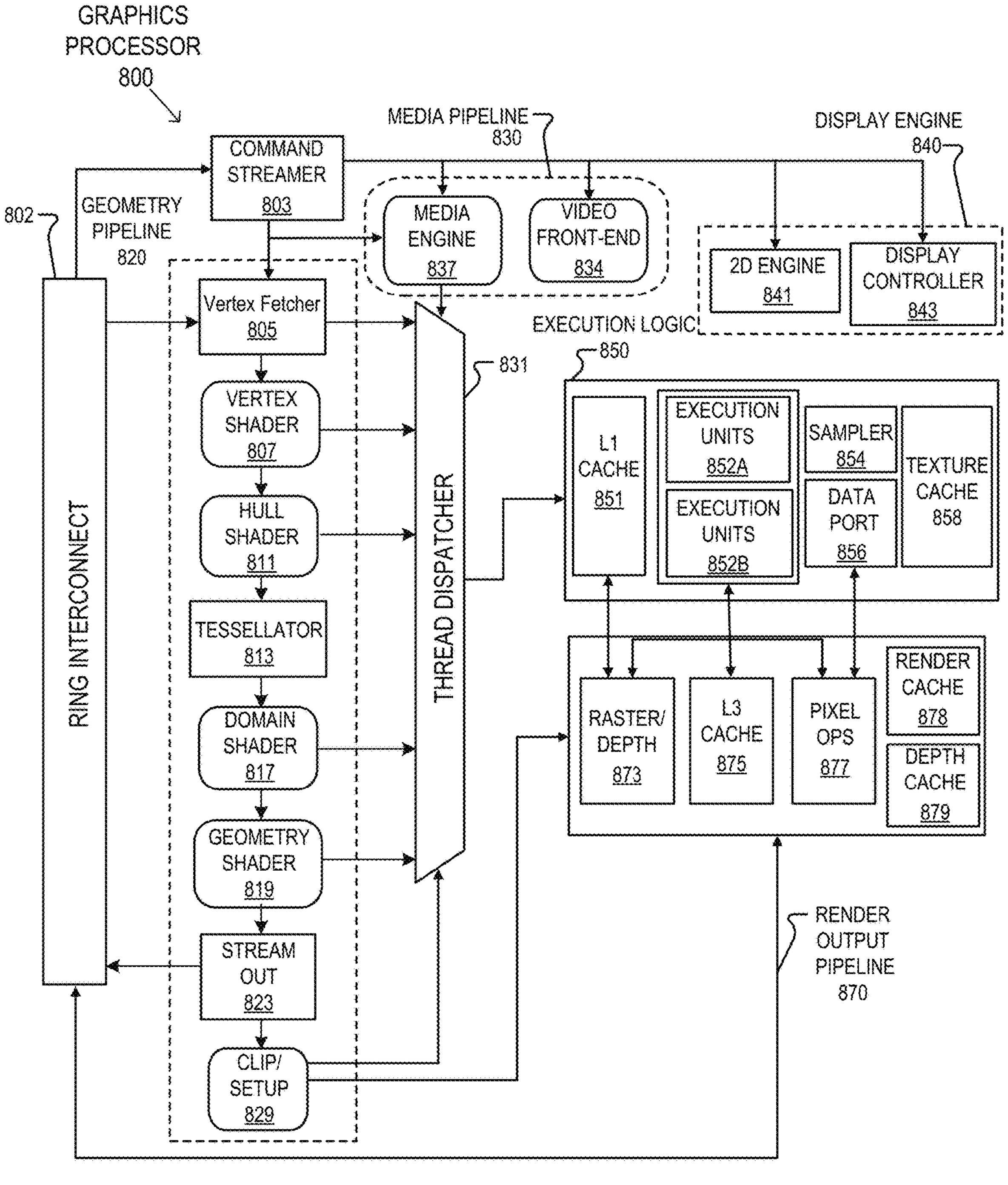
FIG. 8 is a block diagram of another example of a graphics processor.

FIG. 8 is a block diagram of another example of a graphics processor 800. Elements of FIG. 8 having the same reference numbers (or names) as the elements of any other figure herein can operate or function in any manner similar to that described elsewhere herein, but are not limited to such.

In some examples, graphics processor 800 includes a geometry pipeline 820, a media pipeline 830, a display engine 840, thread execution logic 850, and a render output pipeline 870. In some examples, graphics processor 800 is a graphics processor within a multi-core processing system that includes one or more general-purpose processing cores. The graphics processor is controlled by register writes to one or more control registers (not shown) or via commands issued to graphics processor 800 via a ring interconnect 802. In some examples, ring interconnect 802 couples graphics processor 800 to other processing components, such as other graphics processors or general-purpose processors. Commands from ring interconnect 802 are interpreted by a command streamer 803, which supplies instructions to individual components of the geometry pipeline 820 or the media pipeline 830.

In some examples, command streamer 803 directs the operation of a vertex fetcher 805 that reads vertex data from memory and executes vertex-processing commands provided by command streamer 803. In some examples, vertex fetcher 805 provides vertex data to a vertex shader 807, which performs coordinate space transformation and lighting operations to each vertex. In some examples, vertex fetcher 805 and vertex shader 807 execute vertex-processing instructions by dispatching execution threads to execution units 852A-852B via a thread dispatcher 831.

In some examples, execution units 852A-852B are an array of vector processors having an instruction set for performing graphics and media operations. In some examples, execution units 852A-852B have an attached L1 cache 851 that is specific for each array or shared between the arrays. The cache can be configured as a data cache, an instruction cache, or a single cache that is partitioned to contain data and instructions in different partitions.

In some examples, geometry pipeline 820 includes tessellation components to perform hardware-accelerated tessellation of 3D objects. In some examples, a programmable hull shader 811 configures the tessellation operations. A programmable domain shader 817 provides back-end evaluation of tessellation output. A tessellator 813 operates at the direction of hull shader 811 and contains special purpose logic to generate a set of detailed geometric objects based on a coarse geometric model that is provided as input to geometry pipeline 820. In some examples, if tessellation is not used, tessellation components (e.g., hull shader 811, tessellator 813, and domain shader 817) can be bypassed.

In some examples, complete geometric objects can be processed by a geometry shader 819 via one or more threads dispatched to execution units 852A-852B, or can proceed directly to the clipper 829. In some examples, the geometry shader operates on entire geometric objects, rather than vertices or patches of vertices as in previous stages of the graphics pipeline. If the tessellation is disabled, the geometry shader 819 receives input from the vertex shader 807. In some examples, geometry shader 819 is programmable by a geometry shader program to perform geometry tessellation if the tessellation units are disabled.

Before rasterization, a clipper 829 processes vertex data. The clipper 829 may be a fixed function clipper or a programmable clipper having clipping and geometry shader functions. In some examples, a rasterizer and depth test component 873 in the render output pipeline 870 dispatches pixel shaders to convert the geometric objects into per pixel representations. In some examples, pixel shader logic is included in thread execution logic 850. In some examples, an application can bypass the rasterizer and depth test component 873 and access un-rasterized vertex data via a stream out unit 823.

The graphics processor 800 has an interconnect bus, interconnect fabric, or some other interconnect mechanism that allows data and message passing amongst the major components of the processor. In some examples, execution units 852A-852B and associated logic units (e.g., L1 cache 851, sampler 854, texture cache 858, etc.) interconnect via a data port 856 to perform memory access and communicate with render output pipeline components of the processor. In some examples, sampler 854, caches 851, 858 and execution units 852A-852B each have separate memory access paths. In one example the texture cache 858 can also be configured as a sampler cache.

In some examples, render output pipeline 870 contains a rasterizer and depth test component 873 that converts vertex-based objects into an associated pixel-based representation. In some examples, the rasterizer logic includes a windower/masker unit to perform fixed function triangle and line rasterization. An associated render cache 878 and depth cache 879 are also available in some examples. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In some examples, a shared L3 cache 875 is available to all graphics components, allowing the sharing of data without the use of main system memory.

In some examples, graphics processor media pipeline 830 includes a media engine 837 and a video front-end 834. In some examples, video front-end 834 receives pipeline commands from the command streamer 803. In some examples, media pipeline 830 includes a separate command streamer. In some examples, video front-end 834 processes media commands before sending the command to the media engine 837. In some examples, media engine 837 includes thread spawning functionality to spawn threads for dispatch to thread execution logic 850 via thread dispatcher 831.

In some examples, graphics processor 800 includes a display engine 840. In some examples, display engine 840 is external to processor 800 and couples with the graphics processor via the ring interconnect 802, or some other interconnect bus or fabric. In some examples, display engine 840 includes a 2D engine 841 and a display controller 843. In some examples, display engine 840 contains special purpose logic capable of operating independently of the 3D pipeline. In some examples, display controller 843 couples with a display device (not shown), which may be a system integrated display device, as in a laptop computer, or an external display device attached via a display device connector.

In some examples, the geometry pipeline 820 and media pipeline 830 are configurable to perform operations based on multiple graphics and media programming interfaces and are not specific to any one application programming interface (API). In some examples, driver software for the graphics processor translates API calls that are specific to a particular graphics or media library into commands that can be processed by the graphics processor. In some examples, support is provided for the Open Graphics Library (OpenGL), Open Computing Language (OpenCL), and/or Vulkan graphics and compute API, all from the Khronos Group. In some examples, support may also be provided for the Direct3D library from the Microsoft Corporation. In some examples, a combination of these libraries may be supported. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

Figure 9A:
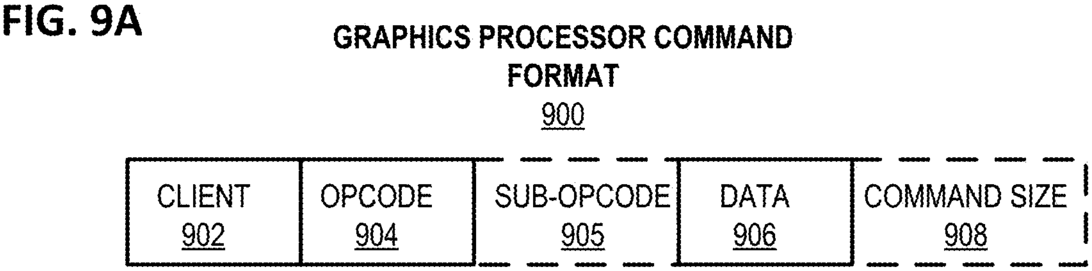
FIG. 9A is a block diagram illustrating a graphics processor command format according to some examples.
Figure 9B:
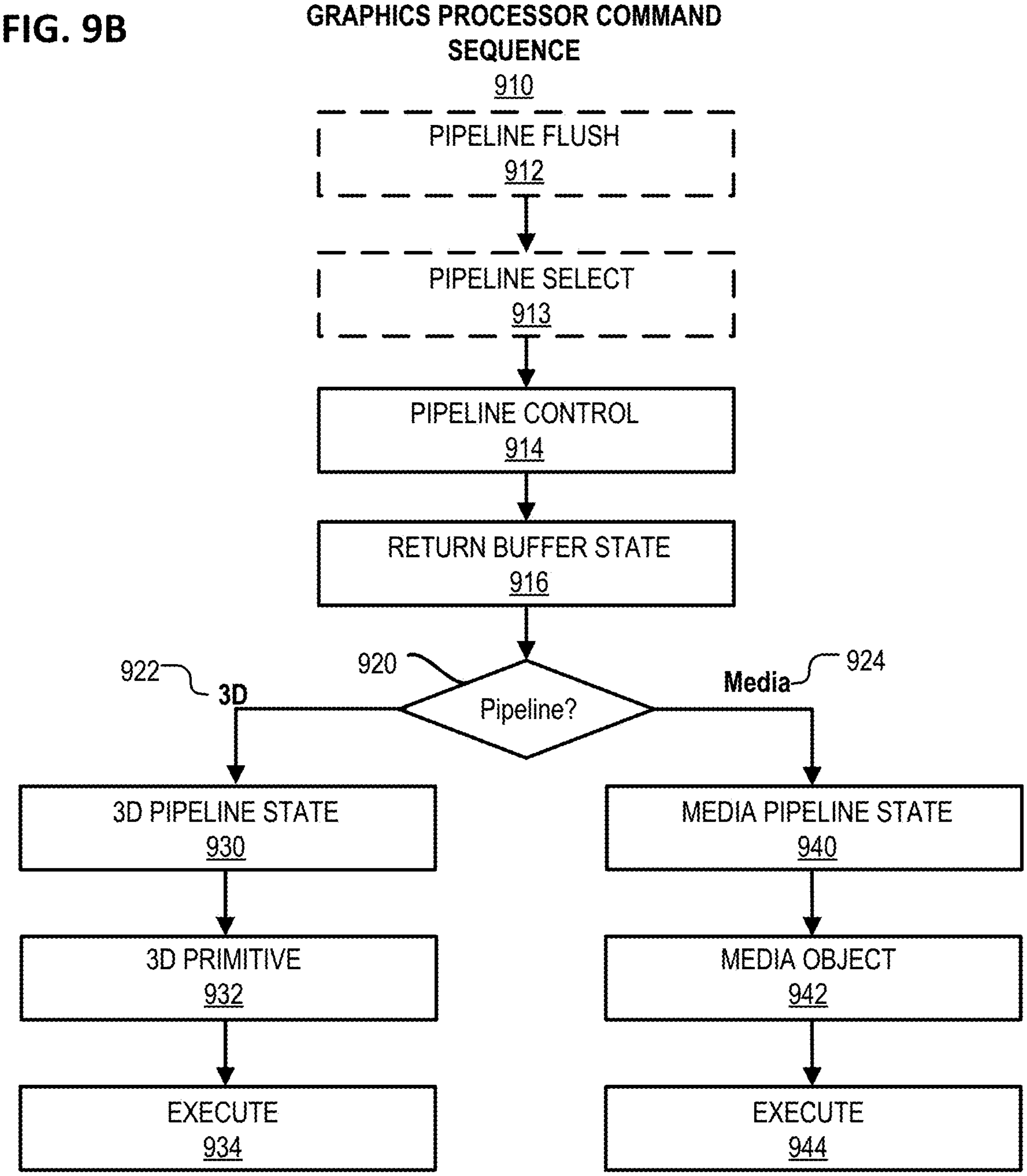
FIG. 9B is a block diagram illustrating a graphics processor command sequence according to an example.

FIG. 9A is a block diagram illustrating a graphics processor command format 900 according to some examples. FIG. 9B is a block diagram illustrating a graphics processor command sequence 910 according to an example. The solid lined boxes in FIG. 9A illustrate the components that are generally included in a graphics command while the dashed lines include components that are optional or that are only included in a sub-set of the graphics commands. The exemplary graphics processor command format 900 of FIG. 9A includes data fields to identify a client 902, a command operation code (opcode) 904, and data 906 for the command. A sub-opcode 905 and a command size 908 are also included in some commands.

In some examples, client 902 specifies the client unit of the graphics device that processes the command data. In some examples, a graphics processor command parser examines the client field of each command to condition the further processing of the command and route the command data to the appropriate client unit. In some examples, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in data field 906. For some commands an explicit command size 908 is expected to specify the size of the command. In some examples, the command parser automatically determines the size of at least some of the commands based on the command opcode. In some examples commands are aligned via multiples of a double word. Other command formats can be used.

The flow diagram in FIG. 9B illustrates an exemplary graphics processor command sequence 910. In some examples, software or firmware of a data processing system that features an example of a graphics processor uses a version of the command sequence shown to set up, execute, and terminate a set of graphics operations. A sample command sequence is shown and described for purposes of example only as examples are not limited to these specific commands or to this command sequence. Moreover, the commands may be issued as batch of commands in a command sequence, such that the graphics processor will process the sequence of commands in at least partially concurrence.

In some examples, the graphics processor command sequence 910 may begin with a pipeline flush command 912 to cause any active graphics pipeline to complete the currently pending commands for the pipeline. In some examples, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some examples, pipeline flush command 912 can be used for pipeline synchronization or before placing the graphics processor into a low power state.

In some examples, a pipeline select command 913 is used when a command sequence requires the graphics processor to explicitly switch between pipelines. In some examples, a pipeline select command 913 is required only once within an execution context before issuing pipeline commands unless the context is to issue commands for both pipelines. In some examples, a pipeline flush command 912 is required immediately before a pipeline switch via the pipeline select command 913.

In some examples, a pipeline control command 914 configures a graphics pipeline for operation and is used to program the 3D pipeline 922 and the media pipeline 924. In some examples, pipeline control command 914 configures the pipeline state for the active pipeline. In one example, the pipeline control command 914 is used for pipeline synchronization and to clear data from one or more cache memories within the active pipeline before processing a batch of commands.

In some examples, return buffer state commands 916 are used to configure a set of return buffers for the respective pipelines to write data. Some pipeline operations require the allocation, selection, or configuration of one or more return buffers into which the operations write intermediate data during processing. In some examples, the graphics processor also uses one or more return buffers to store output data and to perform cross thread communication. In some examples, the return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930 or the media pipeline 924 beginning at the media pipeline state 940.

The commands to configure the 3D pipeline state 930 include 3D state setting commands for vertex buffer state, vertex element state, constant color state, depth buffer state, and other state variables that are to be configured before 3D primitive commands are processed. The values of these commands are determined at least in part based on the particular 3D API in use. In some examples, 3D pipeline state 930 commands are also able to selectively disable or bypass certain pipeline elements if those elements will not be used.

In some examples, 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. In some examples, 3D primitive 932 command is used to perform vertex operations on 3D primitives via vertex shaders. To process vertex shaders, 3D pipeline 922 dispatches shader execution threads to graphics processor execution units.

In some examples, 3D pipeline 922 is triggered via an execute 934 command or event. In some examples, a register write triggers command execution. In some examples execution is triggered via a 'go' or 'kick' command in the command sequence. In one example, command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some examples, the graphics processor command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. In some examples, the media pipeline can also be bypassed and media decode can be performed in whole or in part using resources provided by one or more general-purpose processing cores. In one example, the media pipeline also includes elements for general-purpose graphics processor unit (GPGPU) operations, where the graphics processor is used to perform SIMD vector operations using computational shader programs that are not explicitly related to the rendering of graphics primitives.

In some examples, media pipeline 924 is configured in a similar manner as the 3D pipeline 922. A set of commands to configure the media pipeline state 940 are dispatched or placed into a command queue before the media object commands 942. In some examples, commands for the media pipeline state 940 include data to configure the media pipeline elements that will be used to process the media objects. This includes data to configure the video decode and video encode logic within the media pipeline, such as encode or decode format. In some examples, commands for the media pipeline state 940 also support the use of one or more pointers to "indirect" state elements that contain a batch of state settings.

In some examples, media object commands 942 supply pointers to media objects for processing by the media pipeline. The media objects include memory buffers containing video data to be processed. In some examples, all media pipeline states must be valid before issuing a media object command 942. Once the pipeline state is configured and media object commands 942 are queued, the media pipeline 924 is triggered via an execute command 944 or an equivalent execute event (e.g., register write). Output from media pipeline 924 may then be post processed by operations provided by the 3D pipeline 922 or the media pipeline 924. In some examples, GPGPU operations are configured and executed in a similar manner as media operations.

Graphics Software Architecture

Figure 10:
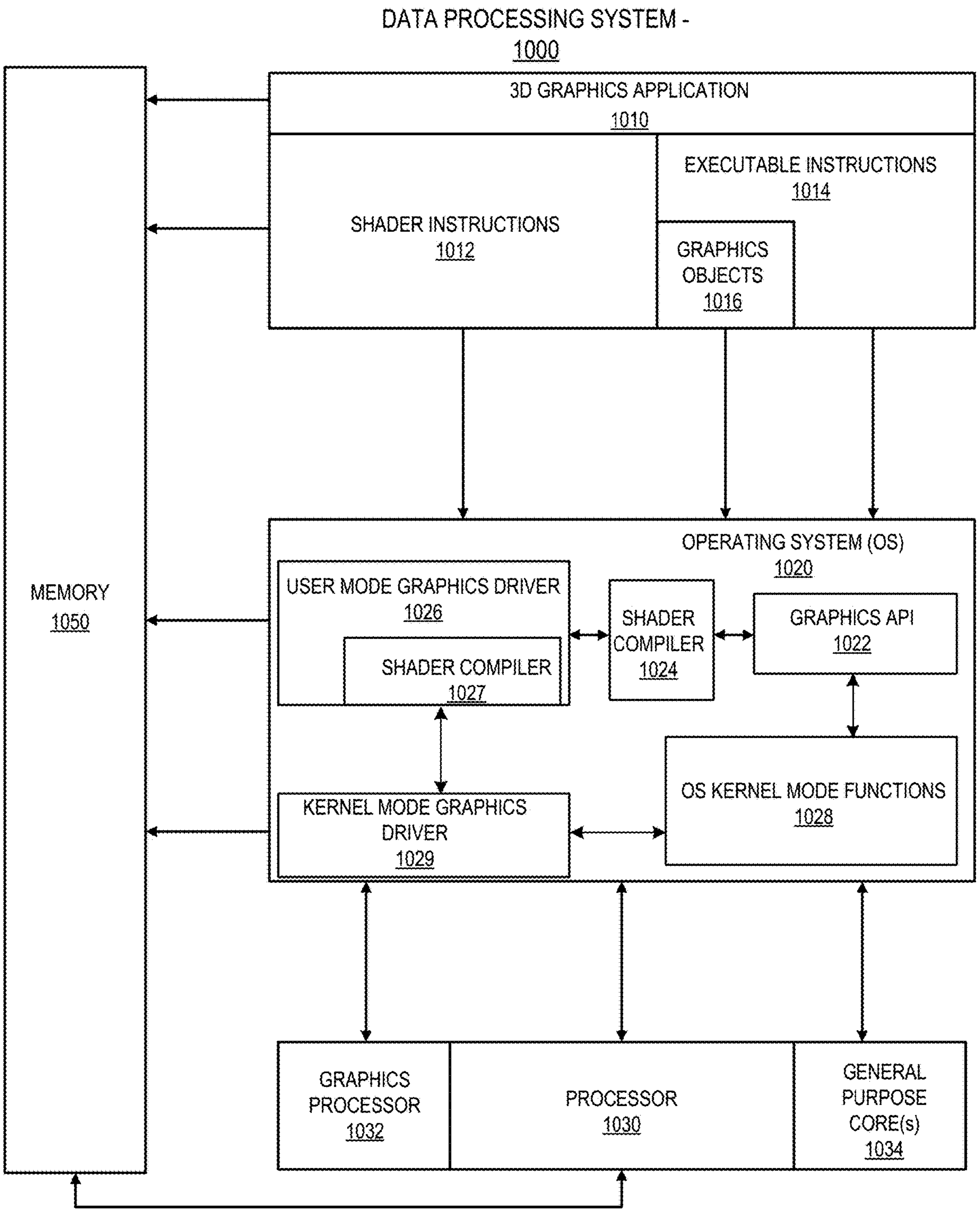
FIG. 10 illustrates an exemplary graphics software architecture for a data processing system according to some examples.

FIG. 10 illustrates an exemplary graphics software architecture for a data processing system 1000 according to some examples. In some examples, software architecture includes a 3D graphics application 1010, an operating system 1020, and at least one processor 1030. In some examples, processor 1030 includes a graphics processor 1032 and one or more general-purpose processor core(s) 1034. The graphics application 1010 and operating system 1020 each execute in the system memory 1050 of the data processing system.

In some examples, 3D graphics application 1010 contains one or more shader programs including shader instructions 1012. The shader language instructions may be in a high-level shader language, such as the High-Level Shader Language (HLSL) of Direct3D, the OpenGL Shader Language (GLSL), and so forth. The application also includes executable instructions 1014 in a machine language suitable for execution by the general-purpose processor core 1034. The application also includes graphics objects 1016 defined by vertex data.

In some examples, operating system 1020 is a Microsoft® Windows® operating system from the Microsoft Corporation, a proprietary UNIX-like operating system, or an open source UNIX-like operating system using a variant of the Linux kernel. The operating system 1020 can support a graphics API 1022 such as the Direct3D API, the OpenGL API, or the Vulkan API. When the Direct3D API is in use, the operating system 1020 uses a front-end shader compiler 1024 to compile any shader instructions 1012 in HLSL into a lower-level shader language. The compilation may be a just-in-time (JIT) compilation or the application can perform shader pre-compilation. In some examples, high-level shaders are compiled into low-level shaders during the compilation of the 3D graphics application 1010. In some examples, the shader instructions 1012 are provided in an intermediate form, such as a version of the Standard Portable Intermediate Representation (SPIR) used by the Vulkan API.

In some examples, user mode graphics driver 1026 contains a back-end shader compiler 1027 to convert the shader instructions 1012 into a hardware specific representation. When the OpenGL API is in use, shader instructions 1012 in the GLSL high-level language are passed to a user mode graphics driver 1026 for compilation. In some examples, user mode graphics driver 1026 uses operating system kernel mode functions 1028 to communicate with a kernel mode graphics driver 1029. In some examples, kernel mode graphics driver 1029 communicates with graphics processor 1032 to dispatch commands and instructions.

IP Core Implementations

One or more aspects of at least one example may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the examples described herein.

Figure 11A:
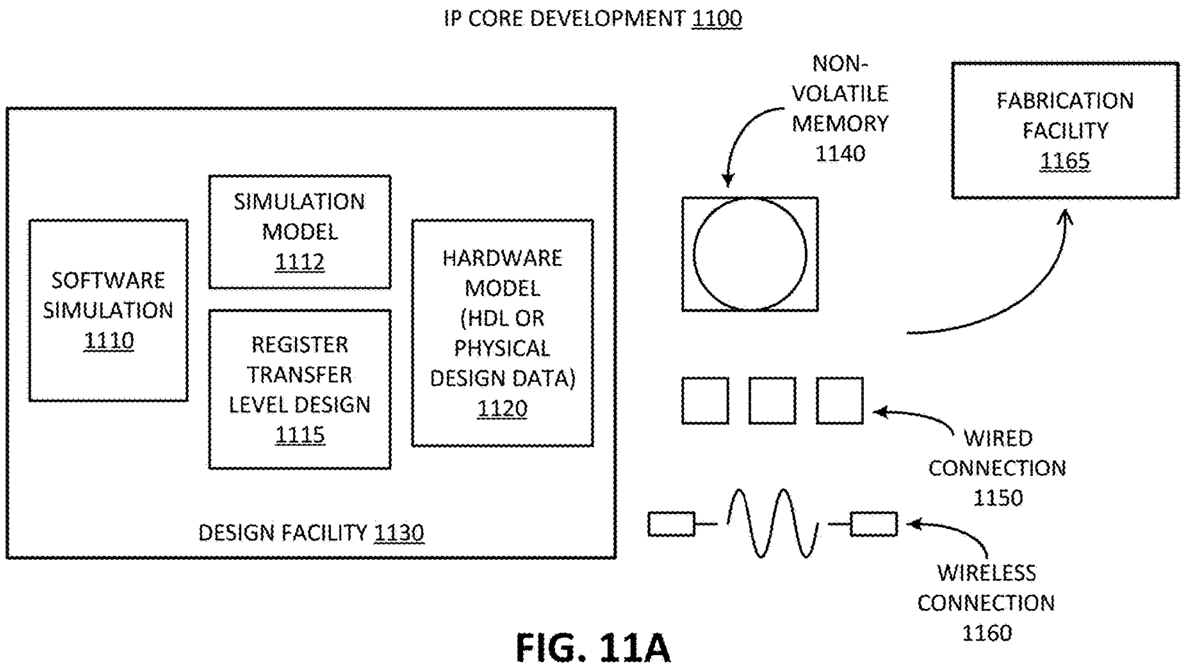
FIG. 11A is a block diagram illustrating an IP core development system that may be used to manufacture an integrated circuit to perform operations according to an example.

FIG. 11A is a block diagram illustrating an IP core development system 1100 that may be used to manufacture an integrated circuit to perform operations according to an example. The IP core development system 1100 may be used to generate modular, re-usable designs that can be incorporated into a larger design or used to construct an entire integrated circuit (e.g., an SOC (system on a chip) integrated circuit). A design facility 1130 can generate a software simulation 1110 of an IP core design in a high-level programming language (e.g., C/C++). The software simulation 1110 can be used to design, test, and verify the behavior of the IP core using a simulation model 1112. The simulation model 1112 may include functional, behavioral, and/or timing simulations. A register transfer level (RTL) design 1115 can then be created or synthesized from the simulation model 1112. The RTL design 1115 is an abstraction of the behavior of the integrated circuit that models the flow of digital signals between hardware registers, including the associated logic performed using the modeled digital signals. In addition to an RTL design 1115, lower-level designs at the logic level or transistor level may also be created, designed, or synthesized. Thus, the particular details of the initial design and simulation may vary.

The RTL design 1115 or equivalent may be further synthesized by the design facility into a hardware model 1120, which may be in a hardware description language (HDL), or some other representation of physical design data. The HDL may be further simulated or tested to verify the IP core design. The IP core design can be stored for delivery to a 3rd party fabrication facility 1165 using non-volatile memory 1140 (e.g., hard disk, flash memory, or any non-volatile storage medium). Alternatively, the IP core design may be transmitted (e.g., via the Internet) over a wired connection 1150 or wireless connection 1160. The fabrication facility 1165 may then fabricate an integrated circuit that is based at least in part on the IP core design. The fabricated integrated circuit can be configured to perform operations in accordance with at least one example described herein.

Figure 11B:
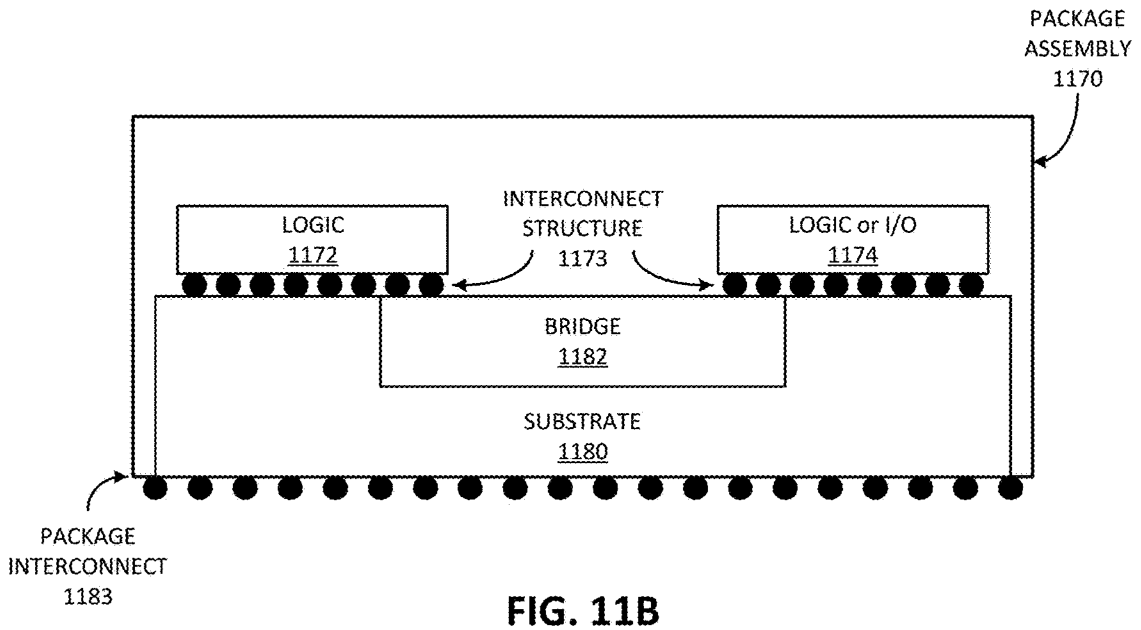
FIG. 11B illustrates a cross-section side view of an integrated circuit package assembly, according to some examples described herein.

FIG. 11B illustrates a cross-section side view of an integrated circuit package assembly 1170, according to some examples described herein. The integrated circuit package assembly 1170 illustrates an implementation of one or more processor or accelerator devices as described herein. The package assembly 1170 includes multiple units of hardware logic 1172, 1174 connected to a substrate 1180. The logic 1172, 1174 may be implemented at least partly in configurable logic or fixed-functionality logic hardware, and can include one or more portions of any of the processor core(s), graphics processor(s), or other accelerator devices described herein. Each unit of logic 1172, 1174 can be implemented within a semiconductor die and coupled with the substrate 1180 via an interconnect structure 1173. The interconnect structure 1173 may be configured to route electrical signals between the logic 1172, 1174 and the substrate 1180, and can include interconnects such as, but not limited to bumps or pillars. In some examples, the interconnect structure 1173 may be configured to route electrical signals such as, for example, input/output (I/O) signals and/or power or ground signals associated with the operation of the logic 1172, 1174. In some examples, the substrate 1180 is an epoxy-based laminate substrate. The substrate 1180 may include other suitable types of substrates in other examples. The package assembly 1170 can be connected to other electrical devices via a package interconnect 1183. The package interconnect 1183 may be coupled to a surface of the substrate 1180 to route electrical signals to other electrical devices, such as a motherboard, other chipset, or multi-chip module.

In some examples, the units of logic 1172, 1174 are electrically coupled with a bridge 1182 that is configured to route electrical signals between the logic 1172, 1174. The bridge 1182 may be a dense interconnect structure that provides a route for electrical signals. The bridge 1182 may include a bridge substrate composed of glass or a suitable semiconductor material. Electrical routing features can be formed on the bridge substrate to provide a chip-to-chip connection between the logic 1172, 1174.

Although two units of logic 1172, 1174 and a bridge 1182 are illustrated, examples described herein may include more or fewer logic units on one or more dies. The one or more dies may be connected by zero or more bridges, as the bridge 1182 may be excluded when the logic is included on a single die. Alternatively, multiple dies or units of logic can be connected by one or more bridges. Additionally, multiple logic units, dies, and bridges can be connected together in other possible configurations, including three-dimensional configurations.

Figure 11C:
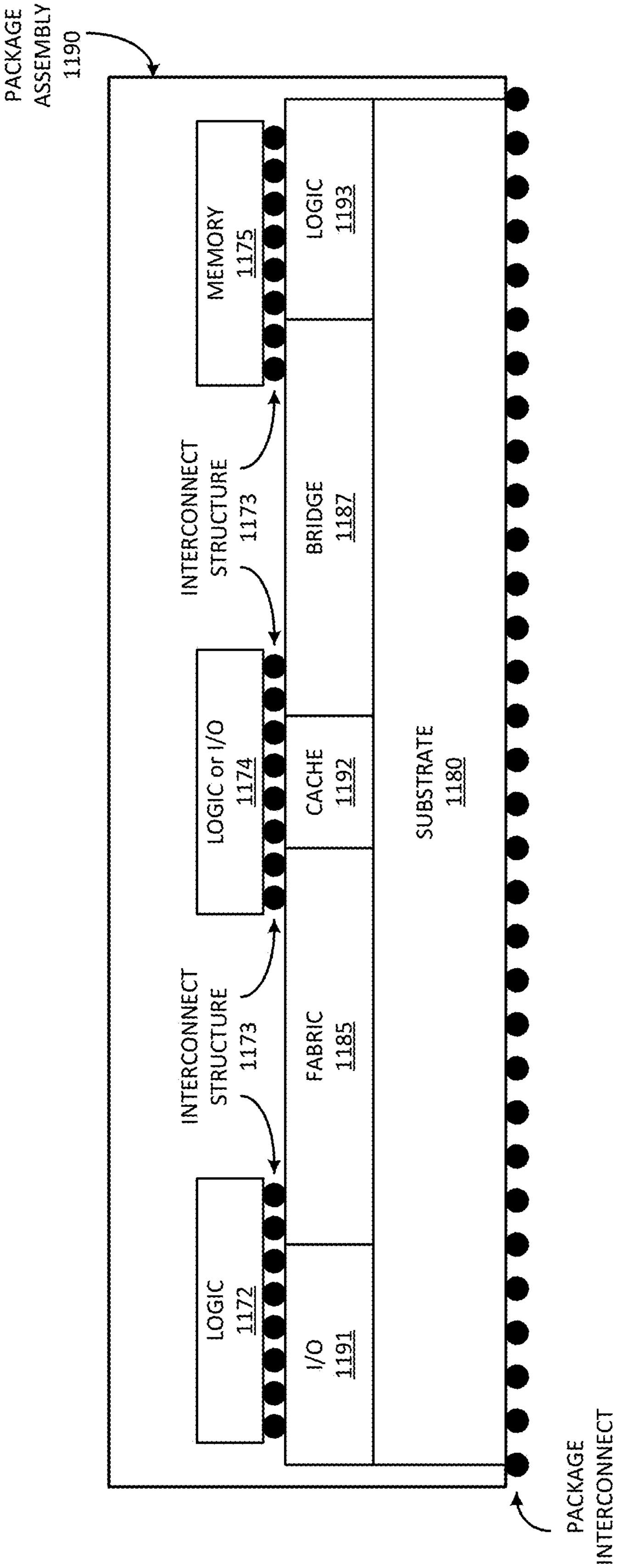
FIG. 11C illustrates a package assembly that includes multiple units of hardware logic chiplets connected to a substrate.

FIG. 11C illustrates a package assembly 1190 that includes multiple units of hardware logic chiplets connected to a substrate 1180 (e.g., base die). A graphics processing unit, parallel processor, and/or compute accelerator as described herein can be composed from diverse silicon chiplets that are separately manufactured. In this context, a chiplet is an at least partially packaged integrated circuit that includes distinct units of logic that can be assembled with other chiplets into a larger package. A diverse set of chiplets with different IP core logic can be assembled into a single device. Additionally, the chiplets can be integrated into a base die or base chiplet using active interposer technology. The concepts described herein enable the interconnection and communication between the different forms of IP within the GPU. IP cores can be manufactured using different process technologies and composed during manufacturing, which avoids the complexity of converging multiple IPs, especially on a large SoC with several flavors IPs, to the same manufacturing process. Enabling the use of multiple process technologies improves the time to market and provides a cost-effective way to create multiple product SKUs. Additionally, the disaggregated IPs are more amenable to being power gated independently, components that are not in use on a given workload can be powered off, reducing overall power consumption.

The hardware logic chiplets can include special purpose hardware logic chiplets 1172, logic or I/O chiplets 1174, and/or memory chiplets 1175. The hardware logic chiplets 1172 and logic or I/O chiplets 1174 may be implemented at least partly in configurable logic or fixed-functionality logic hardware and can include one or more portions of any of the processor core(s), graphics processor(s), parallel processors, or other accelerator devices described herein. The memory chiplets 1175 can be DRAM (e.g., GDDR, HBM) memory or cache (SRAM) memory.

Each chiplet can be fabricated as separate semiconductor die and coupled with the substrate 1180 via an interconnect structure 1173. The interconnect structure 1173 may be configured to route electrical signals between the various chiplets and logic within the substrate 1180. The interconnect structure 1173 can include interconnects such as, but not limited to bumps or pillars. In some examples, the interconnect structure 1173 may be configured to route electrical signals such as, for example, input/output (I/O) signals and/or power or ground signals associated with the operation of the logic, I/O and memory chiplets.

In some examples, the substrate 1180 is an epoxy-based laminate substrate. The substrate 1180 may include other suitable types of substrates in other examples. The package assembly 1190 can be connected to other electrical devices via a package interconnect 1183. The package interconnect 1183 may be coupled to a surface of the substrate 1180 to route electrical signals to other electrical devices, such as a motherboard, other chipset, or multi-chip module.

In some examples, a logic or I/O chiplet 1174 and a memory chiplet 1175 can be electrically coupled via a bridge 1187 that is configured to route electrical signals between the logic or I/O chiplet 1174 and a memory chiplet 1175. The bridge 1187 may be a dense interconnect structure that provides a route for electrical signals. The bridge 1187 may include a bridge substrate composed of glass or a suitable semiconductor material. Electrical routing features can be formed on the bridge substrate to provide a chip-to-chip connection between the logic or I/O chiplet 1174 and a memory chiplet 1175. The bridge 1187 may also be referred to as a silicon bridge or an interconnect bridge. For example, the bridge 1187, in some examples, is an Embedded Multi-die Interconnect Bridge (EMIB). In some examples, the bridge 1187 may simply be a direct connection from one chiplet to another chiplet.

The substrate 1180 can include hardware components for I/O 1191, cache memory 1192, and other hardware logic 1193. A fabric 1185 can be embedded in the substrate 1180 to enable communication between the various logic chiplets and the logic 1191, 1193 within the substrate 1180. In one example, the I/O 1191, fabric 1185, cache, bridge, and other hardware logic 1193 can be integrated into a base die that is layered on top of the substrate 1180.

In various examples a package assembly 1190 can include fewer or greater number of components and chiplets that are interconnected by a fabric 1185 or one or more bridges 1187. The chiplets within the package assembly 1190 may be arranged in a 3D or 2.5D arrangement. In general, bridge structures 1187 may be used to facilitate a point to point interconnect between, for example, logic or I/O chiplets and memory chiplets. The fabric 1185 can be used to interconnect the various logic and/or I/O chiplets (e.g., chiplets 1172, 1174, 1191, 1193). with other logic and/or I/O chiplets. In one example, the cache memory 1192 within the substrate can act as a global cache for the package assembly 1190, part of a distributed global cache, or as a dedicated cache for the fabric 1185.

Figure 11D:
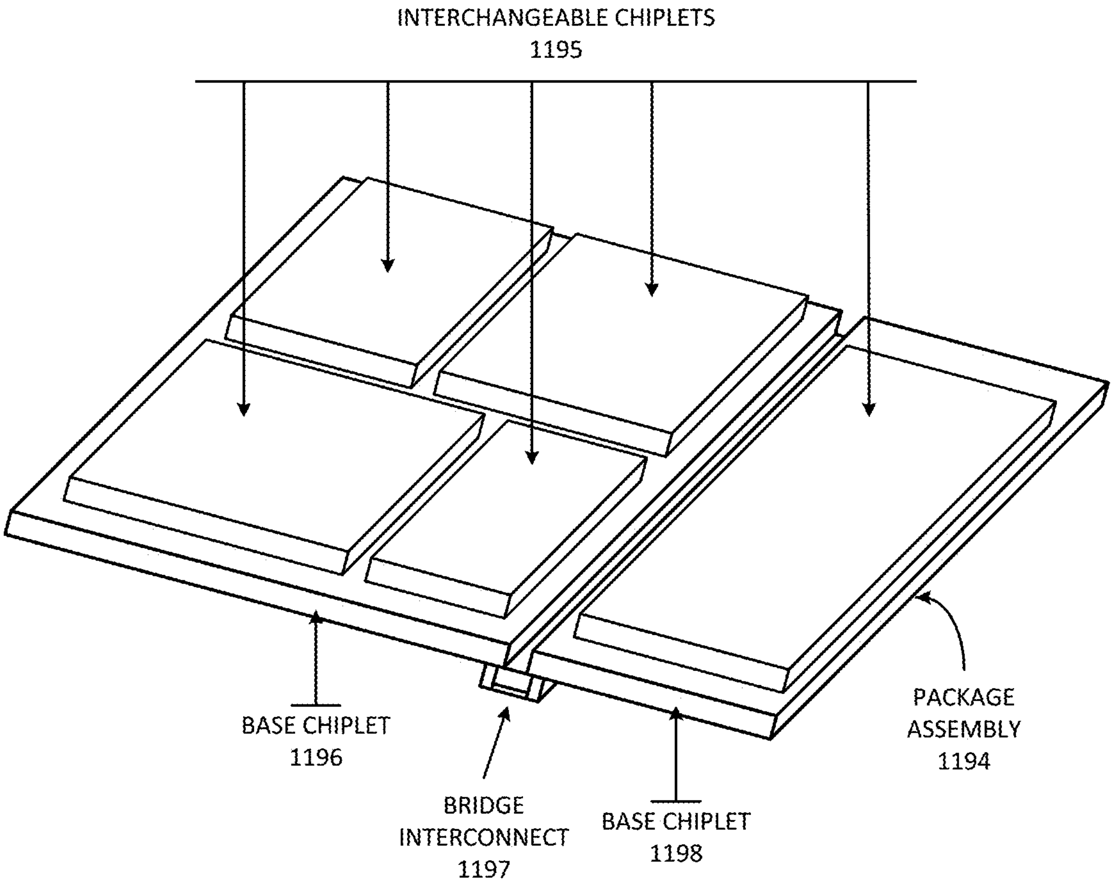
FIG. 11D illustrates a package assembly including interchangeable chiplets, according to an example.

FIG. 11D illustrates a package assembly 1194 including interchangeable chiplets 1195, according to an example. The interchangeable chiplets 1195 can be assembled into standardized slots on one or more base chiplets 1196, 1198. The base chiplets 1196, 1198 can be coupled via a bridge interconnect 1197, which can be similar to the other bridge interconnects described herein and may be, for example, an EMIB. Memory chiplets can also be connected to logic or I/O chiplets via a bridge interconnect. I/O and logic chiplets can communicate via an interconnect fabric. The base chiplets can each support one or more slots in a standardized format for one of logic or I/O or memory/cache.

In one example, SRAM and power delivery circuits can be fabricated into one or more of the base chiplets 1196, 1198, which can be fabricated using a different process technology relative to the interchangeable chiplets 1195 that are stacked on top of the base chiplets. For example, the base chiplets 1196, 1198 can be fabricated using a larger process technology, while the interchangeable chiplets can be manufactured using a smaller process technology. One or more of the interchangeable chiplets 1195 may be memory (e.g., DRAM) chiplets. Different memory densities can be selected for the package assembly 1194 based on the power, and/or performance targeted for the product that uses the package assembly 1194. Additionally, logic chiplets with a different number of type of functional units can be selected at time of assembly based on the power, and/or performance targeted for the product. Additionally, chiplets containing IP logic cores of differing types can be inserted into the interchangeable chiplet slots, enabling hybrid processor designs that can mix and match different technology IP blocks.

Exemplary System on a Chip Integrated Circuit

Figure 12:
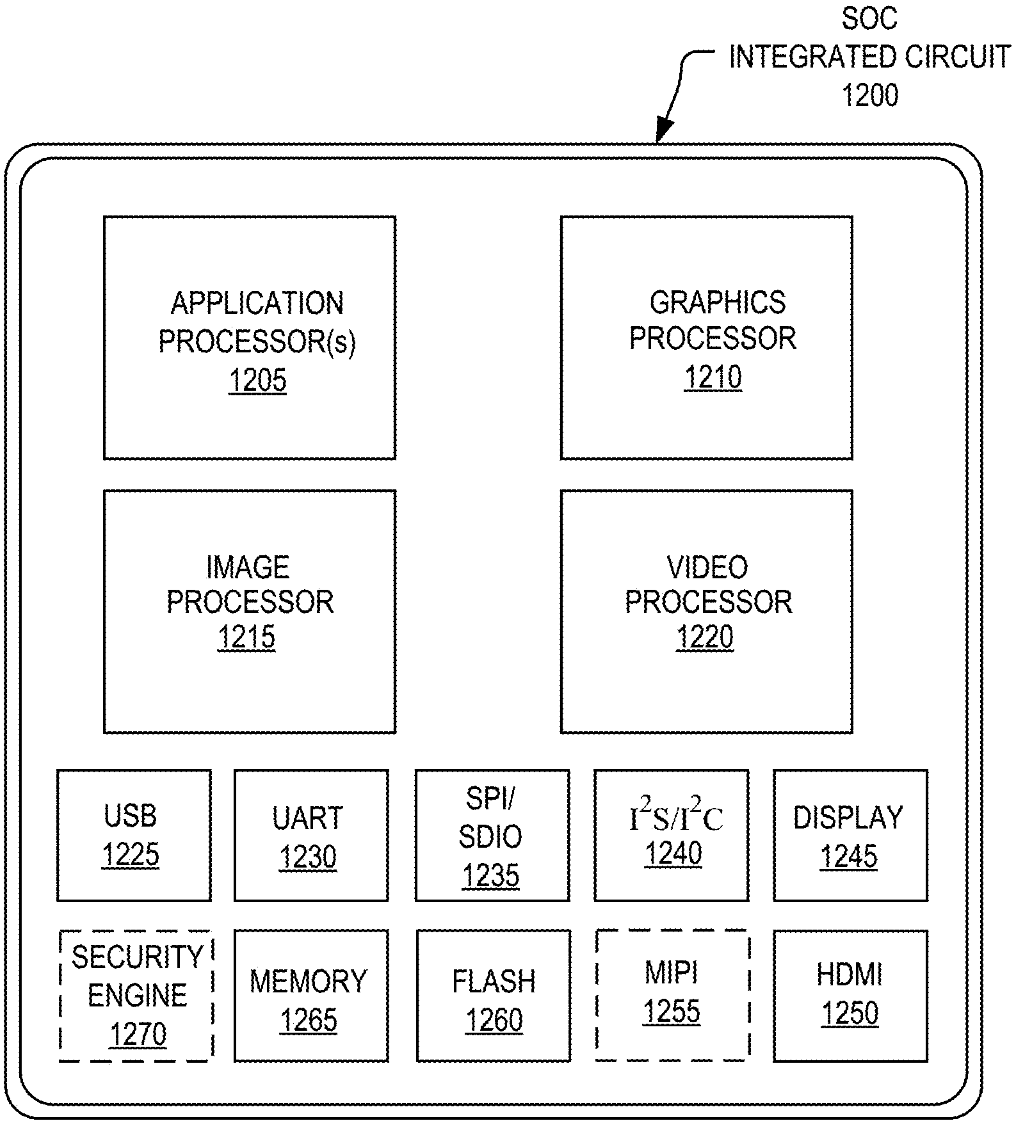
FIGS. 12, 13A, and 13B illustrate exemplary integrated circuits and associated graphics processors that may be fabricated using one or more IP cores, according to various examples described herein.
Figure 13A:
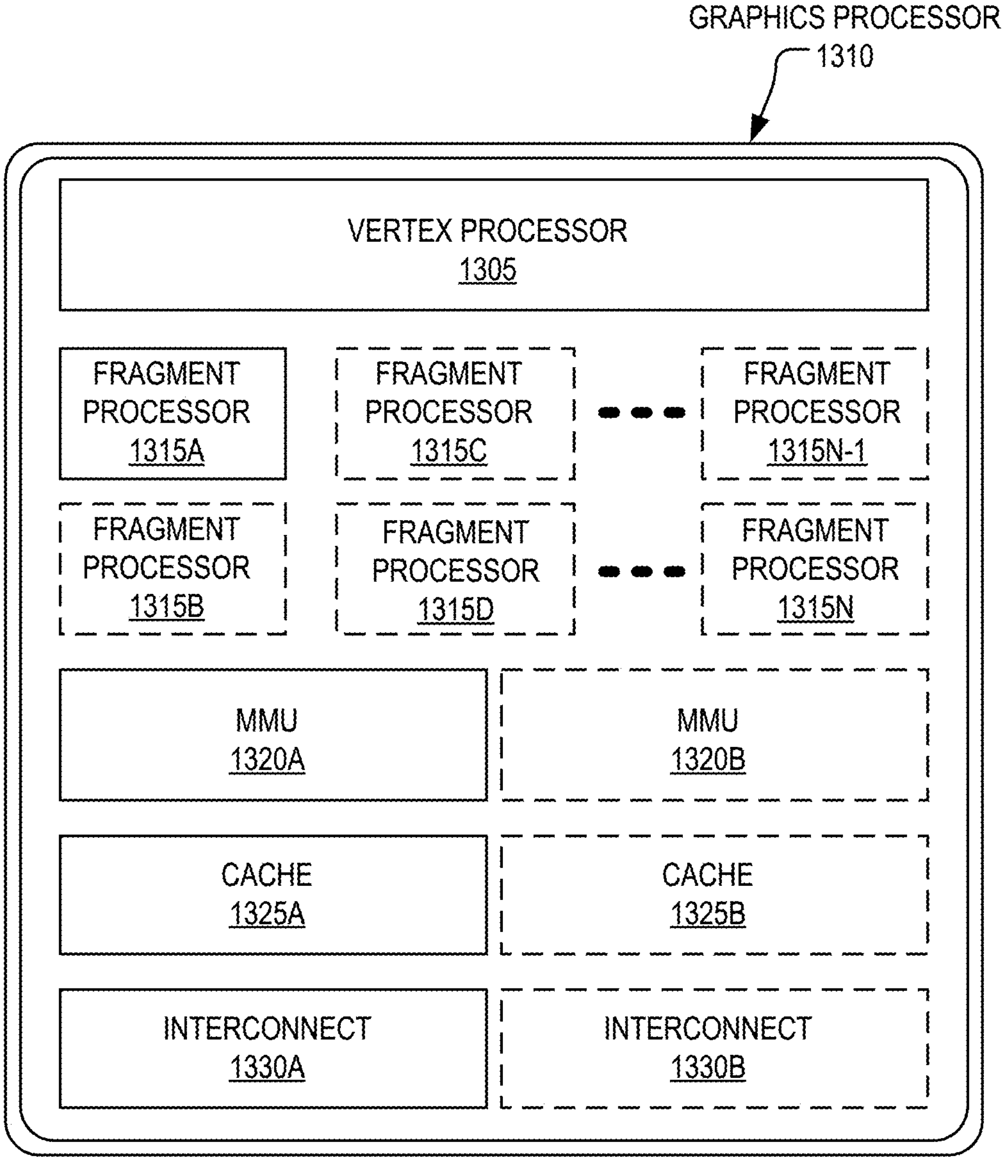
Figure 13B:
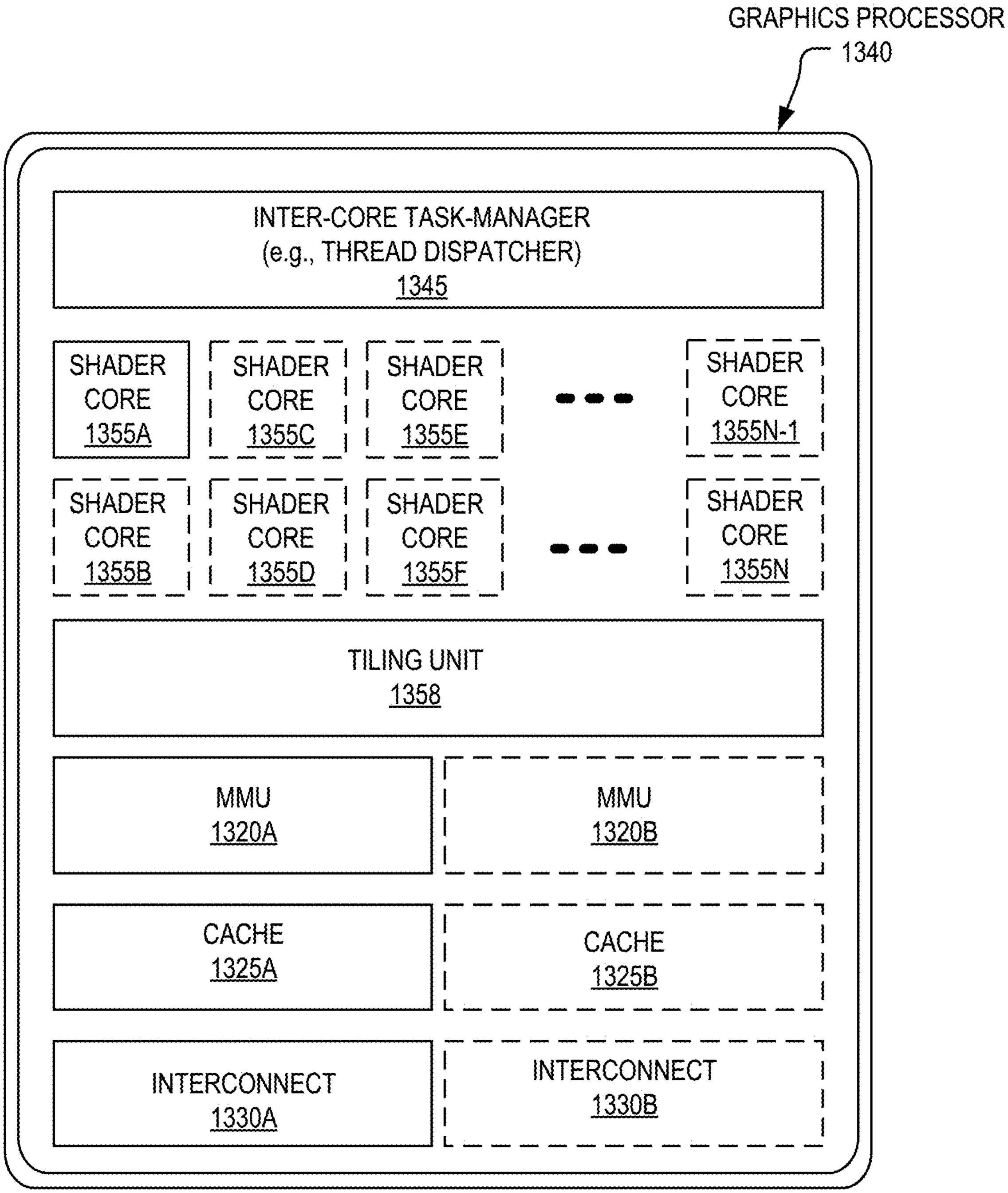

FIG. 12 and FIGS. 13A-13B illustrate exemplary integrated circuits and associated graphics processors that may be fabricated using one or more IP cores, according to various examples described herein. In addition to what is illustrated, other logic and circuits may be included, including additional graphics processors/cores, peripheral interface controllers, or general-purpose processor cores.

FIG. 12 is a block diagram illustrating an exemplary system on a chip integrated circuit 1200 that may be fabricated using one or more IP cores, according to an example. Exemplary integrated circuit 1200 includes one or more application processor(s) 1205 (e.g., CPUs), at least one graphics processor 1210, and may additionally include an image processor 1215 and/or a video processor 1220, any of which may be a modular IP core from the same or multiple different design facilities. Integrated circuit 1200 includes peripheral or bus logic including a USB controller 1225, UART controller 1230, an SPI/SDIO controller 1235, and an I2S/I2C controller 1240. Additionally, the integrated circuit can include a display device 1245 coupled to one or more of a high-definition multimedia interface (HDMI) controller 1250 and a mobile industry processor interface (MIPI) display interface 1255. Storage may be provided by a flash memory subsystem 1260 including flash memory and a flash memory controller. Memory interface may be provided via a memory controller 1265 for access to SDRAM (synchronous dynamic random access memory) or SRAM memory devices. Some integrated circuits additionally include an embedded security engine 1270.

FIGS. 13A-13B are block diagrams illustrating exemplary graphics processors for use within an SoC, according to examples described herein. FIG. 13A illustrates an exemplary graphics processor 1310 of a system on a chip integrated circuit that may be fabricated using one or more IP cores, according to an example. FIG. 13B illustrates an additional exemplary graphics processor 1340 of a system on a chip integrated circuit that may be fabricated using one or more IP cores, according to an example. Graphics processor 1310 of FIG. 13A is an example of a low power graphics processor core. Graphics processor 1340 of FIG. 13B is an example of a higher performance graphics processor core. Each of the graphics processors 1310, 1340 can be variants of the graphics processor 1210 of FIG. 12.

As shown in FIG. 13A, graphics processor 1310 includes a vertex processor 1305 and one or more fragment processor (s) 1315A-1315N (e.g., 1315A, 1315B, 1315C, 1315D, through 1315N-1, and 1315N). Graphics processor 1310 can execute different shader programs via separate logic, such that the vertex processor 1305 is optimized to execute operations for vertex shader programs, while the one or more fragment processor(s) 1315A-1315N execute fragment (e.g., pixel) shading operations for fragment or pixel shader programs. The vertex processor 1305 performs the vertex processing stage of the 3D graphics pipeline and generates primitives and vertex data. The fragment processor(s) 1315A-1315N use the primitive and vertex data generated by the vertex processor 1305 to produce a framebuffer that is displayed on a display device. In one example, the fragment processor(s) 1315A-1315N are optimized to execute fragment shader programs as provided for in the OpenGL API, which may be used to perform similar operations as a pixel shader program as provided for in the Direct 3D API.

Graphics processor 1310 additionally includes one or more memory management units (MMUs) 1320A-1320B, cache(s) 1325A-1325B, and circuit interconnect(s) 1330A-1330B. The one or more MMU(s) 1320A-1320B provide for virtual to physical address mapping for the graphics processor 1310, including for the vertex processor 1305 and/or fragment processor(s) 1315A-1315N, which may reference vertex or image/texture data stored in memory, in addition to vertex or image/texture data stored in the one or more cache(s) 1325A-1325B. In one example the one or more MMU(s) 1320A-1320B may be synchronized with other MMUs within the system, including one or more MMUs associated with the one or more application processor(s) 1205, image processor 1215, and/or video processor 1220 of FIG. 12, such that each processor 1205-1220 can participate in a shared or unified virtual memory system. The one or more circuit interconnect(s) 1330A-1330B enable graphics processor 1310 to interface with other IP cores within the SoC, either via an internal bus of the SoC or via a direct connection, according to examples.

As shown FIG. 13B, graphics processor 1340 includes the one or more MMU(s) 1320A-1320B, cache(s) 1325A-1325B, and circuit interconnect(s) 1330A-1330B of the graphics processor 1310 of FIG. 13A. Graphics processor 1340 includes one or more shader core(s) 1355A-1355N (e.g., 1455A, 1355B, 1355C, 1355D, 1355E, 1355F, through 1355N-1, and 1355N), which provides for a unified shader core architecture in which a single core or type or core can execute all types of programmable shader code, including shader program code to implement vertex shaders, fragment shaders, and/or compute shaders. The exact number of shader cores present can vary among examples and implementations. Additionally, graphics processor 1340 includes an inter-core task manager 1345, which acts as a thread dispatcher to dispatch execution threads to one or more shader cores 1355A-1355N and a tiling unit 1358 to accelerate tiling operations for tile-based rendering, in which rendering operations for a scene are subdivided in image space, for example to exploit local spatial coherence within a scene or to optimize use of internal caches.

Figure 14:
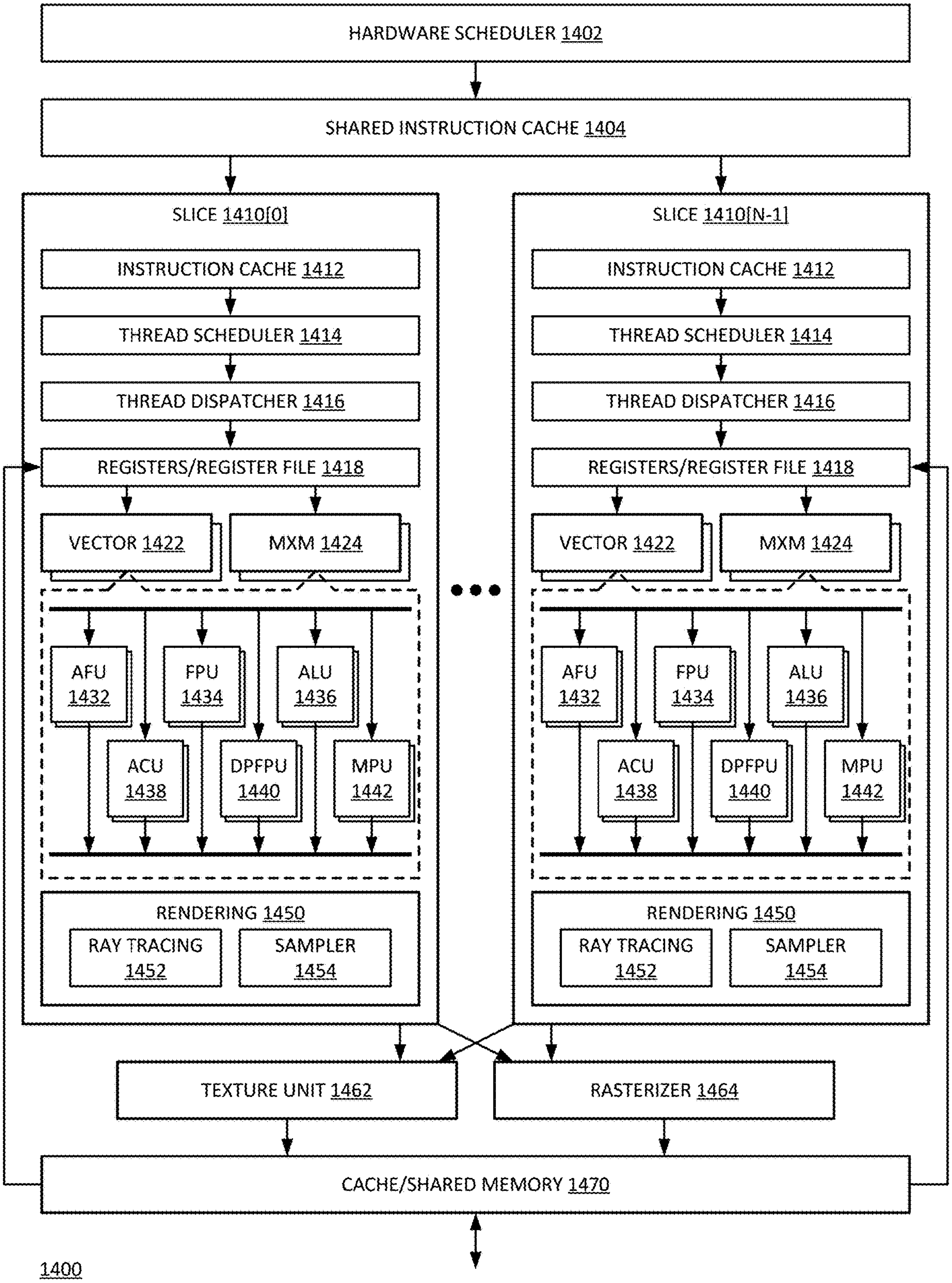
FIG. 14 illustrates an example of a graphics processor with vector units and matrix units.

FIG. 14 illustrates an example of a graphics processor with vector units and matrix units. Graphics unit 1400 is an example of a graphics processing unit, which can include multiple chips integrated onto a common SOC (system on a chip). Graphics unit 1400 can be a graphics processor.

Graphics unit 1400 includes hardware scheduler 1402, which represents circuitry to perform scheduling across different compute cores of graphics unit 1400. Graphics unit 1400 includes shared instruction cache 1404, which represents temporary storage for instructions for the different compute units. In one example, each slice 1410 has a separate instruction cache shared among the compute cores on that slice. In one example, shared instruction cache 1404 represents part of hardware scheduler 1402 to distribute instructions for parallel execution in graphics unit 1400.

In one example, graphics unit 1400 includes texture unit 1462 shared by the N slices, slice 1410[0:(N−1)], collectively, slices 1410. In one example, graphics unit 1400 includes rasterizer 1464 shared by slices 1410. Graphics unit 1400 can include multiple slices 1410[10:(N−1)] or partitions each including multiple graphics cores. Slices 1410 can include support logic including local instruction cache 1412, local thread scheduler 1414, and thread dispatcher 1416. Local instruction cache 1412 can cache instructions for the cores in an individual slice, which local thread scheduler 1414 can distribute the instructions to the parallel compute cores in the slice. Thread dispatcher 1416 can be responsible to time parallel instruction distribution. In one example, slices 1410 include registers/register file 1418, which represents registers to store data or instructions for use by the compute cores. In one example, registers/register file 1418 represents a structured set of registers to hold values used for iterative computations.

In one example, slices 1410 include vector units 1422 and matrix multiplication (MXM) units 1424. Vector units 1422 and MXM units 1424 can perform logic operations. Vector units 1422 and MXM units 1424 can include computational units to perform the computations of logic operations. The computational units can include additional function units (AFU) 1432, floating-point units (FPU) 1434, integer arithmetic logic units (ALU) 1436, address computational units (ACUS) 1438, double-precision floating-point units (DPFPU) 1440, and matrix processing units (MPU) 1442. Vector units 1422 may not include all the computational units (for example, vector units 1422 may not include MPU 1442). Similarly, MXM 1424 may not include all computational units.

Some of the computational units operate at a specific precision. For example, FPU 1434 can perform single-precision (32-bit) and half-precision (16-bit) floating-point operations, while DPFPU 1440 performs double precision (64-bit) floating-point operations. ALU 1436 can perform variable precision integer operations at 8-bit, 16-bit, and 32-bit precision, and can be configured for mixed precision operations. MPU 1442 can also be configured for mixed precision matrix operations, including half-precision floating-point and 8-bit integer operations. MPU 1442 can perform a variety of matrix operations to accelerate machine learning application frameworks, including enabling support for accelerated general matrix to matrix multiplication (GEMM). AFU 1432 can perform additional logic operations not supported by the floating-point or integer units, including trigonometric operations (e.g., Sine, Cosine, etc.).

In one example, slices 1410 include rendering units shared among the computational units. Rendering 1450 represents the rendering units, which can include ray tracing 1452 and sampler 1454. Rendering 1450 can include other rendering units. In one example, graphics unit 1400 includes cache/shared memory 1470 shared among slices 1410. In one example, cache/shared memory 1470 represents a level-two (L2) cache. In one example, cache/shared memory 1470 is part of a memory fabric that can operate as a communication fabric between compute units.

Figure 15:
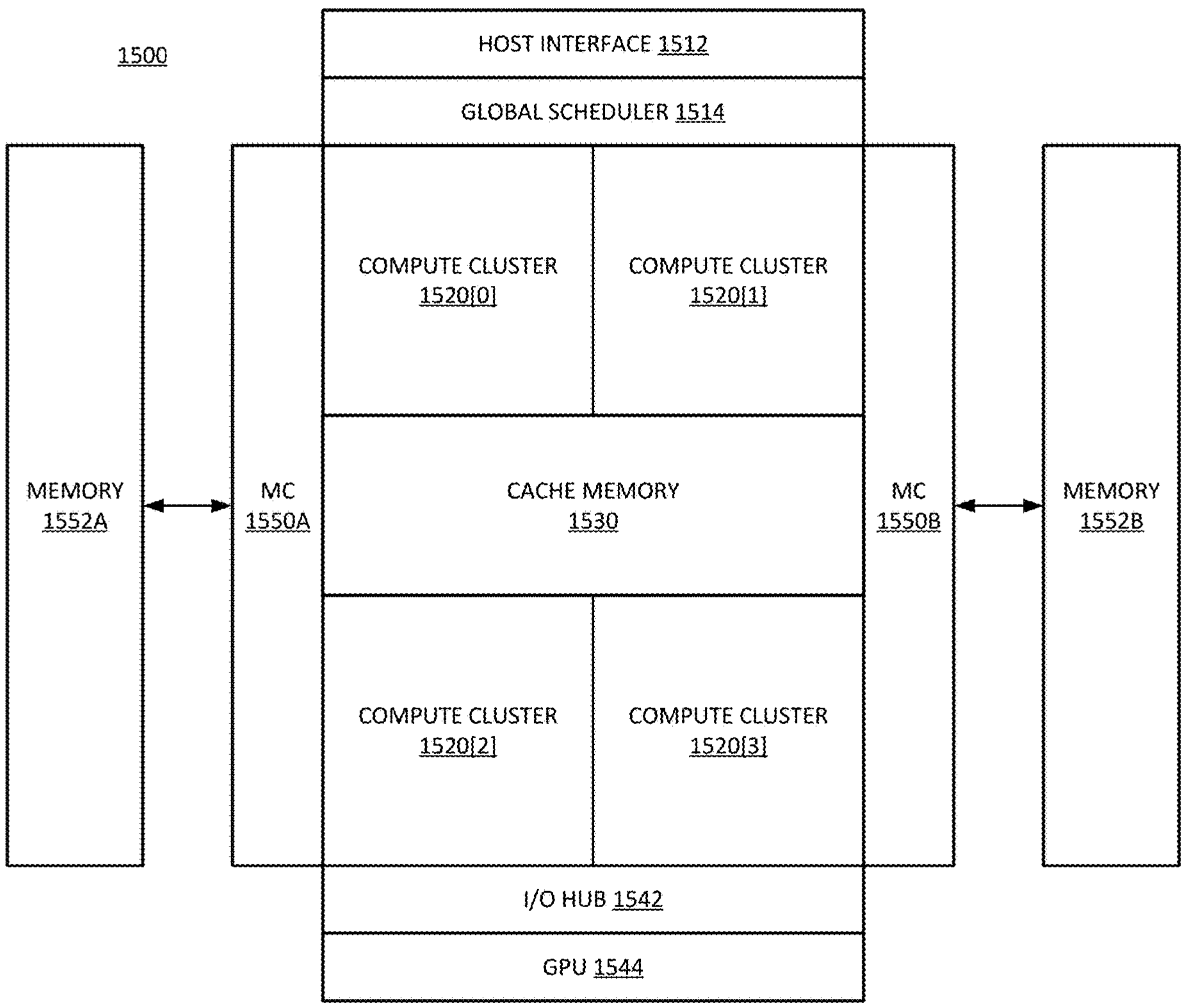
FIG. 15 illustrates an example of a graphics processing unit with parallel compute clusters.

FIG. 15 illustrates an example of a graphics processing unit with parallel compute clusters. System 1500 represents a highly-parallel, general-purpose graphics processing unit (GPGPU) suitable for deployment on a multi-chip module or an SOC.

System 1500 enables highly-parallel compute operations to be performed by an array of graphics processing units. In one example, system 1500 represents a GPGPU instance linked directly to other GPGPU instances to create a multi-GPU cluster having high-bandwidth, high-speed operation for applications such as faster training for deep neural networks. System 1500 includes host interface 1512 to interface with a host processor, such as a CPU or CPU SOC. In one example, host interface 1512 is a PCI Express interface. Alternatively, host interface 1512 can be a vendor specific communications interface or communication fabric.

System 1500 includes global scheduler 1514 to distribute execution threads associated with commands received by host interface 1512 to compute clusters 1520[0:3], collectively, compute clusters 1520. System 1500 illustrates four compute clusters 1520, but it will be understood that system 1500 can include more or fewer computer clusters. In one example, compute clusters 1520 share cache memory 1530. Cache memory 1530 provides a higher-level cache for cache memories (not specifically shown) within compute clusters 1520.

System 1500 includes memory 1552A and memory 1552B, collectively memory 1552. Memory 1552A and memory 1552B can represent different channels of memory. System 1500 can include more or fewer memory channels. Regardless of how many memory channels or how much memory is included in system 1500, memory 1552 can include be coupled with compute clusters 1520 through memory controller 1550A and memory controller 1550B, collectively memory controller 1550, to couple with memory 1552A and memory 1552B, respectively. Memory controllers 1550 manage access to associated memory devices. Memory 1552 can be or include different types of memory devices, such as dynamic random-access memory (DRAM) or graphics random access memory, such as synchronous graphics random access memory (SGRAM), including graphics double data rate (GDDR) memory.

In one example, each of compute clusters 1520 represents a slice in accordance with an example of slice 1410 of graphics unit 1400. Compute clusters 1520 can each include multiple types of integer and floating-point logic units to perform computational operations at different precisions. For example, at least a subset of the floating-point units in each of compute clusters 1520 can be configured to perform 16-bit or 32-bit floating-point operations, while a different subset of the floating-point units can be configured to perform 64-bit floating-point operations.

Compute clusters 1520 can communicate with each other using different mechanisms for synchronization and data exchange. In one example, compute clusters 1520 communicate via host interface 1512. In one example, system 1500 includes I/O hub 1542 that couples system 1500 with GPU link 1544. In one example, GPU link 1544 is coupled to a dedicated GPU-to-GPU bridge that enables communication and synchronization between multiple instances of system 1500 and between different compute clusters. In one example, GPU link 1544 couples with a high-speed interconnect to transmit and receive data to other GPGPUs or parallel processors. In one example, multiple instances of system 1500 can be located in separate data processing systems and communicate via a network device that is accessible via host interface 1512. In one example, GPU link 1544 can be configured to enable a connection to a host processor in addition to, or as an alternative to, host interface 1512.

Distributed Compression and Decompression Architecture

Figure 16:
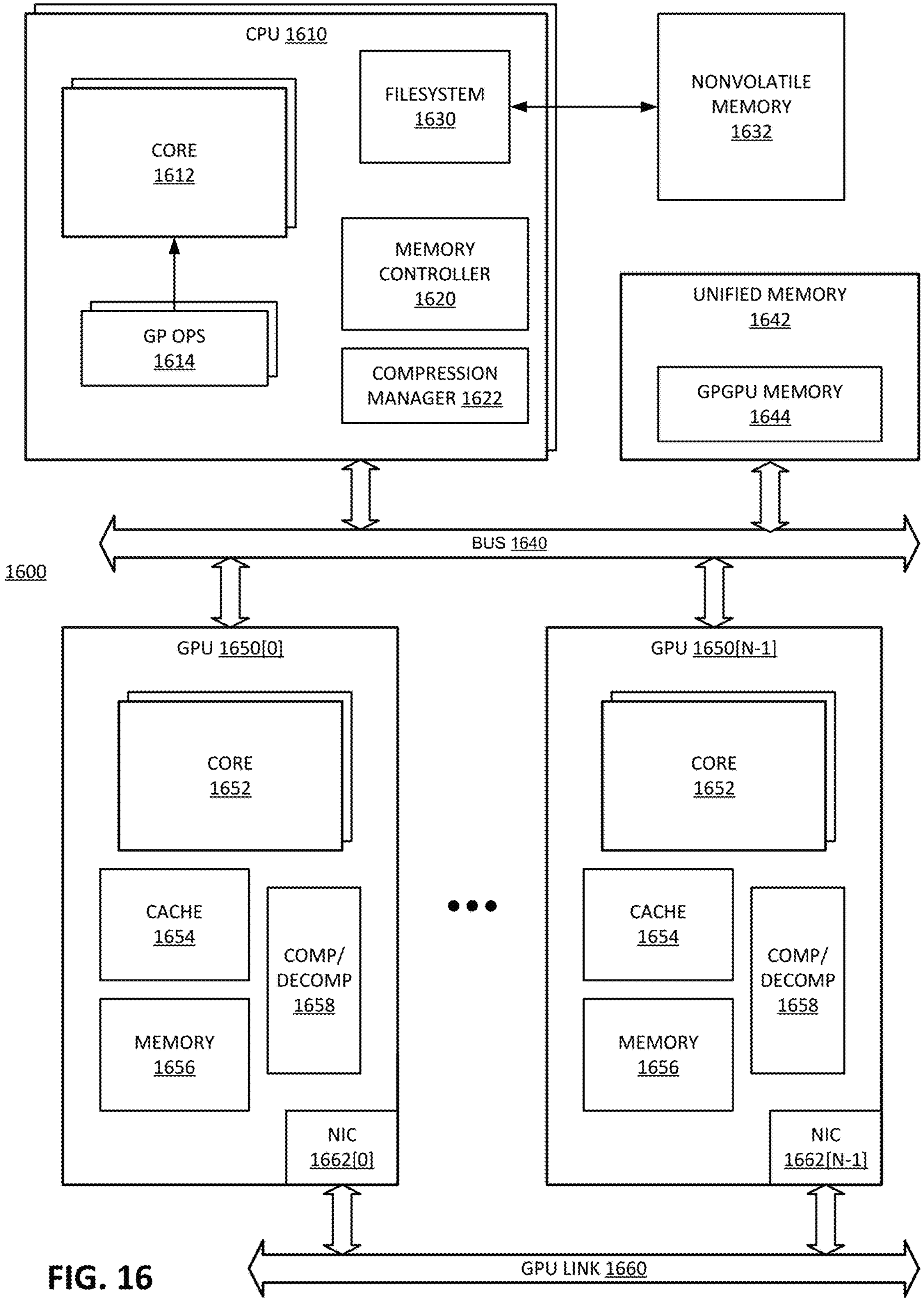
FIG. 16 illustrates an example of a system with compressed data packets for transfers between graphics processors.

FIG. 16 illustrates an example of a system with compressed data packets for transfers between graphics processors. System 1600 represents a computer system with CPU 1610 and GPU 1650[0:(N−1)], collectively, GPUs 1650. GPUs 1650 represent graphics units, which can be standalone graphics processing units, or portions or partitions of a graphics processing unit. In one example, GPUs 1650 represent slices or chips with compute cores.

CPU 1610 represents a general purpose processor. CPU 1610 can include one or multiple cores 1612. Cores 1612 perform general purpose operations (GP OPS) 1614 or general purpose computations. GP OPS 1614 can represent any type of computation or operation on a computer device. CPU 1610 can access memory and can send operations to GPUs 1650 based on operations executed by cores 1612.

In one example, system 1600 includes nonvolatile memory 1632 to store data that is not in active use by GPUs 1650 or CPU 1610. Nonvolatile memory 1632 represents storage in system 1600 that maintains a determinate state even when power is interrupted to the system. CPU 1610 can include filesystem 1630 as a nonvolatile filesystem application or other filesystem service on CPU 1610 as part of an operating system (OS) or primary execution routine. The OS provides a software platform including system hardware interface management and drivers to allow applications running under the OS access to the hardware resources of the computing environment. The OS can manage access to nonvolatile memory 1632 through filesystem 1630.

Unified memory 1642 represents system memory or main memory for system 1600. Unified memory 1642 typically is or includes volatile memory, which has an indeterminate state if power is interrupted to the memory for longer than a short period (i.e., milliseconds). In one example, unified memory 1642 includes GPGPU memory 1644, which represents memory allocated for use by GPUs 1650. Memory controller 1620 of CPU 1610 manages access of CPU 1610 to unified memory 1642.

CPUs 1610 can be coupled communicatively over bus 1640 to GPUs 1650 and unified memory 1642. Bus 1640 represents a high-speed communication connection between CPUs 1610 and GPUs 1650 and memory. In one example, bus 1640 is a PCIe (peripheral component interconnect express) bus. Other buses or interconnections can be used between CPUs 1610 and GPUs 1650. CPUs 1610 can offload operations to GPUs 1650 by initiating instances of applications on GPUs 1650. In one example, system 1600 includes GPU link 1660 to interconnect GPUs 1650. In one example, GPU link 1660 is the same as bus 1640. In one example, GPUs 1650 include a separate GPU-to-GPU link or fabric to interconnect for the exchange of data among GPUs 1650.

GPUs 1650 include graphics cores 1652 or other graphics processing hardware. In one example, GPUs 1650 include cache 1654, which represents one or more levels of cache available to cores 1652. In one example, cache 1654 includes a level one cache (L1 or L1$) and a level two cache (L2 or L2$). In one example, GPUs 1650 include an L2 cache that stores data compressed, and the system provides on-demand compression when data is moved from L1 to L2, and on-demand decompression when data is moved from L2 to L1. Compression/decompression (COMP/DECOMP) 1658 represents compression and decompression engines in GPUs 1650 to provide on-demand compression/decompression operations. Compression/decompression 1658 can be or include distributed compression manager hardware.

In one example, GPUs 1650 include memory 1656, which represents a local memory resource to a specific GPU instance. Memory 1656 can represent a volatile memory resource specific to a GPU instance. System 1600 can include shared memory for GPUs 1650. Memory 1656 represents a non-shared resource on one GPU.

NIC (network interface circuit) 1662[0:(N−1)], collectively NICs 1662, represent circuits that enable respective GPUs 1650 to access other GPUs over GPU link 1660. System 1600 can include a first graphics processor (e.g., GPU 1650[0]) that stores data blocks as compressed data in cache 1654 or memory 1656. The compressed data has data blocks with a common footprint but with a variable amount of data, depending on a compression ratio for the data stored in the compressed block. For example, a lossless compression system can compress data with a ratio anywhere between 8:8 (no compression) to 8:1 (highest compression).

In one example, CPU 1610 includes compression manager 1622, which represents compression/decompression logic in CPU 1610. When implemented in a distributed manner throughout system 1600, the compression manager(s) in system 1600 can provide compression and decompression on demand in system 1600. On demand compression and decompression allows data to be moved through different data flows selectively as compressed or uncompressed data. The ability to compress data in selected flows can reduce the bandwidth usage of data for certain data exchanges. The ability to exchange uncompressed data for selected flow can improve performance by bypassing compression and decompression operations where they could create a performance bottleneck.

Figure 17:
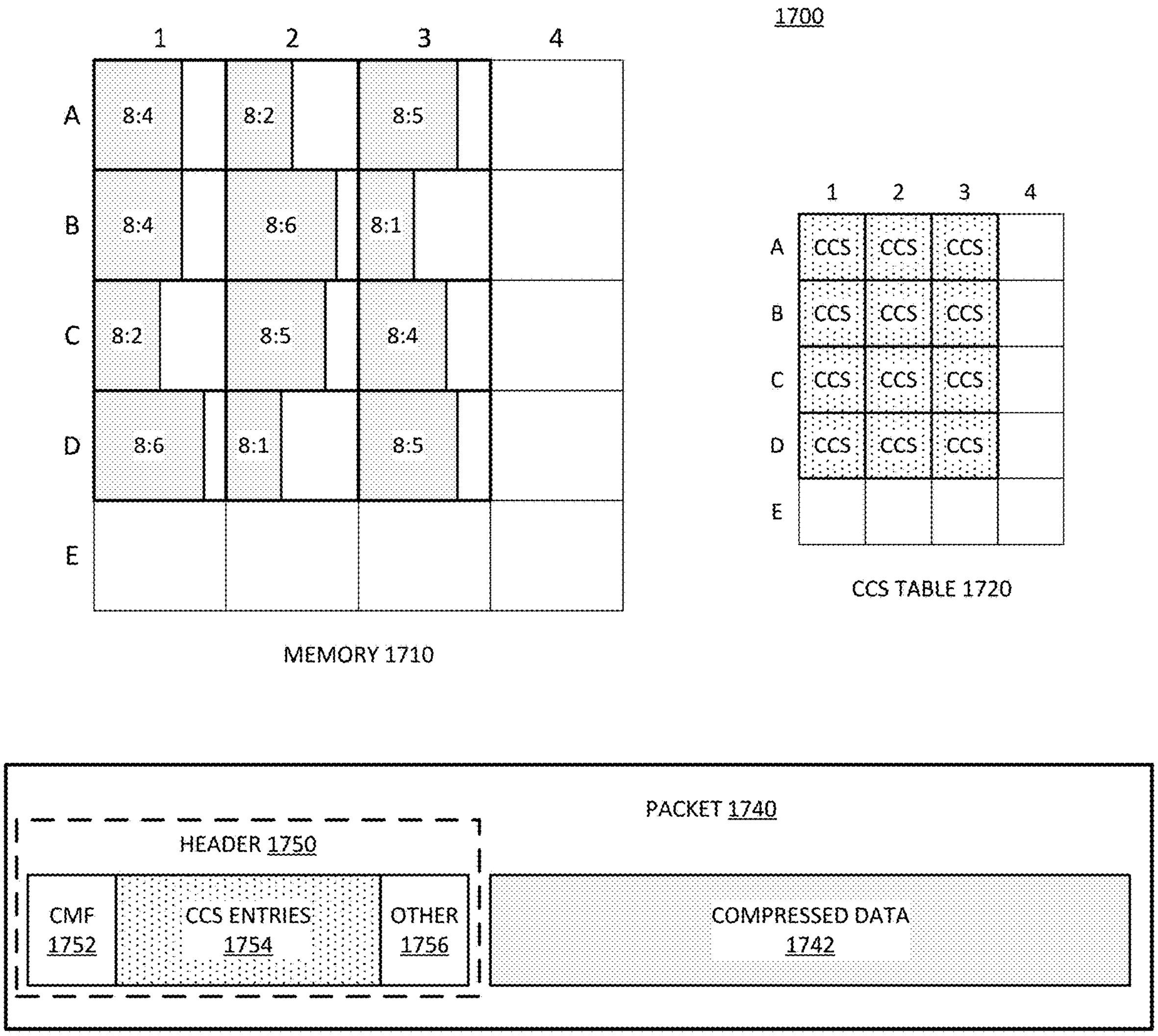
FIG. 17 illustrates an example of a graphics compression architecture.

FIG. 17 illustrates an example of a graphics compression architecture. Architecture 1700 represents a compression architecture for a system in accordance with an example of system 1600. Architecture 1700 provides alternative structures for a data packet of compressed data.

Memory 1710 represents a memory storage of compressed data. As illustrated, the compressed data uses a constant footprint in the cache or memory device, but the amount of data stored varies by the compression ratio. Consider, for example, the difference in the amount of data stored at D2 (compression ratio of 8:1) as compared to the data at D1 (compression ratio of 8:6). The other compression ratios illustrated are 8:2, 8:4, and 8:5. The amount of data stored is not necessarily to scale, but the different data blocks illustrate a relative difference based on compression ratio.

In one example, architecture 1700 represents details of compression for a GPU architecture that has internal lossless compression. In one example, architecture 1700 includes CCS (compression control surface) table 1720. CCS table 1720 includes multiple CCS entries that track the compressed size of discrete memory blocks of memory 1710. Each CCS entry can represent a block compression ratio status. CCS table 1720 is illustrated as having a comparable layout to memory 1710 to represent the fact that a data block has an associated CCS entry to indicate its compression ratio. Thus, like memory 1710, CCS table 1720 has rows indicated by letters (A, B, C, D, E, . . . ) and columns indicated by numbers (1, 2, 3, 4, . . . ). It will be understood that not all data is illustrated. Data can be accessed in groups of data blocks.

In one example, the data blocks of memory 1710 are 256B in size and support compression ratios between 8:1 to 8:8 compression in 32B size increments. In one example, the blocks are stored in local memory as compressed data with a constant footprint layout. With a constant footprint layout, the starting location in memory of each block is based on a full block size, regardless of compression ratio. As such, the compression does not necessarily save memory space, but does save memory bandwidth for reads from memory.

The data of memory 1710 and its associated CCS entries can be concatenated together to form a fixed size packet for transmission between components in a system. In one example, the packet size is fixed, where the same packet size will be used for each transmission. However, the number of blocks of data included in the packet can vary based on the compression ratio. Thus, the fixed sized packet will contain a variable amount of data.

Block 1740 represents a data block implementation with header 1750, having multiple blocks of compressed data. Header 1750 can be a header for storing CCS metadata and compression format (CMF) information. In one example, header 1750 includes CMF 1752 to indicate a compression format used to compress block 1740.

In one example, header 1750 includes CCS entries 1754 as the CCS information for the block. In one example, header 1750 includes other information 1756. Other information 1756 can include any other metadata that can be stored in the header to indicate something about the compressed block. Block 1740 includes compressed data 1742, which represents the compressed data blocks in the block 1740.

Header 1750 can be referred as storing properties for the block. In one example, CMF 1752 can have a number of bits (e.g., 4 bits or other number) to indicate different compression implementations. In one example, CMF 1752 indicates a value as an entry for a lookup table for a decompressor to identify a compression format and apply it to decompress the data block.

Figure 18:
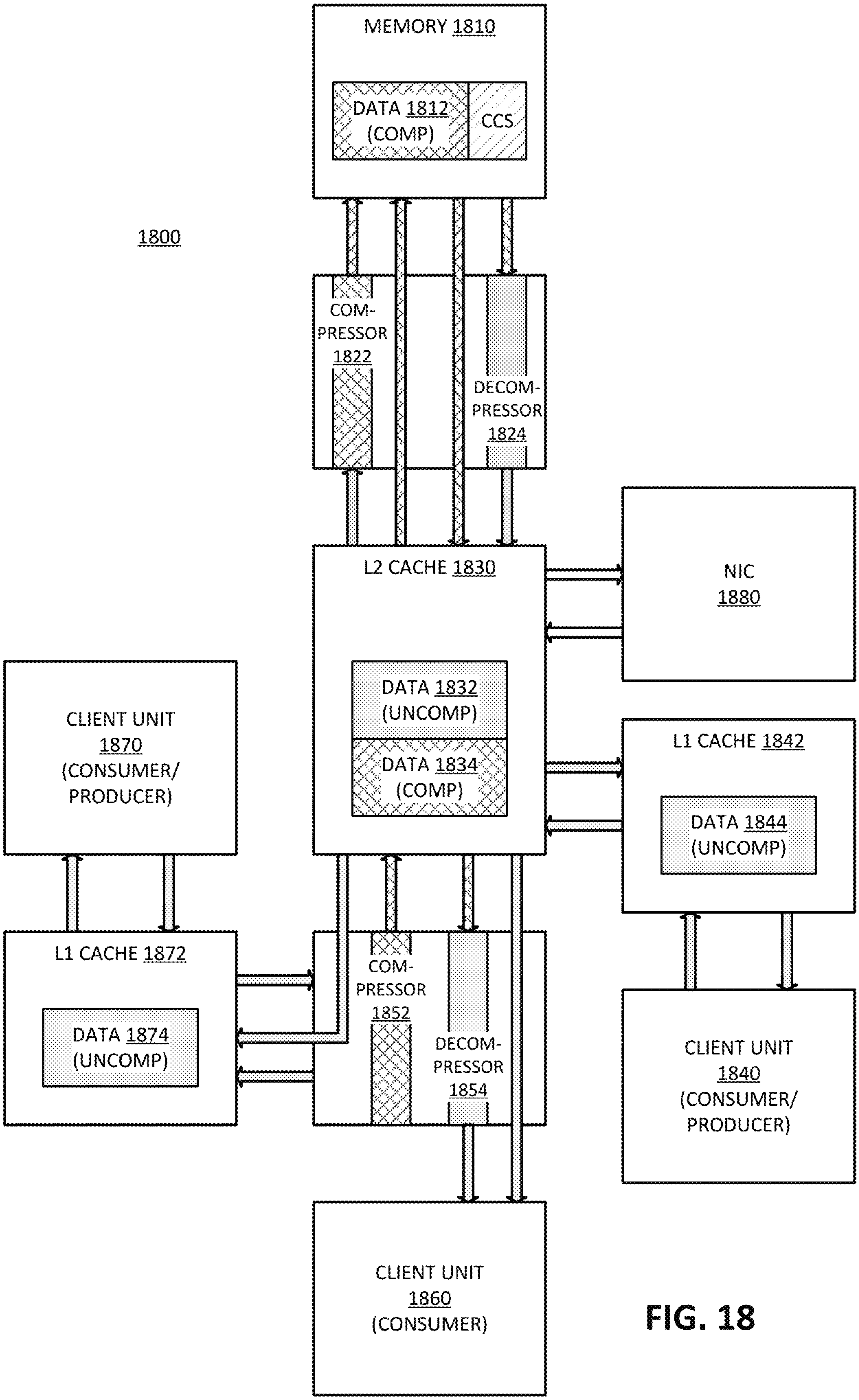
FIG. 18 illustrates an example of a system with distributed compression and decompression.

FIG. 18 illustrates an example of a system with distributed compression and decompression. System 1800 represents a system that transfers data, which can include compressed data in accordance with an example of system 1600. In one example, system 1800 represents a graphics unit. In one example, system 1800 represents a discrete graphics unit.

In one example, system 1800 includes distributed compression/decompression at several blocks around a central large L2 cache 1830. The selective application of compression and decompression provides more efficient use of L2 cache 1830. While the central cache is represented as L2 cache 1830, the shared central cache could alternatively be a level three (L3) cache or other upper level cache.

In one example, memory 1810 represents a dynamic random access memory (DRAM) device. In one example, the DRAM device is a high bandwidth memory (HBM) device. In one example, L1 cache 1872 and L1 cache 1842 represent static random access memory (SRAM) devices. In one example, the L1 caches represent register files or group of registers. In one example, L2 cache 1830 is an SRAM device.

In one example, system 1800 includes memory 1810 to store data 1812. Data 1812 represents compressed data. Memory 1810 can store CCS information associated with data 1812. In one example, system 1800 includes L2 cache 1830 or other upper level cache shared by multiple graphics components. In one example, L2 cache 1830 can store uncompressed data, represented by data 1832, and compressed data, represented by data 1834.

In one example of system 1800, the system has decentralized compression management. In one example, system 1800 includes a compression engine or compression manager near memory 1810. The compression manager can be implemented as a hardware compression manager or as a combination of hardware and software. Compressor 1822 represents a compressor of a compression engine to receive uncompressed data (the gray arrow), compress it, and provide compressed data (the hatched arrow) to memory 1810 for storage. Decompressor 1824 represents a decompressor of a compression engine to receive compressed data, decompress it, and provide decompressed data to L2 cache 1830.

System 1800 provides a representation of various types of client units, some of which have their own L1 caches connected to L2 cache 1830. The client units can have different read/write characteristics that dictate the most efficient place for data compression. When in compressed form, data can only be updated at compressed block granularity. Thus, the system would need to update the entire block of data atomically, which means that for partial block updates, data must first be decompressed, merged with new data, and re-compressed again.

Additionally, when compressed data is read, the entire compressed block must be fetched from local memory to be decompressed. For client units that read only a subset of the block in one operation, it is beneficial to cache data uncompressed to avoid fetching the entire block multiple times from memory and repeating the decompression process.

In one example, compressor 1852 can generate compressed data from uncompressed data of components of system 1800 as compressed data 1834 to store in L2 cache 1830. In one example, decompressor 1854 can decompress compressed data 1834 from L2 to components of system 1800. Compressor 1852 and decompressor 1854 can be part of another compression engine for distributed compression in system 1800.

System 1800 provides examples of various client units that can be coupled to L2 cache 1830. In one example, certain client units are computational units that execute operations on the data. In one example, certain client units are streaming interconnections. In one example, certain client units are communication links. The various client units can have different details of operation that can inform whether they should have a compression manager for compression and decompression.

In one example, system 1800 includes client unit 1840, which includes L1 cache 1842. L1 cache 1842 can store uncompressed data 1844 for client unit 1840. In one example, client unit 1840 is a consumer and a producer of data. L1 cache 1842 can be coupled directly to L2 cache 1830, not through a compression engine. L1 cache 1842 can exchange uncompressed data 1832 with L2 cache 1830.

Client unit 1840 can represent a client that produces data in small discontinuous chunks, not aligned with compressed block size. Client unit 1840 can represent a client that consumes data in discontinuous small chunks. If client unit 1840 frequently performs read-modify-write (RMW) operations on its data, the optimal connection to L2 cache 1830 is to have no dedicated compressor/decompressor. Thus, there is no compression manager between L1 cache 1842 and L2 cache 1830. Client unit 1840 in this example would benefit from L2 cache 1830 storing data uncompressed and acting like a large compression merge buffer.

In one example, system 1800 includes client unit 1860, which is a consumer of data. Client unit 1860 represents a component coupled to L2 cache 1830 through a compression manager without having a local L1 cache. Client unit 1860 can buffer data produced or buffer data for consumption without having a cache device.

Client unit 1860 can represent a consumer device that consumes large amounts of read only surfaces as large, continuous chunks of data. The optimal connection to L2 cache 1830 for such a consumer client unit can be to have increased L2 capacity for storing larger amounts of data in compressed form. Decompressor 1854 can decompress data 1834 on demand to provide to client unit 1860.

In one example, system 1800 includes client unit 1870, which includes L1 cache 1872. L1 cache 1872 can store uncompressed data 1874 for client unit 1870. In one example, client unit 1870 is a consumer and a producer of data. L1 cache 1872 can be coupled to L2 cache 1830 through a compression engine. Compressor 1852 and decompressor 1854 can provide compression of data from L1 cache 1872 to L2 cache 1830 and decompression of compressed data from L2 cache 1830 to L1 cache 1872.

Client unit 1870 can represent a client that produces data in continuous chunks aligned with compressed block size. Client unit 1870 can represent a client that consumes data in large continuous chunks. For such a client, the optimal connection to L2 cache 1830 can be to have a dedicated compressor/decompressor between L1 cache 1872 and L2 cache 1830. L1 cache 1872 can act as a compression merge buffer for providing data to compressor 1852 to store compressed in L2 cache 1830. Client unit 1870 can benefit from L2 cache 1830 storing data in compressed form to increase its capacity.

In one example, system 1800 allows for bypassing of the compression engines. For example, L2 cache 1830 can provide compressed data directly to memory 1810 and memory 1810 can pass compressed data directly to L2 cache 1830 without being decompressed. In one example, L1 cache 1872 can receive uncompressed data directly from L2 cache 1830 without needing to be decompressed by a compression engine. In one example, client unit 1860 can receive uncompressed data directly from L2 cache 1830 without needing to be decompressed by a compression engine.

In one example, system 1800 includes NIC 1880 is coupled to L2 cache 1830. In one example, NIC 1880 can exchange compressed data with L2 cache 1830. In one example, NIC 1880 can exchange uncompressed data with L2 cache 1830. In one example, system 1800 includes a compression manager between NIC 1880 and L2 cache 1830. In one example, NIC 1880 can pass data through a compression manager shared with one or more other components.

The compression managers in system 1800 are illustrated as being "between" components and the L2 cache. In one example, the compression managers are part of the components. Compression managers distributed in the components can allow maximum use of local caches and reduce SOC load by reducing the fabric bandwidth. In one example, the compression manager includes a compressor/decompressor core and a control plane cache to store CCS information. The distribution of the compression managers can provide compression/decompression cores at different layers of system 1800.

In system 1800, the compression status of data refers to an indication of whether a given block of data is compressed. The compression status can contain information about the block's compressed memory footprint. In one example, memory 1810 includes CCS (compression control surface) dedicated to each block of data to track the block's compression status. When a block is written out to memory 1810, the surface can be updated with a new status. When the block is read from memory 1810, the system can consult the CCS to know how much memory to read. In one example, when the block of data is compressed, it occupies less than the total block size in memory 1810.

In one example, L2 cache 1830 tracks the compressed/uncompressed data status of all the cached blocks. L2 cache 1830 can effectively cache the CCS data along with the block contents. Data stored in compressed form benefits from footprint compression, multiplying the effective capacity of L2 cache 1830. The downside of storing data compressed is that partial cacheline updates from the client units cannot be immediately merged with compressed data. Partial writes require L2 cache 1830 to re-fetch the data in compressed form. When L2 cache 1830 stores data in uncompressed form, it allows for immediate merge, partial cacheline updates.

In one example, when there is an L2 hit, clients with a dedicated decompressor can consume data stored compressed in L2 cache 1830. Clients with no dedicated decompressor cannot directly consume data stored compressed in L2 cache 1830. Such clients can directly consume data that is stored uncompressed in L2 cache 1830. For data stored compressed, clients without a decompressor will need the data to be evicted and fetched back decompressed into L2 cache 1830.

Figure 19:
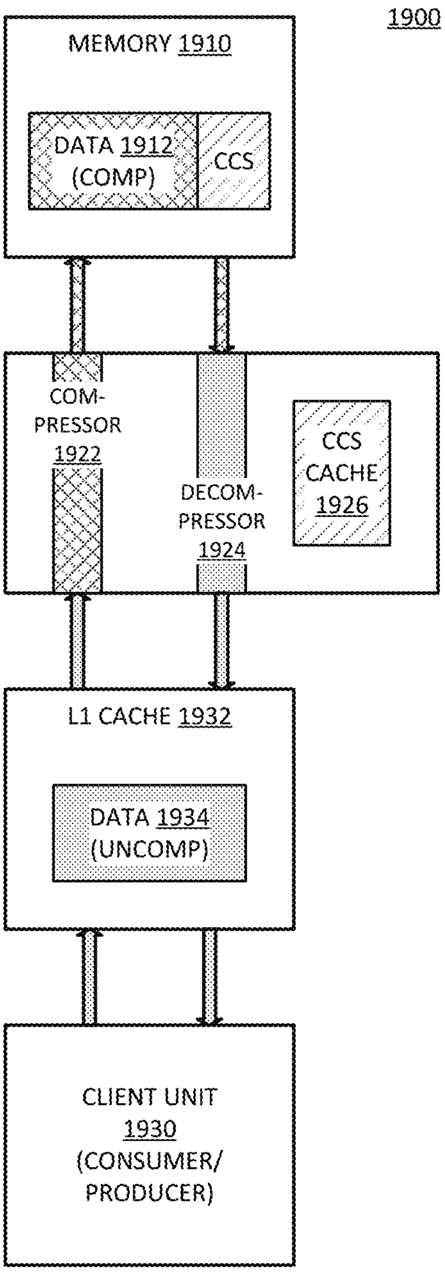
FIG. 19 illustrates an example of distributed compression and decompression with a CCS cache.

FIG. 19 illustrates an example of distributed compression and decompression with a CCS cache. System 1900 represents a system that transfers data, which can include compressed data in accordance with an example of system 1600. In one example, system 1900 represents a graphics unit. In one example, system 1900 represents a discrete graphics unit.

In one example, system 1900 includes distributed compression/decompression for a client unit that is not coupled to a central L2 cache or shared upper level cache. The selective application of compression and decompression provides more efficient data transfer for the client unit, even without the use of an L2 cache.

System 1900 can have a dedicated compressor/decompressor pair placed directly in-between Local memory 1910 and L1 cache 1932, where L1 cache 1932 is the cache for client unit 1930. In one example, the compressor/decompressor block can have a dedicated cache for CCS data.

In one example, memory 1910 represents a DRAM device. In one example, the DRAM device is an HBM device. In one example, L1 cache 1932 represents an SRAM device. In one example, L1 cache 1932 represent register files or group of registers. In one example, system 1900 includes memory 1910 to store data 1912. Data 1912 represents compressed data. Memory 1910 can store CCS information associated with data 1912.

System 1900 includes client unit 1930, which is connected to memory 1910, and is not connected through an upper level cache. Client unit 1930 has L1 cache 1932. L1 cache 1932 can store uncompressed data 1934 for client unit 1930. In one example, client unit 1930 is a consumer and a producer of data. L1 cache 1932 can be coupled to memory 1910 through a compression engine. Compressor 1922 and decompressor 1924 can provide compression of data from L1 cache 1932 to memory 1910 and decompression of compressed data from memory 1910 to L1 cache 1932. In one example, compressor 1922 and decompressor 1924 represent components of a compression manager that includes dedicated CCS cache 1926. CCS cache 1926 can cache CCS information for the application of compression and decompression in the compression manager.

Figure 20:
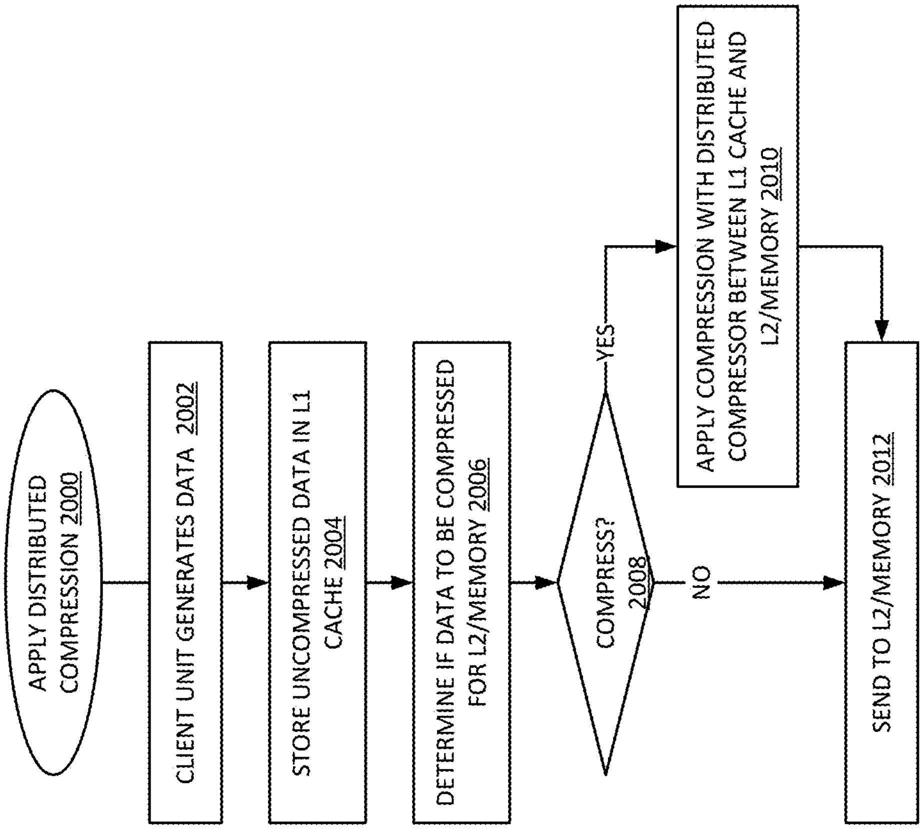
FIG. 20 is a flow diagram of an example of applying distributed compression.

FIG. 20 is a flow diagram of an example of applying distributed compression. Process 2000 represents a process for applying compression selectively in a distributed way. In one example, a client unit generates data, at 2002. The client unit can be in accordance with any example herein.

The client unit can optionally store uncompressed data in an L1 cache, at 2004. Not all client units will have an L1 cache. In one example, the L1 cache evicts the data to an L2 cache or other upper level cache. In one example, the L1 cache can be coupled directly to a local memory. The system can include distributed compression management to perform compression and decompression at different levels of the system.

The system can determine if the data is to be compressed for L2 or another local memory, at 2006. If the system is to compress the data, at 2008 YES branch, in one example, the system applies compression with a distributed compressor between the L1 cache and the L2 cache or local memory, at 2010.

In one example, if the system is not to compress the data, at 2008 NO branch, the system can send the data uncompressed to the L2 cache or memory, at 2012. In one example, the passing of uncompressed data can bypass a compressor/decompressor component to avoid performing compression or avoid performing decompression. In one example, after the compressed data is generated, at 2010, the system can send the data compressed to the L2 cache or memory, at 2012.

Figure 21:
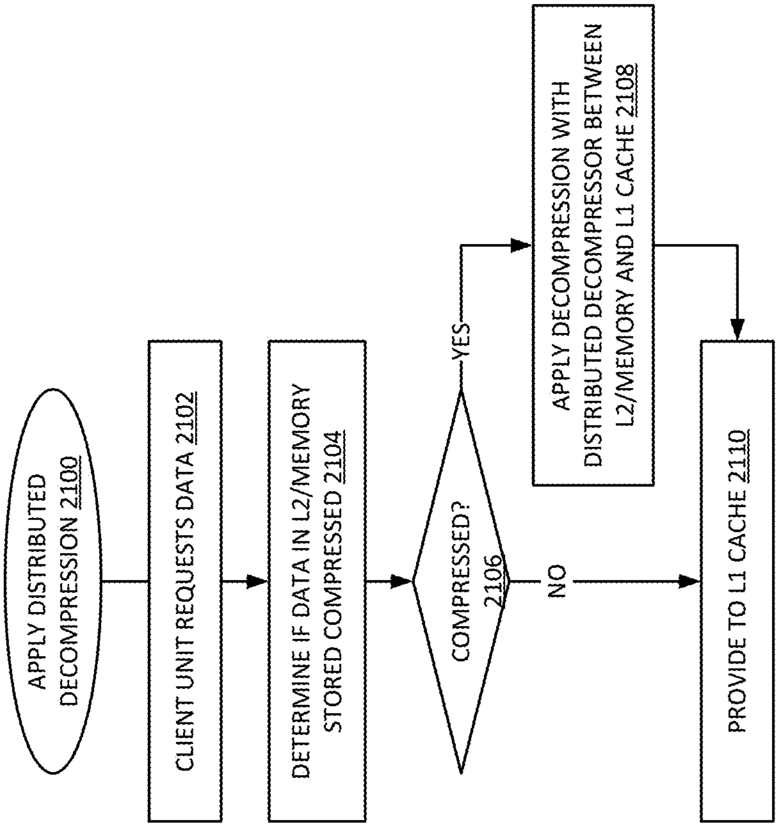
FIG. 21 is a flow diagram of an example of applying distributed decompression.

FIG. 21 is a flow diagram of an example of applying distributed decompression. Process 2100 represents a process for applying decompression selectively in a distributed way. In one example, a client unit requests data, at 2102. The client unit can be in accordance with any example herein.

The system can determine if the requested data in the L2 cache or local memory is stored compressed, at 2104. If the data in the L2 cache or memory is stored compressed, at 2106 YES branch, in one example, the system accesses the compressed data and applies decompression with a distributed decompressor between the L2 cache or local memory and the L1 cache, at 2108. In one example, the system can optionally pass compressed data, bypassing the decompressor to avoid performing decompression.

In one example, if the data is not compressed, at 2106 NO branch, the system can provide the uncompressed data to the L1 cache, at 2110. In one example, after the compressed data is decompressed, at 2108, the system can provide the uncompressed data to the L1 cache, at 2110.

In general with respect to the descriptions herein, in one example, a graphics processor includes: a cache device; a memory device; and a compression module between the cache device and the memory device, the compression module to perform compression of write data when the write data is moved from the cache device to the memory device, and to perform decompression of read data when the read data is moved from the memory device to the cache device.

In one example of the graphics processor, the memory device is to store compressed data and an associated compression control surface (CCS) to indicate compression for the compressed data, wherein the compression module comprises a dedicated CCS cache to store CCS information for decompression on a read from the memory device, and to store CCS information for compression on a write to the memory device. In accordance with any preceding example of the graphics processor, in one example, the cache device comprises a shared L2 (level two) cache shared by multiple client units. In accordance with any preceding example of the graphics processor, in one example, the shared L2 cache is to store both compressed data and uncompressed data. In accordance with any preceding example of the graphics processor, in one example, the compression module includes a compression bypass path to optionally move uncompressed data between the shared L2 cache and the memory device. In accordance with any preceding example of the graphics processor, in one example, the graphics processor includes: an L1 (level one) cache coupled to the shared L2 cache, wherein the L1 cache is to store uncompressed data and move uncompressed data between the shared L2 cache and the L1 cache. In accordance with any preceding example of the graphics processor, in one example, the compression module comprises a first compression module, wherein the graphics processor includes: an L1 (level one) cache; and a second compression module between the L1 cache and the shared L2 cache, the second compression module to perform compression of write data when the write data is moved from the L1 cache to the shared L2 cache, and to perform decompression of read data when the read data is moved from the shared L2 cache to the L1 cache. In accordance with any preceding example of the graphics processor, in one example, the second compression includes a compression bypass path to optionally move uncompressed data between the L1 cache and the shared L2 cache.

In general with respect to the descriptions herein, in one example, a computer system includes: a central processing unit to execute general operations; a graphics processor including multiple graphics components having associated L1 (level one) caches; a shared L2 (level two) cache coupled to the L1 caches; and a compression module between a first L1 cache and the shared L2 cache, the compression module to perform compression of write data when the write data is moved from the first L1 cache to the shared L2 cache, and to perform decompression of read data when the read data is moved from the shared L2 cache to the first L1 cache.

In one example of the computer system, the shared L2 cache is to store both compressed data and uncompressed data. In accordance with any preceding example of the computer system, in one example, the compression module includes a compression bypass path to optionally move uncompressed data between the shared L2 cache and the first L1 cache. In accordance with any preceding example of the computer system, in one example, the computer system includes: a second L1 (level one) cache coupled to the shared L2 cache, wherein the second L1 cache is to store uncompressed data and move uncompressed data between the shared L2 cache and the second L1 cache. In accordance with any preceding example of the computer system, in one example, the compression module comprises a first compression module, and wherein the graphics processor includes: a memory device; and a second compression module between the shared L2 cache and the memory device, the second compression module to perform compression of write data when the write data is moved from the shared L2 cache to the memory device, and to perform decompression of read data when the read data is moved from the memory device to the shared L2 cache. In accordance with any preceding example of the computer system, in one example, the second compression includes a compression bypass path to optionally move uncompressed data between the L1 cache and the shared L2 cache. In accordance with any preceding example of the computer system, in one example, the memory device is to store compressed data and an associated compression control surface (CCS) to indicate compression for the compressed data, wherein the compression module comprises a dedicated CCS cache to store CCS information for decompression on a read from the memory device, and to store CCS information for compression on a write to the memory device.

In general with respect to the descriptions herein, in one example, a method for communication between processing units includes: receiving data at a compression module between a cache device and a memory unit; performing compression with the compression module when the data received is write data to move from the cache device to the memory unit; and performing decompression with the compression module when the data received is read data to move from the memory unit to the cache device.

In one example of the method, the cache device comprises a shared L2 (level two) cache shared by multiple computation units and the memory unit comprises a local memory device of a graphics processor, wherein the shared L2 cache is to store both compressed data and uncompressed data. In accordance with any preceding example of the method, in one example, performing compression comprises: determining whether the write data is to be stored as compressed write data or uncompressed write data; and bypassing the compression module when the write data is to be stored as uncompressed write data to avoid performing compression; else, performing compression with the compression module when the write data is to be stored as compressed write data. In accordance with any preceding example of the method, in one example, performing decompression comprises: determining whether the read data is compressed read data or uncompressed read data; and bypassing the compression module when the read data is uncompressed read data to avoid performing decompression; else, performing decompression with the compression module when the read data is compressed read data. In accordance with any preceding example of the method, in one example, the cache device comprises an L1 (level one) cache of a client unit and the memory unit comprises a shared L2 (level two) cache.

Flow diagrams as illustrated herein provide examples of sequences of various process actions. The flow diagrams can indicate operations to be executed by a software or firmware routine, as well as physical operations. A flow diagram can illustrate an example of the implementation of states of a finite state machine (FSM), which can be implemented in hardware and/or software. Although shown in a particular sequence or order, unless otherwise specified, the order of the actions can be modified. Thus, the illustrated diagrams should be understood only as examples, and the process can be performed in a different order, and some actions can be performed in parallel. Additionally, one or more actions can be omitted; thus, not all implementations will perform all actions.

To the extent various operations or functions are described herein, they can be described or defined as software code, instructions, configuration, and/or data. The content can be directly executable ("object" or "executable" form), source code, or difference code ("delta" or "patch" code). The software content of what is described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to what is disclosed and implementations of the invention without departing from their scope. Therefore, the illustrations and examples herein should be construed in an illustrative, and not a restrictive sense. The scope of the invention should be measured solely by reference to the claims that follow.

What is claimed is:

1. A graphics processor comprising:

a lower level cache device;

a higher level memory device;

a shared cache device shared by multiple devices in a graphics pipeline, the shared cache device to store both compressed and uncompressed data, the shared cache device to cache data between the lower level cache device and the higher level memory device; and a first compression module between the shared cache device and the lower level cache device, the first compression module to selectively perform compression of write data when the write data is moved from the lower level cache device to the shared cache device, and to selectively perform decompression of read data when the read data is moved from the shared cache device to the lower level cache device, the first compression module including a compression bypass path to optionally move uncompressed data between the shared cache device and the lower level cache device; and a second compression module between the shared cache device and the higher level memory device, the second compression module to selectively perform compression of write data when the write data is moved from the shared cache device to the higher level memory device, and to selectively perform decompression of read data when the read data is moved from the higher level memory device to the shared cache device, the second compression module including a compression bypass path to optionally move uncompressed data between the higher level memory device and the shared cache device.

2. The graphics processor of claim 1, wherein the shared cache device is to store compressed data and an associated compression control surface (CCS) to indicate compression for the compressed data, wherein the first compression module comprises a dedicated CCS cache to store CCS information for decompression on a read from the lower level cache device, and to store CCS information for compression on a write to the lower level cache device.

3. The graphics processor of claim 1, wherein the shared cache device comprises a cache shared by multiple computation units.

4. The graphics processor of claim 1, wherein the lower level cache device comprises an L1 (level one) cache device, wherein the higher level memory device comprises an L3 (level three) cache or system memory, and wherein the shared cache device comprises a shared L2 (level two) cache shared by multiple client units.

5. The graphics processor of claim 4, wherein the L1 cache device comprises a first L1 cache, and further comprising:

a second L1 cache coupled to the shared L2 cache, wherein the second L1 cache is to store only uncompressed data and move only uncompressed data between the shared L2 cache and the second L1 cache.

6. The graphics processor of claim 5, wherein the shared L2 cache is to perform data compression aggregation between the first L1 cache and the second L1 cache with the higher level memory device.

7. The graphics processor of claim 4, wherein the L1 cache device comprises a first L1 cache and further comprising:

a second L1 cache coupled to the shared L2 cache; and a third compression module between the second L1 cache and the shared L2 cache, the third compression module to perform compression of write data when the write data is moved from the second L1 cache to the shared L2 cache, and to perform decompression of read data when the read data is moved from the shared L2 cache to the second L1 cache.

8. The graphics processor of claim 1, wherein the shared cache device comprises a shared L3 (level three) cache shared by multiple client units.

9. A computer system comprising:

a central processing unit to execute general operations;

a graphics processor including multiple graphics components having associated L1 (level one) caches;

a higher level memory device;

a shared L2 (level two) cache coupled between the L1 caches and the higher level memory device, the shared L2 cache to store both compressed and uncompressed data;

a first compression module between a first L1 cache of the associated L1 caches and the shared L2 cache, the first compression module to selectively perform compression of write data when the write data is moved from the first L1 cache to the shared L2 cache, and to selectively perform decompression of read data when the read data is moved from the shared L2 cache to the first L1 cache, the first compression module including a compression bypass path to optionally move uncompressed data between the shared L2 cache and the first L1 cache; and a second compression module between the L2 cache and the higher level memory device, the second compression module to selectively perform compression of write data when the write data is moved from the shared L2 cache to the higher level memory device, and to selectively perform decompression of read data when the read data is moved from the higher level memory device to the shared L2 cache, the second compression module including a compression bypass path to optionally move uncompressed data between the higher level memory device and the shared L2 cache.

10. The computer system of claim 9, wherein the higher level memory device is to store compressed data and an associated compression control surface (CCS) to indicate compression for the compressed data, wherein the second compression module comprises a dedicated CCS cache to store CCS information for decompression on a read from the higher level memory device, and to store CCS information for compression on a write to the higher level memory device.

11. The computer system of claim 9, wherein the higher level memory device comprises an L3 (level three) cache or system memory.

12. The computer system of claim 11, wherein a second L1 cache of the associated L1 cache s is to store only uncompressed data and move only uncompressed data between the shared L2 cache and the second L1 cache.

13. The computer system of claim 12, wherein the shared L2 cache is to perform data compression aggregation between the first L1 cache and the second L1 cache with the higher level memory device.

14. The computer system of claim 11, further comprising:

a third compression module between the second L1 cache and the shared L2 cache, the third compression module to perform compression of write data when the write data is moved from the second L1 cache to the shared L2 cache, and to perform decompression of read data when the read data is moved from the shared L2 cache to the second L1 cache.

15. A method for communication between processing units, comprising:

receiving data at a first compression module between a shared cache device and a lower level cache device, the shared cache device shared by multiple devices, the shared cache device to store both compressed and uncompressed data, the shared cache device to cache data between the lower level cache device and a higher level memory device;

selectively performing compression with the first compression module when the data received is write data to move from the lower level cache device to the shared cache device, including optionally moving uncompressed data between the shared cache device and the lower level cache device;

selectively performing decompression with the first compression module when the data received is read data to move from the lower level cache device to the shared cache device, including optionally moving uncompressed data between the lower level cache device and the shared cache device;

receiving data at a second compression module between the shared cache device and a higher level memory device;

selectively performing compression with the second compression module when the data received is write data to move from the shared cache device to the higher level memory device, including optionally moving uncompressed data between the shared cache device and the higher level memory device; and selectively performing decompression with the second compression module when the data received is read data to move from the higher level memory device to the shared cache device, including optionally moving uncompressed data between the higher level memory device and the shared cache device.

16. The method of claim 15, wherein the shared cache device comprises a cache shared by multiple computation units and the lower level cache device comprises a local memory device of a graphics processor.

17. The method of claim 16, wherein performing compression comprises:

determining whether the write data is to be stored as compressed write data or uncompressed write data; and bypassing the compression module when the write data is to be stored as uncompressed write data to avoid performing compression; else, performing compression with the compression module when the write data is to be stored as compressed write data.

18. The method of claim 16, wherein performing decompression comprises:

determining whether the read data is compressed read data or uncompressed read data; and bypassing the compression module when the read data is uncompressed read data to avoid performing decompression; else, performing decompression with the compression module when the read data is compressed read data.

* * * * *